(12) United States Patent
Nakanishi et al.

(10) Patent No.: US 10,055,072 B2
(45) Date of Patent: Aug. 21, 2018

(54) INPUT DEVICE AND DISPLAY DEVICE

(71) Applicant: Japan Display Inc., Tokyo (JP)

(72) Inventors: Takayuki Nakanishi, Tokyo (JP); Masaya Tamaki, Tokyo (JP); Tatsuya Yata, Tokyo (JP)

(73) Assignee: Japan Display Inc., Tokyo (JP)

( * ) Notice: Subject to any disclaimer, the term of this patent is extended or adjusted under 35 U.S.C. 154(b) by 100 days.

(21) Appl. No.: 15/080,911

(22) Filed: Mar. 25, 2016

(65) Prior Publication Data

US 2016/0291735 A1 Oct. 6, 2016

(30) Foreign Application Priority Data

Mar. 30, 2015 (JP) ................................. 2015-070226

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01); *G06F 2203/04101* (2013.01); *G06F 2203/04103* (2013.01); *G06F 2203/04111* (2013.01)

(58) Field of Classification Search
CPC ........... G06F 3/044; G06F 2203/04101; G06F 3/0416; G06F 2203/04111; G06F 2203/04103
See application file for complete search history.

(56) References Cited

U.S. PATENT DOCUMENTS

| 9,310,947 B2 | 4/2016 | Sugita et al. |
| 2010/0214245 A1 | 8/2010 | Hirota |
| 2011/0310056 A1* | 12/2011 | Chang ....................... B43L 1/06 |
| | | 345/174 |
| 2012/0249454 A1 | 10/2012 | Teraguchi et al. |

(Continued)

FOREIGN PATENT DOCUMENTS

| CN | 103842947 | 6/2014 |
| JP | 2010-198415 | 9/2010 |

(Continued)

OTHER PUBLICATIONS

Japanese Office Action dated Apr. 24, 2018 in corresponding Japanese Application No. 2015-070266.

(Continued)

*Primary Examiner* — Md Saiful A Siddiqui
(74) *Attorney, Agent, or Firm* — K&L Gates LLP

(57) ABSTRACT

An input device includes a first substrate, a first light-emitting element unit, and a third electrode unit. The first substrate has a first surface and a second surface. The first light-emitting element includes a first electrode unit formed on the second surface, a second electrode unit formed in a layer different from that of the first electrode unit, and a luminescent layer electrically in contact with at least a part of the first electrode unit and a part of the second electrode unit, and formed between the first electrode unit and the second electrode unit. The third electrode unit is insulated from the first electrode unit and detects a change in an electric field between the first electrode unit and the third electrode unit depending on coordinates of a proximity object present at a position overlapping with the first surface in planar view.

7 Claims, 39 Drawing Sheets

(56) References Cited

U.S. PATENT DOCUMENTS

| | | | | |
|---|---|---|---|---|
| 2015/0084006 | A1 | 3/2015 | Ivanov | |
| 2015/0324033 | A1* | 11/2015 | Kim | G06F 3/044 345/174 |
| 2016/0179276 | A1* | 6/2016 | Nathan | G06F 3/0414 345/174 |

FOREIGN PATENT DOCUMENTS

| | | |
|---|---|---|
| JP | 2011-221114 | 11/2011 |
| JP | 2012-212076 | 11/2012 |
| WO | 2013/018625 | 2/2013 |

OTHER PUBLICATIONS

Chinese Office Action dated May 3, 2018 in corresponding Chinese Application No. 201610181681.5.

* cited by examiner

INPUT DEVICE AND DISPLAY DEVICE

CROSS-REFERENCE TO RELATED APPLICATIONS

This application claims priority from Japanese Application No. 2015-070226, filed on Mar. 30, 2015, the contents of which are incorporated by reference herein in its entirety.

BACKGROUND

1. Technical Field

The present invention relates to an input device and a display device that can detect an external proximity object, and in particular to the input device and the display device that can detect an external proximity object approaching from the outside based on a change in capacitance.

2. Description of the Related Art

Japanese Patent Application Laid-open Publication No. 2010-198415 (JP-A-2010-198415) discloses an input apparatus in which an input device or so-called a touch panel, and a lighting device or so-called a front light, are integrated with each other.

The input apparatus described in JP-A-2010-198415 includes a light-transmissible substrate capable of transmitting light therethrough and arranged at the border between the touch panel and the front light in a manner shared by them. This configuration reduces the thickness of the input apparatus. In recent years, such input apparatuses have been required to have a further reduced thickness.

SUMMARY

According to an aspect, an input device includes a first substrate, a first light-emitting element unit, and a third electrode unit. The first substrate has a first surface and a second surface. The first light-emitting element includes a first electrode unit formed on the second surface, a second electrode unit formed in a layer different from a layer of the first electrode unit, and a luminescent layer electrically in contact with at least a part of the first electrode unit and a part of the second electrode unit, and formed between the first electrode unit and the second electrode unit. The third electrode unit is insulated from the first electrode unit and detects a change in an electric field between the first electrode unit and the third electrode unit depending on coordinates of a proximity object present at a position overlapping with the first surface in planar view.

According to another aspect, a display device comprising: an input device comprising: a first substrate having a first surface and a second surface; a first light-emitting element unit including a first electrode unit formed on the second surface, a second electrode unit formed in a layer different from a layer of the first electrode unit, and a luminescent layer electrically in contact with at least a part of the first electrode unit and a part of the second electrode unit, and formed between the first electrode unit and the second electrode unit; and a third electrode unit insulated from the first electrode unit and that detects a change in an electric field between the first electrode unit and the third electrode unit depending on coordinates of a proximity object present at a position overlapping with the first surface in planar view; and a display unit provided on the second surface of the input device and capable of displaying an image on the first surface.

BRIEF DESCRIPTION OF THE FIGURES

FIG. 18 is a diagram for explaining voltages of the first electrode unit and the second electrode unit in the drive electrode selection period in a state where the first light-emitting element is turned on;

FIG. 19 is a diagram for explaining the scanning state at the time of proximity detection in the state where the first light-emitting element is turned on;

FIG. 22 is a diagram for explaining voltages of the first electrode unit and the second electrode unit in the drive electrode selection period in a state where the first light-emitting element is turned on;

FIG. 23 is a diagram for explaining the scanning state at the time of proximity detection in the state where the first light-emitting element is turned on;

FIG. 42 is a diagram for explaining voltages of the first electrode unit and the second electrode unit in the drive electrode selection period in a state where the first light-emitting element is turned on;

FIG. 44 is a diagram for explaining voltages of the first electrode unit and the second electrode unit in the drive electrode selection period in a state where the first light-emitting element is turned on;

FIG. 48 is a timing chart of drive control performed when the drive signal of one pulse does not coincide with a lighting period for performing lighting drive in a state where the first light-emitting element is turned on;

FIG. 49 is a timing chart of drive control performed when the drive signal of one pulse coincides with the lighting period for performing lighting drive and when scanning of the drive signal overtakes the lighting period in a state where the first light-emitting element is turned on;

FIG. 52 is a timing chart of drive control performed when the drive signal of a plurality of pulses does not coincide with the lighting period for performing lighting drive in a state where the first light-emitting element is turned on;

FIG. 53 is a timing chart of drive control performed when the drive signal of a plurality of pulses coincides with the lighting period for performing lighting drive in a state where the first light-emitting element is turned on;

FIG. 56 is a timing chart of drive control performed when the drive signal of a plurality of pulses does not coincide with the lighting period for performing lighting drive in a state where the first light-emitting element is turned on; and FIG. 57 is a timing chart of drive control performed when the drive signal of a plurality of pulses coincides with the lighting period for performing lighting drive in a state where the first light-emitting element is turned on.

DETAILED DESCRIPTION

Figure 1:
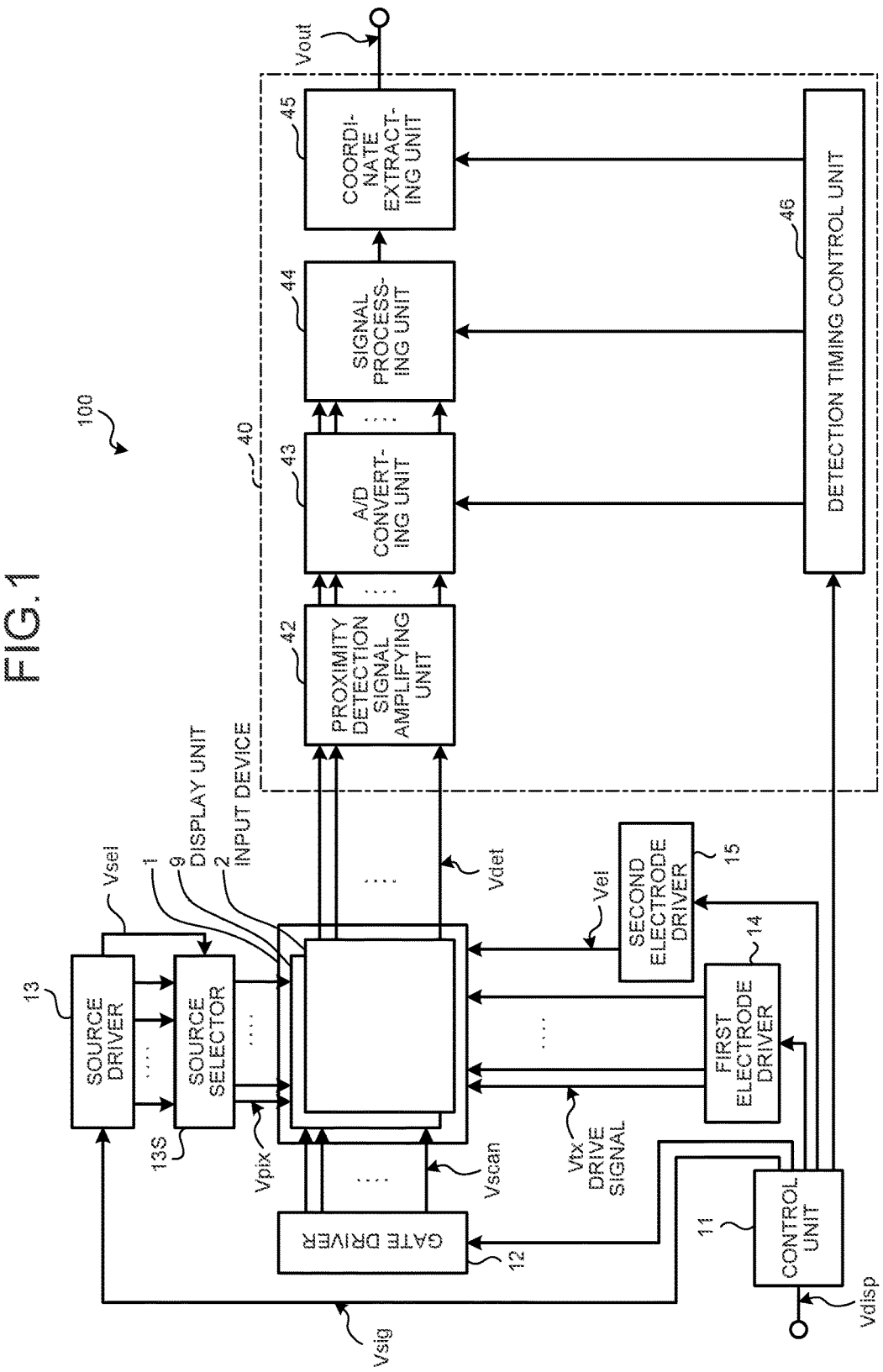
FIG. 1 is a block diagram for explaining a configuration of a display device according to a first embodiment of the present invention.

Exemplary aspects (embodiments) according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and overlapping explanation thereof will be appropriately omitted.

First Embodiment

FIG. 1 is a block diagram for explaining a configuration of a display device according to a first embodiment of the present invention. A display system 100 includes a display device 1 with a proximity detecting function, a control unit 11, a gate driver 12, a source driver 13, a source selector 13S, a first electrode driver 14, a second electrode driver 15, and a proximity detecting unit 40. In the display device 1 with a proximity detecting function, a reflective display unit 9 and an input device 2 are stacked in a manner overlapping with each other in planar view, which will be described below. The display unit 9 serves as a reflective liquid-crystal display unit, and the input device 2 serves as a capacitive touch panel.

The display unit 9 sequentially scans each horizontal line based on a scanning signal Vscan supplied from the gate driver 12, thereby performing display, which will be described below. The control unit 11 is a circuit that supplies control signals to the gate driver 12, the source driver 13, the first electrode driver 14, the second electrode driver 15, and the proximity detecting unit 40 based on video signals Vdisp supplied from the outside, thereby performing control such that these components operate in synchronization with one another. A control device according to the present invention includes the control unit 11, the gate driver 12, the source driver 13, the first electrode driver 14, the second electrode driver 15, and the proximity detecting unit 40.

The gate driver 12 has a function to sequentially select one horizontal line to be a target of display drive in the display unit 9 based on the control signal supplied from the control unit 11.

The source driver 13 is a circuit that supplies pixel signals Vpix to pixels (sub-pixels) arranged in a matrix on the display surface of the display unit 9 based on the control signal supplied from the control unit 11. The source driver 13 generates an image signal Vsig by time-division multiplexing the pixel signals Vpix for a plurality of sub-pixels in the display unit 9 from the control signal of one horizontal line. The source driver 13 then supplies the image signal Vsig to the source selector 13S. The source driver 13 generates a switch control signal Vsel required to separate the pixel signals Vpix multiplied into the image signal Vsig. The source driver 13 then supplies the switch control signal Vsel to the source selector 13S together with the image signal Vsig. With this configuration, the source selector 13S requires a smaller number of wiring between the source driver 13 and the source selector 13S.

The first electrode driver 14 is a circuit that supplies a drive signal pulse based on a drive signal to a first electrode unit, which will be described below, of the input device 2 based on the control signal supplied from the control unit 11.

The second electrode driver 15 is a circuit that supplies a drive signal Vel to a second electrode unit, which will be described below, of the input device 2 based on the control signal supplied from the control unit 11.

The proximity detecting unit 40 is a circuit that detects whether a proximity state is created on the input device 2 based on the control signal supplied from the control unit 11 and a proximity detection signal Vdet supplied from the input device 2. If detecting the proximity state, the proximity detecting unit 40 derives the coordinates and the like of the proximity detection area. The proximity detecting unit 40 includes a proximity detection signal amplifying unit 42, an analog/digital (A/D) converting unit 43, a signal processing unit 44, a coordinate extracting unit 45, and a detection timing control unit 46.

The proximity detection signal amplifying unit 42 amplifies the proximity detection signal Vdet supplied from the input device 2. The proximity detection signal amplifying unit 42 may include an analog low-pass filter that removes high-frequency components (noise components) included in the proximity detection signal Vdet and extracts and outputs the component of the proximity detection signal Vdet.

Basic Principle of Capacitive Proximity Detection

Figure 2:
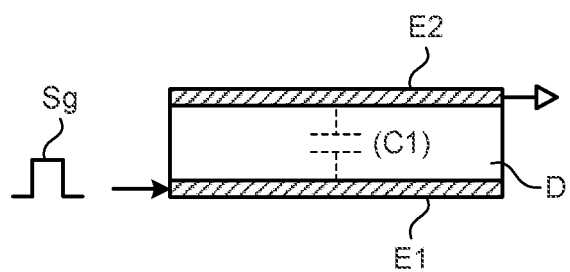
FIG. 2 is a diagram for explaining the basic principle of a capacitive proximity detection technology and illustrates a state where no external proximity object is in contact with or in proximity to an input device.
Figure 3:
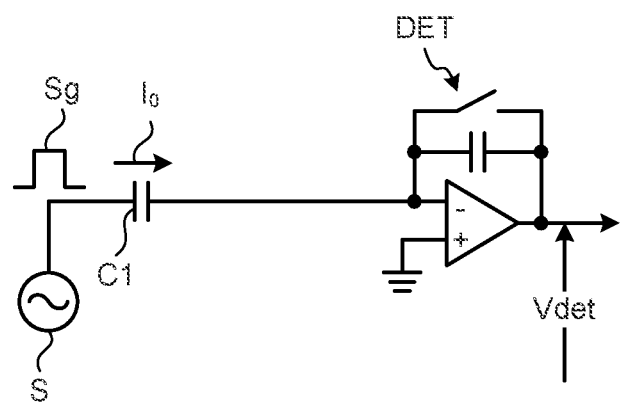
FIG. 3 is a diagram for explaining an example of an equivalent circuit in the state where no external proximity object is in contact with or in proximity to the input device illustrated in FIG. 2.
Figure 4:
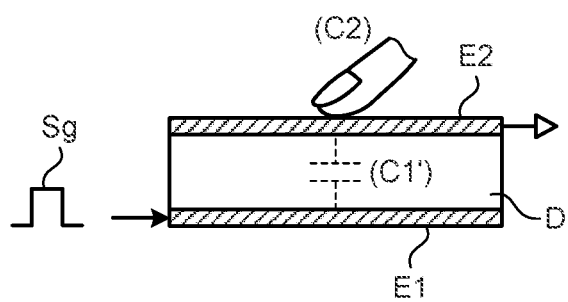
FIG. 4 is a diagram for explaining the basic principle of the capacitive proximity detection technology and illustrates a state where an external proximity object is in contact with or in proximity to the input device.
Figure 5:
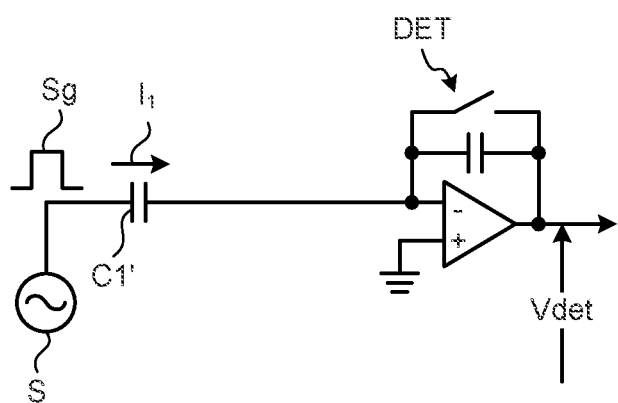
FIG. 5 is a diagram for explaining an example of the equivalent circuit in the state where the external proximity object is in contact with or in proximity to the input device illustrated in FIG. 4.
Figure 6:
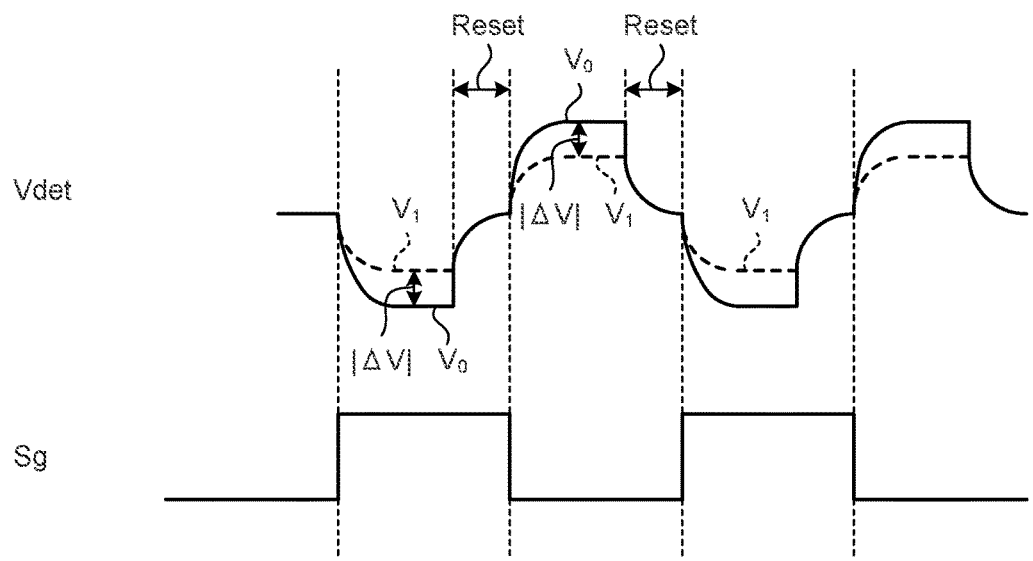
FIG. 6 is a diagram illustrating an example of waveforms of a drive signal and a proximity detection signal.

The input device 2 operates based on the basic principle of capacitive proximity detection and outputs the proximity detection signal Vdet. The following describes the basic principle of proximity detection in the input device 2 with reference to FIGS. 1 to 6. FIG. 2 is a diagram for explaining the basic principle of a capacitive proximity detection technology and illustrates a state where no external proximity object is in contact with or in proximity to the input device 2. FIG. 3 is a diagram for explaining an example of an equivalent circuit in the state where no external proximity object is in contact with or in proximity to the input device 2 illustrated in FIG. 2. FIG. 4 is a diagram for explaining the basic principle of the capacitive proximity detection technology and illustrates a state where an external proximity object is in contact with or in proximity to the input device 2. FIG. 5 is a diagram for explaining an example of the equivalent circuit in the state where the external proximity object is in contact with or in proximity to the input device 2 illustrated in FIG. 4. FIG. 6 is a diagram illustrating an example of waveforms of a drive signal and a proximity detection signal.

As illustrated in FIG. 2, for example, a capacitive element C1 includes a pair of electrodes, i.e., a drive electrode E1 and a proximity detection electrode E2, arranged facing each other with a dielectric D interposed therebetween. As illustrated in FIG. 3, one end of the capacitive element C1 is coupled to an alternating-current (AC) signal source (drive signal source) S, whereas the other end thereof is coupled to a voltage detector (proximity detecting unit) DET. The voltage detector DET is an integration circuit included in the proximity detection signal amplifying unit 42 illustrated in FIG. 1, for example.

When the AC signal source S applies a drive signal pulse Sg, which is an AC rectangular wave, at a predetermined frequency (e.g., several kilohertz to several hundred kilohertz) to the drive electrode E1 (one end of the capacitive element C1), an output waveform (proximity detection signal Vdet) is generated via the voltage detector DET coupled to the proximity detection electrode E2 (the other end of the capacitive element C1).

In a non-proximity state (including a non-contact state) where no external proximity object (e.g., a finger or a stylus pen) is in proximity to (or in contact with) the input device 2, an electric current $I_0$ depending on the capacitance value of the capacitive element C1 flows in association with charge and discharge of the capacitive element C1 as illustrated in FIGS. 2 and 3. As illustrated in FIG. 6, the voltage detector DET converts fluctuations in the electric current $I_0$ depending on the drive signal pulse Sg into fluctuations in the voltage (waveform $V_0$ indicated by the solid line).

On the other hand, in a proximity state (including a contact state) where an external proximity object is in proximity to (or in contact with) the input device 2, capacitance C2 generated by the external proximity object is in contact with or in proximity to the proximity detection electrode E2 as illustrated in FIG. 4. The presence of the capacitance C2 blocks capacitance of a fringe between the drive electrode E1 and the proximity detection electrode E2, thereby providing a capacitive element C1' having a capacitance value smaller than that of the capacitive element C1. In the equivalent circuit illustrated in FIG. 5, an electric current $I_1$ flows through the capacitive element C1'. As illustrated in FIG. 6, the voltage detector DET converts fluctuations in the electric current depending on the drive signal pulse Sg into fluctuations in the voltage (waveform $V_1$ indicated by the dotted line). In this case, the waveform $V_1$ has amplitude smaller than that of the waveform $V_0$. As a result, an absolute value $|\Delta V|$ of the voltage difference between the waveform $V_0$ and the waveform $V_1$ varies depending on the influence of an object, such as the external proximity object, approaching the input device 2 from the outside. To accurately detect the absolute value $|\Delta V|$ of the voltage difference between the waveform $V_0$ and the waveform $V_1$, the voltage detector DET preferably performs the operation with a period Reset to reset charge and discharge of a capacitor based on the frequency of the drive signal pulse Sg by switching in the circuit.

The input device 2 illustrated in FIG. 1 sequentially scans each detection block in response to the drive signal supplied from the first electrode driver 14, thereby performing proximity detection.

The input device 2 outputs the proximity detection signal Vdet for each detection block from a plurality of proximity detection electrodes, which will be described below, via the voltage detector DET illustrated in FIG. 3 or FIG. 5. The input device 2 thus supplies the proximity detection signal Vdet to the proximity detection signal amplifying unit 42 of the proximity detecting unit 40. The proximity detection signal amplifying unit 42 amplifies the proximity detection signal Vdet and supplies it to the A/D converting unit 43.

The A/D converting unit 43 is a circuit that samples an analog signal output from the proximity detection signal amplifying unit 42 at timing synchronized with the drive signal, thereby converting the analog signal into a digital signal.

The signal processing unit 44 includes a digital filter that reduces frequency components (noise components) other than the frequency at which the drive signal is sampled in the output signal from the A/D converting unit 43. The signal processing unit 44 is a logic circuit that detects whether a touch is made on the input device 2 based on the output signal from the A/D converting unit 43. The signal processing unit 44 performs processing for extracting only the voltage difference caused by the external proximity object. The signal of the voltage difference caused by the external proximity object corresponds to the absolute value $|\Delta V|$ of the difference between the waveform $V_0$ and the waveform $V_1$. The signal processing unit 44 may perform an arithmetic operation for averaging the absolute values $|\Delta V|$ per detection block, thereby calculating the average value of the absolute values $|\Delta V|$. The signal processing unit 44 thus can reduce the influence of noise. The signal processing unit 44 compares the signal of the detected voltage difference caused by the external proximity object with a predetermined threshold voltage. If the voltage difference is equal to or larger than the threshold voltage, the signal processing unit 44 determines that the external proximity object is in the proximity state. On the other hand, if the voltage difference is determined to be smaller than the threshold voltage as a result of comparison between the detected digital voltage and the predetermined threshold voltage, the signal processing unit 44 determines that the external proximity object is in the non-proximity state. The proximity detecting unit 40 thus performs proximity detection.

The coordinate extracting unit 45 is a logic circuit that derives, when a proximity state is detected by the signal processing unit 44, the coordinate position at which the proximity state is created in the plane of the detection area. The detection timing control unit 46 performs control such that the A/D converting unit 43, the signal processing unit 44, and the coordinate extracting unit 45 operate in synchronization with one another. The coordinate extracting unit 45 outputs the coordinates of the proximity object as an output signal Vout.

Figure 7:
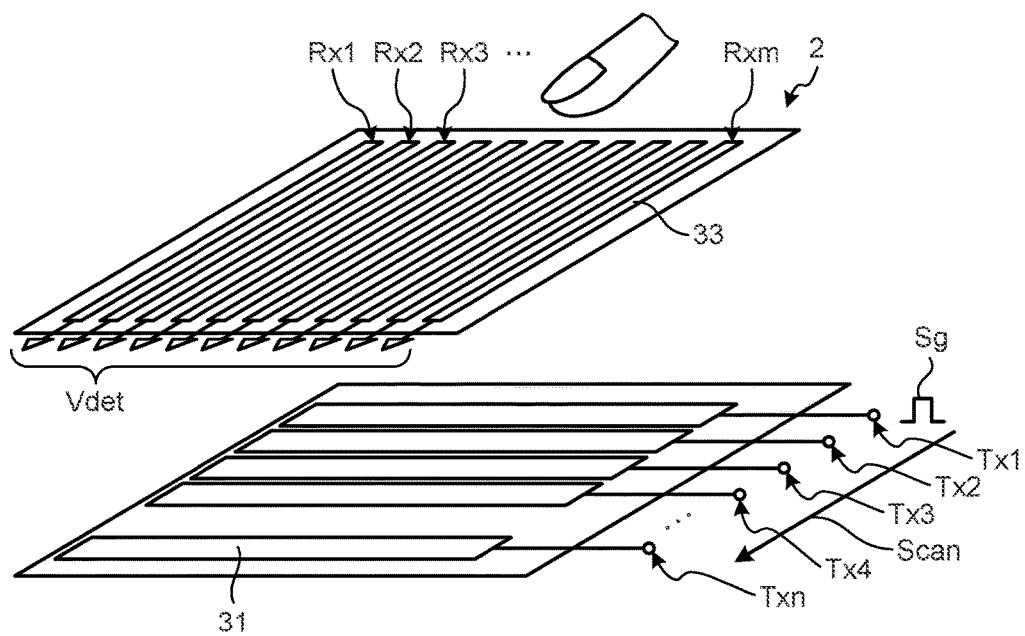
FIG. 7 is a perspective view illustrating an example of drive electrodes and proximity detection electrodes of an input device according to the first embodiment.

FIG. 7 is a perspective view illustrating an example of the drive electrodes and the proximity detection electrodes of the input device according to the first embodiment. The input device 2 includes a first electrode unit 31, and a third electrode unit 33 insulated from the first electrode unit 31. The first electrode unit 31 has a plurality of stripe electrode patterns extending in a predetermined extending direction of a conductor pattern. The electrode patterns serve as drive electrodes Tx1, Tx2, Tx3, . . . , Txn (hereinafter, which may be referred to as drive electrodes Tx) from which the drive signal pulse Sg is applied. The third electrode unit 33 has a plurality of stripe electrode patterns extending in a direction intersecting with the extending direction of the first electrode unit 31. The electrode patterns serve as proximity detection electrodes Rx1, Rx2, Rx3, . . . , Rxm (hereinafter, which may be referred to as proximity detection electrodes Rx) that output the proximity detection signal Vdet. The electrode patterns of the proximity detection electrodes Rx are coupled to respective input terminals of the proximity detection signal amplifying unit 42 of the proximity detecting unit 40.

In the input device 2 according to the first embodiment illustrated in FIG. 7, the proximity detection electrodes Rx face the drive electrodes Tx. The proximity detection electrodes Rx do not necessarily face the drive electrodes Tx and may be provided in the same layer as that of the drive electrodes Tx. The proximity detection electrodes Rx or the drive electrodes Tx do not necessarily have a stripe shape, i.e., a shape divided into a plurality of portions and may have a comb shape, for example. Alternatively, any shape can be employed for the proximity detection electrodes Rx or the first electrode unit 31 (drive electrode block), as long as being divided into a plurality of portions. In this case, the shape of the slits dividing the first electrode unit 31 may be a straight line or a curve.

The drive electrode E1 illustrated in FIG. 2 corresponds to each of the drive electrodes Tx illustrated in FIG. 7. The proximity detection electrode E2 illustrated in FIG. 2 corresponds to each of the proximity detection electrodes Rx illustrated in FIG. 7. With this configuration, capacitance corresponding to the capacitance value of the capacitive element C1 illustrated in FIG. 2 is generated at the intersections at which the drive electrodes Tx intersect with the proximity detection electrodes Rx in planar view illustrated in FIG. 7.

Figure 8:
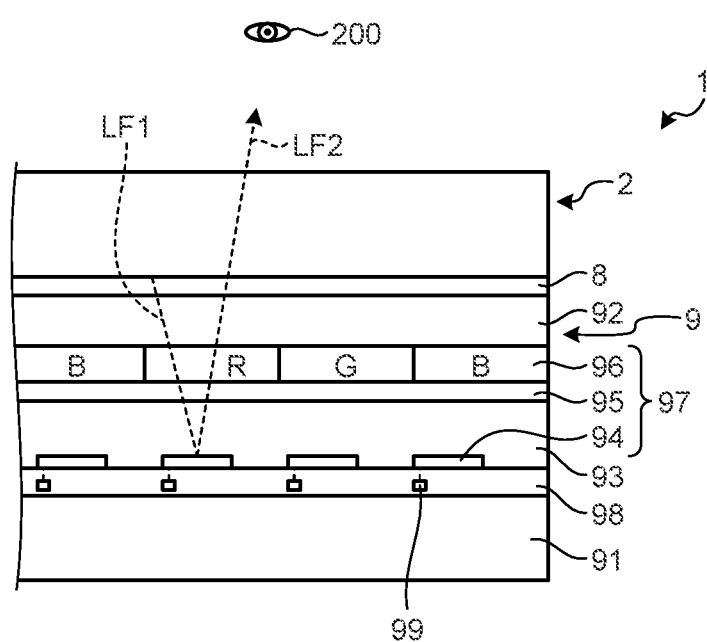
FIG. 8 is a sectional view schematically illustrating the structure of a display unit with a proximity detecting function according to the first embodiment.

The following describes the structure of the display device 1 with a proximity detecting function. FIG. 8 is a sectional view schematically illustrating the structure of the display device with a proximity detecting function according to the first embodiment. The display unit 9 according to the first embodiment is a reflective image display panel. The display unit 9 may be a transflective image display panel and simply needs to be a display device that displays an image by reflecting incident light entering from the observer 200 side. As illustrated in FIG. 8, the display unit 9 includes an array substrate 91 and a counter substrate 92 facing each other. A liquid-crystal layer 93 in which liquid-crystal elements are sealed is provided between the array substrate 91 and the counter substrate 92.

The array substrate 91 is a transparent light-transmissive substrate, such as a glass substrate. The array substrate 91 includes a plurality of pixel electrodes 94 on the surface of an insulation layer 98 on the liquid-crystal layer 93 side. The pixel electrodes 94 are coupled to signal lines via respective switching elements 99. The pixel signals Vpix described above are applied to the pixel electrodes 94. The pixel electrodes 94 are made of a material having metallic luster, such as aluminum and silver, and have light reflectivity. With this structure, the pixel electrodes 94 reflect external light or light from the input device 2.

The counter substrate 92 is a transparent light-transmissive substrate, such as a glass substrate. The counter substrate 92 includes a counter electrode 95 and color filters 96 on the surface on the liquid-crystal layer 93 side. More specifically, the counter electrode 95 is provided on the surface of the color filters 96 on the liquid-crystal layer 93 side.

The counter electrode 95 is made of a transparent light-transmissive conductive material, such as indium tin oxide (ITO) and indium zinc oxide (IZO). The counter electrode 95 is supplied with a common potential common to the pixels. When a voltage generated by an image output signal is applied between the pixel electrodes 94 and the counter electrode 95 facing each other, the pixel electrodes 94 and the counter electrode 95 generate an electric field in the liquid-crystal layer 93. The electric filed generated in the liquid-crystal layer 93 causes the liquid-crystal elements to twist and changes the birefringence, thereby adjusting the amount of light from the display unit 9 in each sub-pixel 97. While the display unit 9 is what is called a vertical-electric-field display unit, it may be a lateral-electric-field display unit that generates an electric field in a direction parallel to the display surface.

The color filter 96 of any one of a first color (e.g., red R), a second color (e.g., green G), and a third color (e.g., blue B) is provided to each sub-pixel 97 in a manner correspondingly to the pixel electrode 94. The pixel electrode 94, the counter electrode 95, and the color filter 96 of each color constitute the sub-pixel 97.

The input device 2 can output light toward the display unit 9 in an LF1 direction. The input device 2 is provided above the surface of the counter substrate 92 on the side opposite to the liquid-crystal layer 93. The display unit 9 uses the input device 2 as a front light, which will be described below, and reflects, in an LF2 direction, the light that has entered in the LF1 direction, thereby displaying an image. The pixel electrode 94 reflects, in the LF2 direction, the light that has entered in the LF1 direction from the surface on the observer 200 side (surface on which an image is displayed), for example. The input device 2 is bonded to the counter substrate 92 with an optical adhesive layer 8. The optical adhesive layer 8 is preferably made of a material having a light-scattering function. The light output from the input device 2 in the LF1 direction is scattered by the optical adhesive layer 8. With this configuration, the pixel electrode 94 is likely to be uniformly irradiated with the light from the input device 2. A polarizing plate may be further provided at the position of the optical adhesive layer 8.

Figure 9:
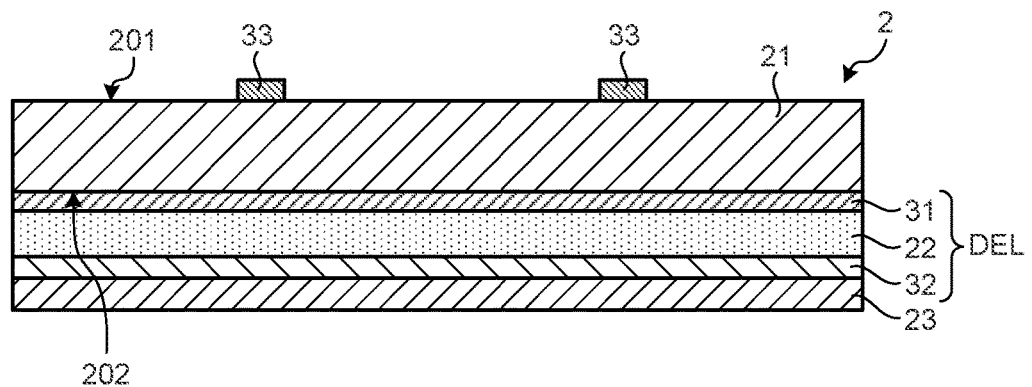
FIG. 9 is a sectional view schematically illustrating the structure of the input device according to the first embodiment.
Figure 10:
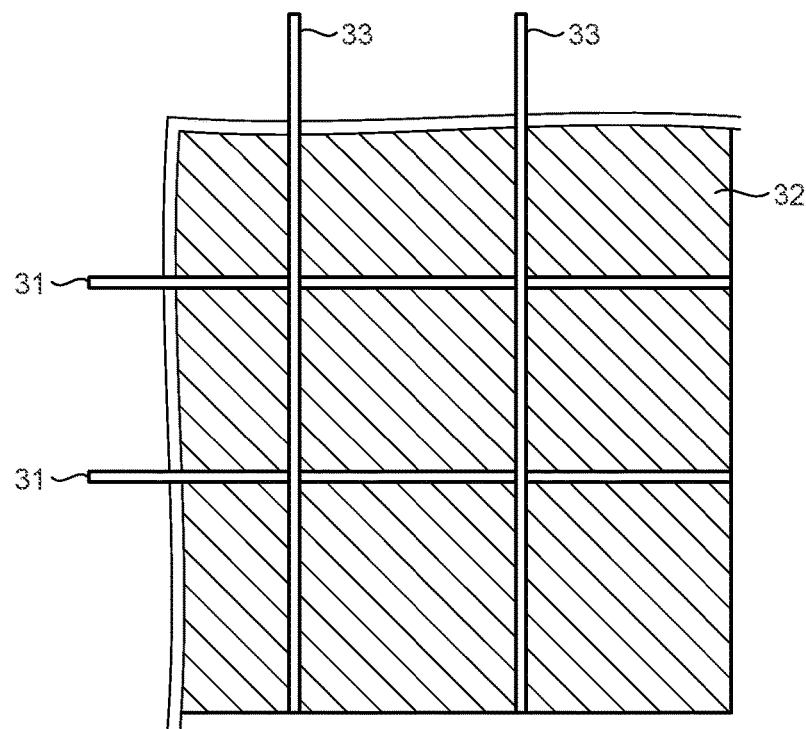
FIG. 10 is a diagram for explaining the positional relation in planar view among a first electrode unit, a second electrode unit, and a third electrode unit of the input device according to the first embodiment.

FIG. 9 is a sectional view schematically illustrating the structure of the input device according to the first embodiment. FIG. 10 is a diagram for explaining the positional relation in planar view among the first electrode unit, the second electrode unit, and the third electrode unit of the input device according to the first embodiment. As illustrated in FIGS. 9 and 10, the input device 2 includes a first substrate 21, the first electrode unit 31, a second electrode unit 32, a luminescent layer 22, and the third electrode unit 33. The second electrode unit 32 is covered with an insulating protective layer 23. The insulating protective layer 23 is not necessarily provided. The first substrate 21 is a light-transmissive substrate, such as a glass substrate, having a first surface 201 and a second surface 202. In the input device 2, the first surface 201 in FIG. 9 is provided on the observer 200 side illustrated in FIG. 8, and the second surface 202 is provided on the display unit 9 side.

The first electrode unit 31 includes a plurality of first conductive layers formed in one layer on the second surface 202 side of the first substrate 21. The first conductive layers have a shape continuously extending in one direction in planar view and are in contact with the luminescent layer 22 along the shape of the first conductive layers. The first conductive layers of the first electrode unit 31 are made of a transparent light-transmissive conductive material or a conductive metal material, such as ITO and IZO. The first conductive layers of the first electrode unit 31 can reflect light emitted from the luminescent layer 22 when they are made of a metal material having metallic luster, such as aluminum (Al), silver (Ag), and chromium (Cr), and an alloy containing these metals.

The luminescent layer 22 has a size overlapping with the first conductive layers in planar view. As illustrated in FIG. 9, the luminescent layer 22 is provided between the first electrode unit 31 and the second electrode unit 32. The luminescent layer 22 is electrically in contact with the first conductive layers of the first electrode unit 31. The luminescent layer 22 is an organic luminescent layer and contains an organic material. The luminescent layer 22 includes a hole injection layer, a hole transport layer, an organic layer, an electron transport layer, and an electron injection layer, which are not illustrated.

The second electrode unit 32 is a second conductive layer formed in a layer different from that of the first electrode unit 31. The second conductive layer is a flat film having a size overlapping with the first conductive layers in planar view. The second conductive layer of the second electrode unit 32 is electrically in contact with the entire surface of the luminescent layer 22. The conductive layer of the second electrode unit 32 is made of a transparent light-transmissive conductive material, such as ITO and IZO.

A first light-emitting element unit DEL includes the first electrode unit 31, the luminescent layer 22, and the second electrode unit 32. The luminescent layer 22 emits light by a forward-bias voltage being applied to the first electrode unit 31 and the second electrode unit 32. When the voltage is applied, the luminescent layer 22 in the first light-emitting element unit DEL emits light along the shape of the first conductive layers of the first electrode unit 31. As a result, light-emitting bands are generated in a manner continuously extending in one direction in planar view. The input device 2 thus functions as a front light that can output light to the display unit 9 illustrated in FIG. 8.

The third electrode unit 33 is provided on the first surface 201 of the first substrate 21 and is insulated from the first conductive layers of the first electrode unit 31. The first surface 201 on which the third electrode unit 33 is provided is a reference plane (coordinate input reference plane) serving as a reference for input coordinates of the proximity object.

As described above, the first electrode unit 31 corresponds to the drive electrodes Tx from which the drive signal pulse Sg is applied, whereas the third electrode unit 33 corresponds to the proximity detection electrodes Rx (refer to FIG. 7). When the input device 2 performs a proximity detection operation, the third electrode unit 33 can output, to the proximity detecting unit 40 (refer to FIG. 1), a change in the electric field between the first electrode unit 31 and the third electrode unit 33 depending on the coordinates of the proximity object present at a position overlapping with the first surface 201 of the first substrate 21 in planar view.

To manufacture the input device 2, the first substrate 21 is prepared, and the first conductive layers of the first electrode unit 31 are patterned on the second surface 202 of the first substrate 21. The luminescent layer 22 is then formed on the first conductive layers of the first electrode unit 31 in the input device 2. Before the luminescent layer 22 is formed, gaps in the first electrode unit 31 are preferably filled and planarized by an insulation layer. The second conductive layer of the second electrode unit 32 is then formed on the luminescent layer 22 in the input device 2. The protective layer 23 made of a light-transmissive insulator, such as alumina ($Al_2O_3$), is then formed in the input device 2. The third electrode unit 33 is then formed on the first surface 201 of the first substrate 21 in the input device 2. As described above, the input device 2 according to the first embodiment can be manufactured with a smaller number of etching processes, thereby reducing manufacturing cost.

First Modification of the First Embodiment

Figure 11:
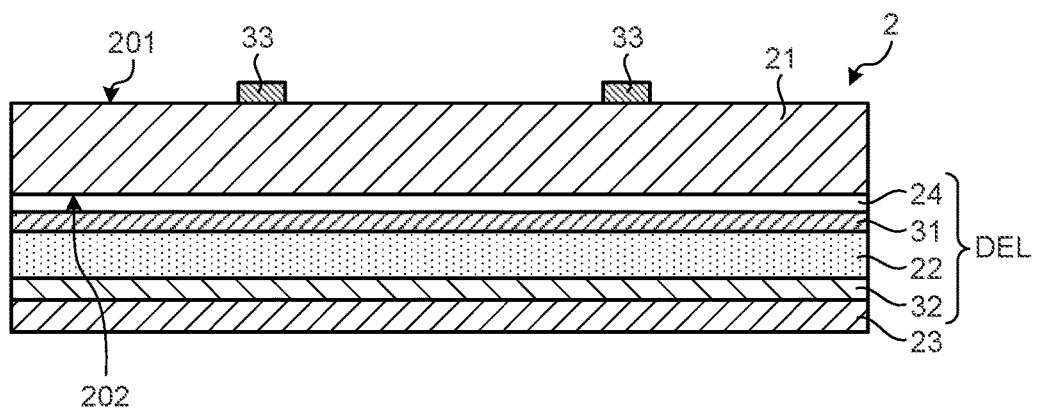
FIG. 11 is a sectional view schematically illustrating the structure of the input device according to a first modification of the first embodiment.
Figure 12:
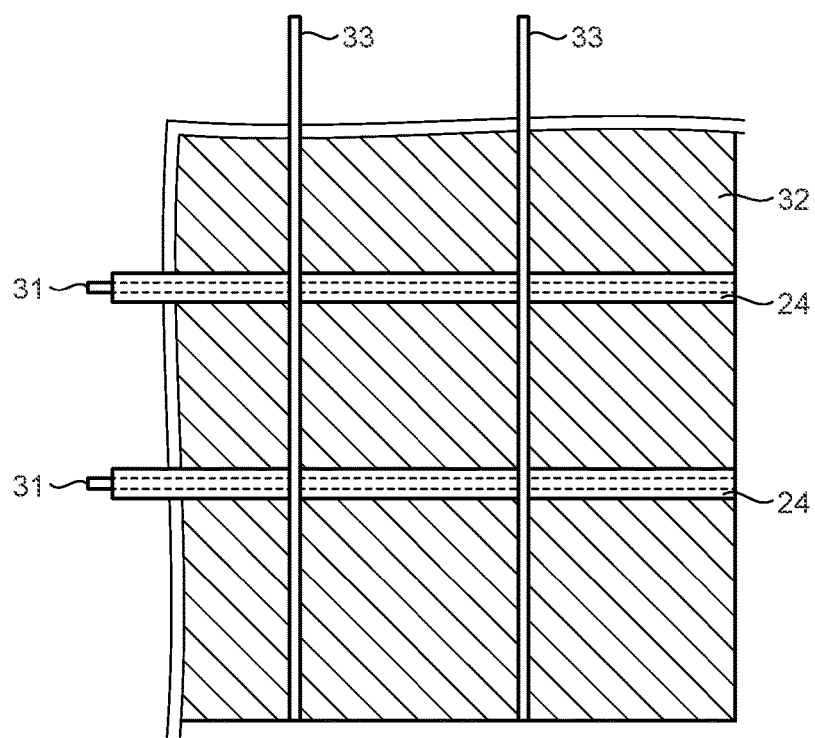
FIG. 12 is a diagram for explaining the positional relation in planar view among the first electrode unit, the second electrode unit, and the third electrode unit of the input device according to the first modification of the first embodiment.

The following describes the input device 2 according to a first modification of the first embodiment. FIG. 11 is a sectional view schematically illustrating the structure of the input device according to the first modification of the first embodiment. FIG. 12 is a diagram for explaining the positional relation in planar view among the first electrode unit, the second electrode unit, and the third electrode unit of the input device according to the first modification of the first embodiment. Components identical with those described in the first embodiment are denoted by like reference numerals, and overlapping explanation thereof will be omitted.

As illustrated in FIGS. 11 and 12, the input device 2 includes the first substrate 21, the first electrode unit 31, the second electrode unit 32, the luminescent layer 22, the third electrode unit 33, and a first light-blocking unit 24. The second electrode unit 32 is covered with the insulating protective layer 23. The insulating protective layer 23 is not necessarily provided.

The first light-blocking unit 24 is arranged between the first substrate 21 and the first electrode unit 31. The first light-blocking unit 24 is formed along the shape of the first conductive layer of the first electrode unit 31. The first light-blocking unit 24 has an area larger than that of the first conductive layer of the first electrode unit 31. The first light-blocking unit 24 can cover the whole area of the first conductive layer of the first electrode unit 31 viewed in a direction perpendicular to the first surface 201 of the first substrate 21.

The first light-blocking unit 24 may be made of any material as long as it has a light-blocking property. The first light-blocking unit 24 is preferably made of a metal material having metallic luster, such as Al, Ag, and Cr, and an alloy containing these metals to reflect light emitted from the luminescent layer 22. A first light-emitting element unit DEL thus includes the first light-blocking unit 24 provided closer to the first surface 201 of the first substrate 21 than the luminescent layer 22, thereby preventing light from leaking toward the first surface 201 of the first substrate 21.

Second Modification of the First Embodiment

Figure 13:
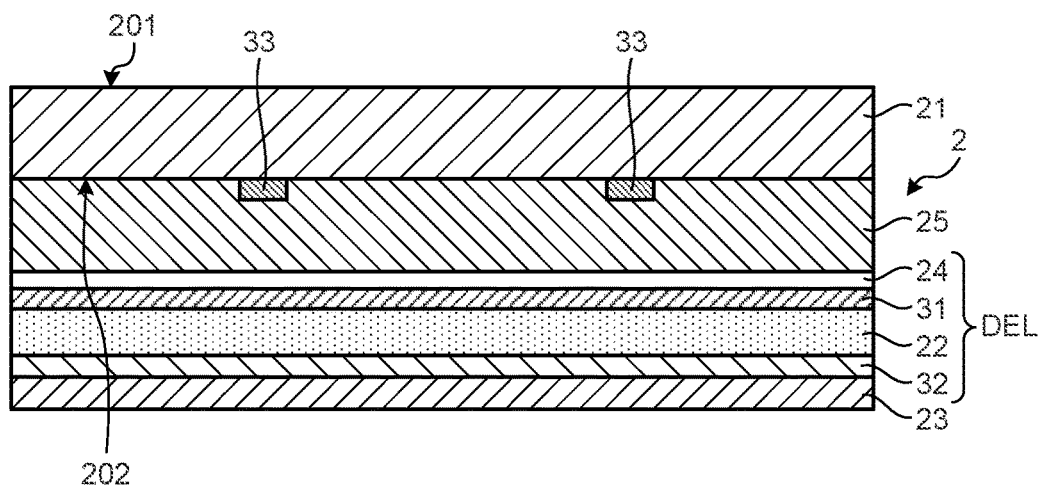
FIG. 13 is a sectional view schematically illustrating the structure of the input device according to a second modification of the first embodiment.

The following describes the input device 2 according to a second modification of the first embodiment. FIG. 13 is a sectional view schematically illustrating the structure of the input device according to the second modification of the first embodiment. In the input device according to the second modification of the first embodiment illustrated in FIG. 13, the positional relation in planar view among the first electrode unit, the second electrode unit, and the third electrode unit is the same as that illustrated in FIG. 12. Components identical with those described in the first embodiment and the first modification thereof are denoted by like reference numerals, and overlapping explanation thereof will be omitted.

The input device 2 according to the second modification of the first embodiment includes the first substrate 21, an insulation layer 25, the first electrode unit 31, the second electrode unit 32, the luminescent layer 22, the third electrode unit 33, and the first light-blocking unit 24. The third electrode unit 33 according to the second modification of the first embodiment is provided on the second surface 202 of the first substrate 21 and is insulated from the first conductive layers of the first electrode unit 31 by the insulation layer 25. The first surface 201 of the first substrate 21 on the side opposite to the second surface 202 on which the third electrode unit 33 is provided is a reference plane (coordinate input reference plane) serving as a reference for input coordinates of the proximity object.

As described above, the first electrode unit 31 corresponds to the drive electrodes Tx from which the drive signal pulse Sg is applied, whereas the third electrode unit 33 corresponds to the proximity detection electrodes Rx (refer to FIG. 7). When the input device 2 performs a proximity detection operation, the third electrode unit 33 can output, to the proximity detecting unit 40 (refer to FIG. 1), a change in the electric field between the first electrode unit 31 and the third electrode unit 33 depending on the coordinates of the proximity object present at a position overlapping with the first surface 201 of the first substrate 21 in planar view.

To manufacture the input device 2, the first substrate 21 is prepared, and third conductive layers of the third electrode unit 33 are patterned on the second surface 202 of the first substrate 21. The third conductive layers of the third electrode unit 33 are then covered with the insulation layer 25 in the input device 2. The first conductive layers of the first electrode unit 31 are then patterned on the surface of the insulation layer 25 with the first light-blocking unit 24 interposed therebetween. The luminescent layer 22 is then formed on the first conductive layers of the first electrode unit 31 in the input device 2. Before the luminescent layer 22 is formed, gaps in the first electrode unit 31 are preferably filled and planarized by an insulation layer. The second conductive layer of the second electrode unit 32 is then formed on the luminescent layer 22 in the input device 2. The protective layer 23 made of a light-transmissive insulator, such as Al$_2$O$_3$, is then formed in the input device 2. As described above, the input device 2 according to the second modification of the first embodiment can be manufactured with a smaller number of etching processes, thereby reducing manufacturing cost.

Third Modification of the First Embodiment

Figure 14:
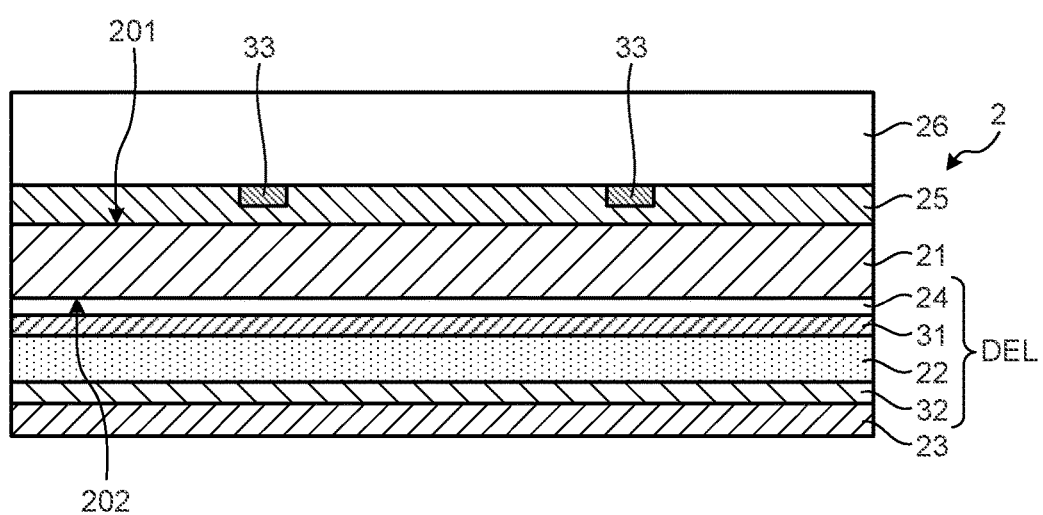
FIG. 14 is a sectional view schematically illustrating the structure of the input device according to a third modification of the first embodiment.

The following describes the input device 2 according to a third modification of the first embodiment. FIG. 14 is a sectional view schematically illustrating the structure of the input device according to the third modification of the first embodiment. In the input device according to the third modification of the first embodiment illustrated in FIG. 14, the positional relation in planar view among the first electrode unit, the second electrode unit, and the third electrode unit is the same as that illustrated in FIG. 12. Components identical with those described in the first embodiment and the first and the second modifications thereof are denoted by like reference numerals, and overlapping explanation thereof will be omitted.

The input device 2 includes a cover substrate 26, the insulation layer 25, the first substrate 21, the first electrode unit 31, the second electrode unit 32, the luminescent layer 22, the third electrode unit 33, and the first light-blocking unit 24. The cover substrate 26 is a light-transmissive substrate, such as a glass substrate. The third electrode unit 33 according to the third modification of the first embodiment is provided on the surface of the cover substrate 26 facing the first substrate 21 and on the first surface 201 side of the first substrate 21. The cover substrate 26 and the first substrate 21 are laminated with the insulation layer 25 interposed therebetween and are insulated from each other. The first surface 201 of the first substrate 21 according to the third modification of the first embodiment is a reference plane (coordinate input reference plane) serving as a reference for input coordinates of the proximity object. The surface of the cover substrate 26 on the side opposite to the side provided with the third electrode unit 33 is substantially parallel to the first surface 201 of the first substrate 21.

As described above, the first electrode unit 31 corresponds to the drive electrodes Tx from which the drive signal pulse Sg is applied, whereas the third electrode unit 33 corresponds to the proximity detection electrodes Rx (refer to FIG. 7). When the input device 2 performs a proximity detection operation, the third electrode unit 33 can output, to the proximity detecting unit 40 (refer to FIG. 1), a change in the electric field between the first electrode unit 31 and the third electrode unit 33 depending on the coordinates of the proximity object present at a position overlapping with the first surface 201 of the first substrate 21 in planar view.

To manufacture the input device 2, the first substrate 21 is prepared, and the first conductive layers of the first electrode unit 31 are patterned on the second surface 202 of the first substrate 21 with the first light-blocking unit 24 interposed therebetween. The luminescent layer 22 is then formed on the first conductive layers of the first electrode unit 31 in the input device 2. Before the luminescent layer 22 is formed, gaps in the first electrode unit 31 are preferably filled and planarized by an insulation layer. The second conductive layer of the second electrode unit 32 is then formed on the luminescent layer 22 in the input device 2. The protective layer 23 made of a light-transmissive insulator, such as Al$_2$O$_3$, is then formed in the input device 2. The third electrode unit 33 is then formed on one surface of the cover substrate 26 in the input device 2. The first surface 201 of the first substrate 21 is then fixed so as to face the surface of the cover substrate 26 on which the third electrode unit 33 is formed with the insulation layer 25 interposed therebetween in the input device 2. The insulation layer 25 is an insulating double-sided tape, for example. As described above, the input device 2 according to the third modification of the first embodiment can be manufactured with a smaller number of etching processes, thereby reducing manufacturing cost.

As described above, the first electrode unit 31 according to the first embodiment and the modifications thereof functions as electrodes of the first light-emitting element unit DEL and as the drive electrodes Tx of the input device 2. This configuration can reduce the thickness of the input device 2.

Drive Control

The following describes drive control of the input device 2 according to the first embodiment and the first to the third modifications thereof with reference to FIGS. 1, 7, and 15 to 23. When the input device 2 performs a proximity detection operation, the first electrode driver 14 illustrated in FIG. 1 performs driving to sequentially scan the drive electrodes Tx illustrated in FIG. 7 in a time-division manner. As a result, the drive electrodes Tx of the first electrode unit 31 are sequentially selected in a scanning direction Scan. The input device 2 then outputs the proximity detection signal Vdet from the proximity detection electrodes Rx. The first electrode driver 14 of the input device 2 may perform driving to sequentially scan detection blocks each including a plurality of drive electrodes Tx illustrated in FIG. 7 in a time-division manner.

The first electrode unit 31 functions as electrodes of the first light-emitting element unit DEL and as the drive electrodes Tx of the input device 2. Therefore, when the drive signal pulse Sg is applied to the drive electrodes Tx of the first electrode unit 31, the first light-emitting element unit DEL may possibly emit light even if not necessary. To address this, the input device 2 according to the first embodiment and the modifications thereof employs a driving method for suppressing unintended emission of light from the first light-emitting element unit DEL even when the drive signal pulse Sg is applied to the drive electrodes Tx of the first electrode unit 31.

Figure 15:
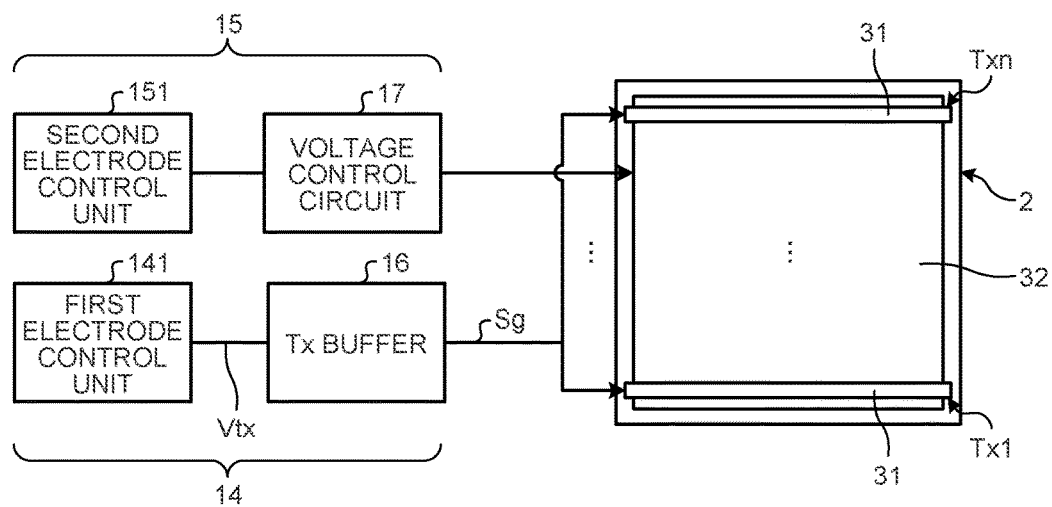
FIG. 15 is a diagram for explaining a first drive electrode driver and a second drive electrode driver according to the first embodiment.

FIG. 15 is a diagram for explaining a first drive electrode driver and a second drive electrode driver according to the first embodiment. The first electrode driver 14 includes a first electrode control unit 141 and a Tx buffer 16. The first electrode control unit 141 generates a drive signal Vtx based on the control signal supplied from the control unit 11 and supplies it to the Tx buffer 16. Based on the drive signal Vtx, the Tx buffer 16 supplies the amplified drive signal pulse Sg to the drive electrode Txn (a part of the first electrode unit 31) sequentially selected in the scanning direction Scan.

The second electrode driver 15 includes a second electrode control unit 151 and a voltage control circuit 17. The second electrode control unit 151 supplies electric power at a certain voltage to the voltage control circuit 17. The voltage control circuit 17 controls the voltage supplied to the second electrode unit 32 of the input device 2 based on the control signal supplied from the control unit 11.

Figure 16:
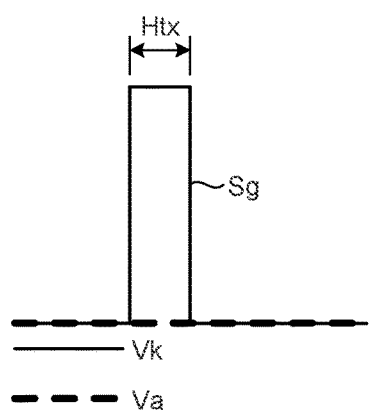
FIG. 16 is a diagram for explaining voltages of the first electrode unit and the second electrode unit in a drive electrode selection period in a state where a first light-emitting element is turned off.
Figure 17:
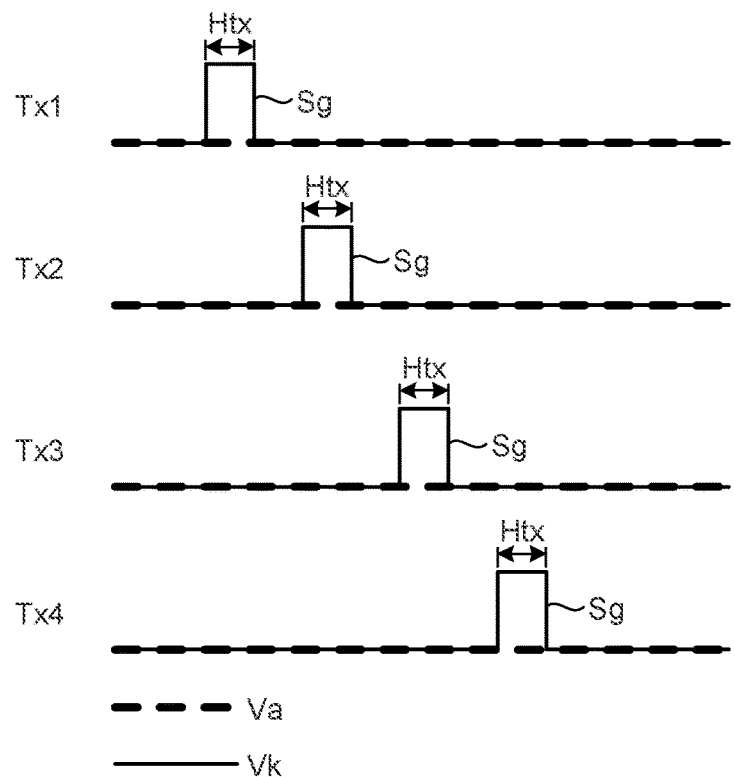
FIG. 17 is a diagram for explaining a scanning state at the time of performing proximity detection in the state where the first light-emitting element is turned off.
Figure 18:
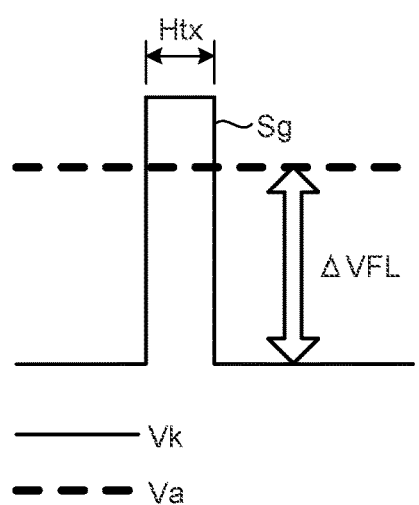
Figure 19:
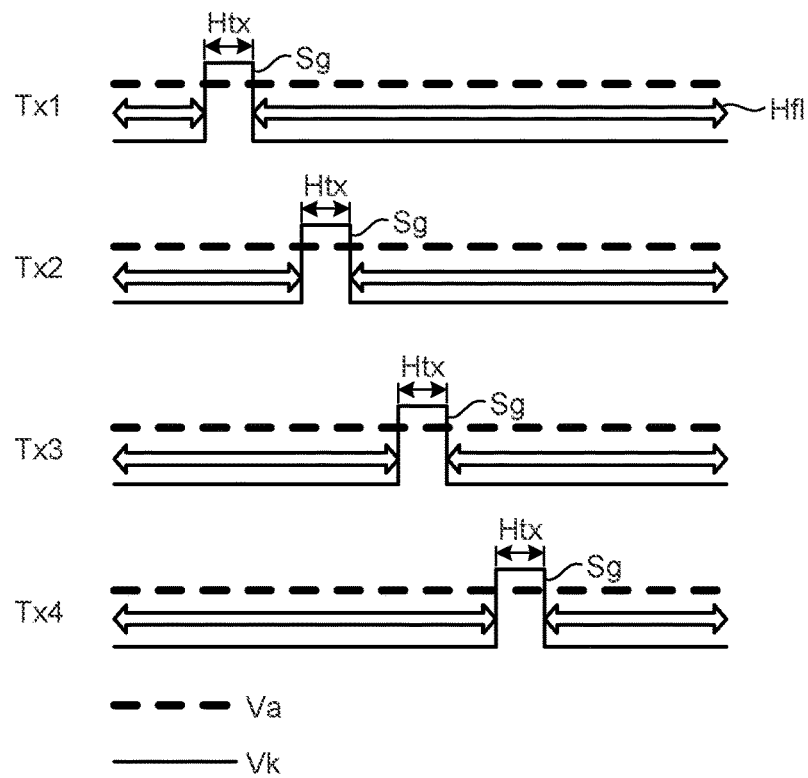

FIG. 16 is a diagram for explaining voltages of the first electrode unit and the second electrode unit in a drive electrode selection period in a state where a first light-emitting element is turned off. FIG. 17 is a diagram for explaining a scanning state at the time of proximity detection in the state where the first light-emitting element is turned off. FIG. 18 is a diagram for explaining voltages of the first electrode unit and the second electrode unit in the drive electrode selection period in a state where the first light-emitting element is turned on. FIG. 19 is a diagram for explaining the scanning state in proximity detection in the state where the first light-emitting element is turned on. In FIGS. 16 to 19, the first electrode unit 31 serves as a cathode of the first light-emitting element unit DEL, whereas the second electrode unit 32 serves as an anode of the first light-emitting element unit DEL.

To turn off the first light-emitting element unit DEL, the voltage control circuit 17 makes a voltage Va of the second electrode unit 32 closer to a voltage Vk of the first electrode unit 31, thereby preventing the voltage difference between the voltage Vk of the first electrode unit 31 and the voltage Va of the second electrode unit 32 from reaching a forward light-emitting drive voltage. In this state, the first electrode driver 14 applies the drive signal pulse Sg, the rising direction of which is a reverse-bias direction, between the first electrode unit 31 and the second electrode unit 32 as illustrated in FIG. 16. With this configuration, even when the drive signal pulse Sg is applied in a drive selection period Htx, only a reverse-bias voltage difference is applied between the first electrode unit 31 and the second electrode unit 32. As a result, emission of light from the first light-emitting element unit DEL is suppressed.

When the first electrode driver 14 performs driving to sequentially scan the drive electrodes Tx1 to Tx4 in a time-division manner as illustrated in FIG. 17, emission of light from the first light-emitting element unit DEL is suppressed by any of the drive signal pulses Sg applied to the drive electrodes Tx1 to Tx4.

To turn on the first light-emitting element unit DEL, the voltage control circuit 17 performs control to make the difference between the voltage Vk of the first electrode unit 31 and the voltage Va of the second electrode unit 32 closer to a forward-bias light-emitting drive voltage ΔVFL. The voltage control circuit 17 thus applies a forward-bias voltage of equal to or larger than the light-emitting drive voltage ΔVFL between the first electrode unit 31 and the second electrode unit 32 as illustrated in FIG. 18. At this time, the first electrode driver 14 applies the drive signal pulse Sg, the rising direction of which is the reverse-bias direction, between the first electrode unit 31 and the second electrode unit 32. As a result, the light-emitting drive voltage ΔVFL is applied to the first light-emitting element unit DEL except in the drive selection period Htx when the drive signal pulse Sg is applied. Consequently, the first light-emitting element unit DEL emits light in a lighting period Hfl during which the light-emitting drive voltage ΔVFL is being applied as illustrated in FIG. 19.

When the first electrode driver 14 performs driving to sequentially scan the drive electrodes Tx1 to Tx4 in a time-division manner, the voltage difference between the first electrode unit 31 and the second electrode unit 32 is made equal to or smaller than the light-emitting drive voltage ΔVFL in the drive selection period Htx. As a result, emission of light from the first light-emitting element unit DEL is temporarily suppressed by any of the drive signal pulses Sg applied to the drive electrodes Tx1 to Tx4. Because the drive selection period Htx is temporary in which emission of light from the first light-emitting element unit DEL is suppressed, turning-off or reduction of light emission from the first light-emitting element unit DEL is hard to recognize. As a result, the lighting amount of the first light-emitting element unit DEL varies depending on the voltage Va of the second electrode unit 32 controlled by the voltage control circuit 17 based on an instruction from the control unit 11.

Figure 20:
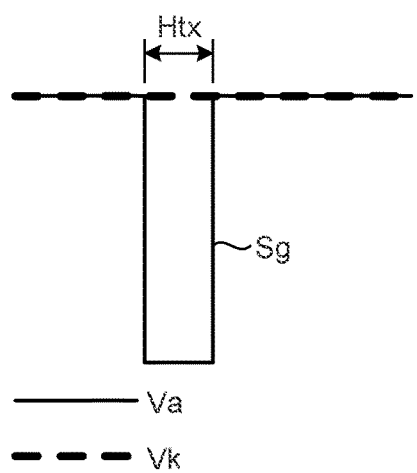
FIG. 20 is a diagram for explaining voltages of the first electrode unit and the second electrode unit in the drive electrode selection period in a state where the first light-emitting element is turned off.
Figure 21:
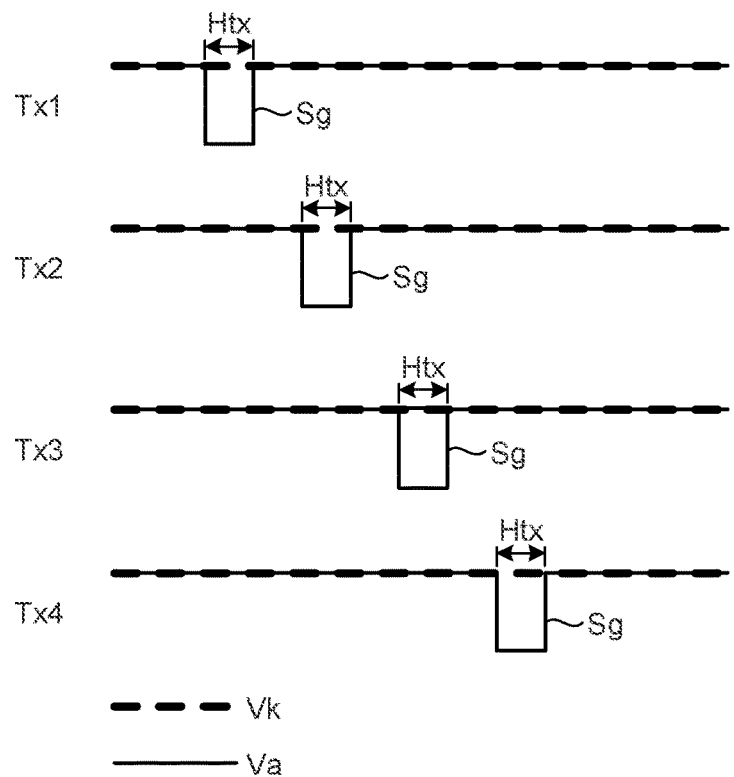
FIG. 21 is a diagram for explaining the scanning state at the time of proximity detection in the state where the first light-emitting element is turned off.
Figure 22:
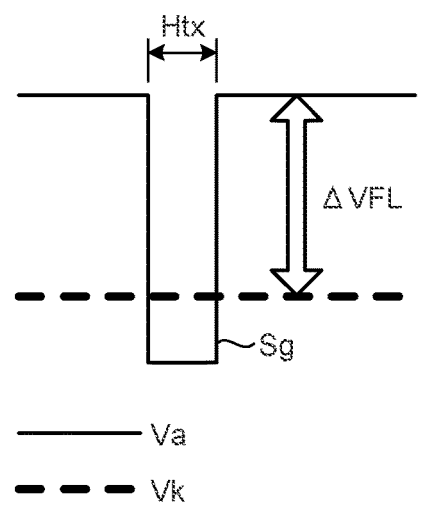
Figure 23:
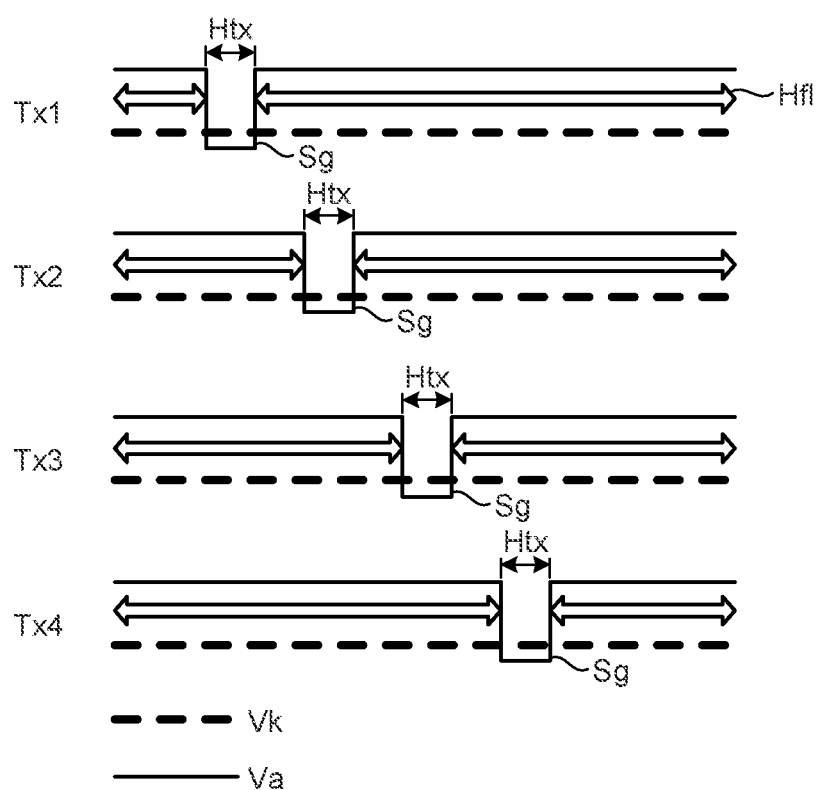

The first electrode unit 31 may serve as an anode of the first light-emitting element unit DEL, and the second electrode unit 32 may serve as a cathode of the first light-emitting element unit DEL. FIG. 20 is a diagram for explaining voltages of the first electrode unit and the second electrode unit in the drive electrode selection period in a state where the first light-emitting element is turned off. FIG. 21 is a diagram for explaining the scanning state at the time of proximity detection in the state where the first light-emitting element is turned off. FIG. 22 is a diagram for explaining voltages of the first electrode unit and the second electrode unit in the drive electrode selection period in a state where the first light-emitting element is turned on. FIG. 23 is a diagram for explaining the scanning state at the time of proximity detection in the state where the first light-emitting element is turned on. In FIGS. 20 to 23, the first electrode unit 31 serves as an anode of the first light-emitting element unit DEL, whereas the second electrode unit 32 serves as a cathode of the first light-emitting element unit DEL.

To turn off the first light-emitting element unit DEL, the voltage control circuit 17 makes the voltage Vk of the second electrode unit 32 closer to the voltage Va of the first electrode unit 31, thereby preventing the voltage difference between the voltage Va of the first electrode unit 31 and the voltage Vk of the second electrode unit 32 from reaching the forward light-emitting drive voltage. In this state, the first electrode driver 14 applies the drive signal pulse Sg, the rising direction of which is the reverse-bias direction, between the first electrode unit 31 and the second electrode unit 32 as illustrated in FIG. 20. Because the first electrode unit 31 and the second electrode unit 32 illustrated in FIG. 20 have a polarity different from that illustrated in FIG. 16, the reverse-bias direction is also opposite to that illustrated in FIG. 16. With this configuration, even when the drive signal pulse Sg is applied in the drive selection period Htx, emission of light from the first light-emitting element unit DEL is suppressed. Even when the first electrode driver 14 performs driving to sequentially scan the drive electrodes Tx1 to Tx4 in a time-division manner as illustrated in FIG. 21, emission of light from the first light-emitting element unit DEL is suppressed by any of the drive signal pulses Sg.

To turn on the first light-emitting element unit DEL, the voltage control circuit 17 performs control to make the difference between the voltage Va of the first electrode unit 31 and the voltage Vk of the second electrode unit 32 closer to the forward-bias light-emitting drive voltage ΔVFL. As illustrated in FIG. 22, the voltage control circuit 17 applies a forward-bias voltage of equal to or larger than the light-emitting drive voltage ΔVFL between the first electrode unit 31 and the second electrode unit 32. The first electrode driver 14 applies the voltage Vk of the second electrode unit 32 as a voltage common to all the first conductive layers (drive electrodes Tx1 to Txn) of the first electrode unit 31. At this time, the first electrode driver 14 applies the drive signal pulse Sg, the rising direction of which is the reverse-bias direction, between the first electrode unit 31 and the second electrode unit 32. As a result, the light-emitting drive voltage ΔVFL is applied to the first light-emitting element unit DEL except in the drive selection period Htx when the drive signal pulse Sg is applied.

As illustrated in FIG. 23, the first light-emitting element unit DEL emits light in the lighting period Hfl during which the light-emitting drive voltage ΔVFL is being applied. The first electrode driver 14 applies the drive signal pulse Sg to the drive electrodes Tx selected by the first electrode driver 14 driving to sequentially scan the drive electrodes Tx1 to Tx4 in a time-division manner, for example. In the drive selection period Htx, the drive signal pulse Sg makes the voltage difference between the first electrode unit 31 and the second electrode unit 32 equal to or smaller than the light-emitting drive voltage ΔVFL. If the forward-bias light-emitting drive voltage ΔVFL at which the first light-emitting element unit DEL emits light fails to be applied, emission of light from the first light-emitting element unit DEL is temporarily suppressed.

Because the drive selection period Htx is temporary in which emission of light from the first light-emitting element unit DEL is suppressed, turning-off or reduction of light emission from the first light-emitting element unit DEL is hard to recognize. Even if the voltage difference that causes the first light-emitting element unit DEL to emit light can be made in the drive selection period Htx, emission of light, turning-off or reduction of light emission, and then emission of light from the first light-emitting element unit DEL are sequentially performed, and thus a sense of incongruity is hardly recognized. As a result, the lighting amount of the first light-emitting element unit DEL varies depending on the voltage Vk of the second electrode unit 32 controlled by the voltage control circuit 17 based on an instruction from the control unit 11.

As described above, in the input device 2 according to the first embodiment and the modifications thereof, the first electrode unit 31 includes a plurality of first conductive layers formed in one layer, and the second conductive layer of the second electrode unit 32 has a size overlapping with the first conductive layers in planar view. The drive signal pulses Sg is applied to a part of the first conductive layers of the first electrode unit 31. The drive signal pulse Sg rises in the reverse-bias direction opposite to the forward-bias voltage applied between the first conductive layers of the first electrode unit 31 and the second conductive layer of the second electrode unit 32 at which the first light-emitting element unit DEL emits light.

Specifically, the input device 2 according to the first embodiment and the modifications thereof includes the first electrode driver 14, the second electrode driver 15, and the proximity detecting unit 40. The first electrode driver 14 supplies a voltage to the first electrode unit 31. The second electrode driver 15 supplies a voltage to the second electrode unit 32. The proximity detecting unit 40 detects a change in the electric field between the first electrode unit 31 and the third electrode unit 33 depending on the coordinates of the proximity object present at a position overlapping with the first surface 201 of the first substrate 21 in planar view as the detection signal Vdet in response to the drive signal pulse Sg. As described above, the first electrode driver 14 scans a part of the first conductive layers of the first electrode unit 31 as a detection block of drive electrodes in a time-division manner. The first electrode driver 14 then supplies the drive signal pulse Sg to the scanned part of the first conductive layers (drive electrodes Tx) of the first electrode unit 31.

In a case where the input device 2 according to the first embodiment and the modifications thereof functions as a front light, the second electrode driver 15 applies a forward-bias voltage between the first electrode unit 31 and the second electrode unit 32, thereby applying the light-emitting drive voltage ΔVFL. As a result, the first light-emitting element unit DEL emits light. The second electrode driver 15 controls the voltage value equal to or larger than the light-emitting drive voltage ΔVFL, thereby controlling the lighting amount of the first light-emitting element unit DEL.

With this configuration, even when the drive signal pulse Sg is applied to a part of the first conductive layers, the input device 2 suppresses emission of light from the first light-emitting element unit DEL. Even when the drive signal pulse Sg is applied to the drive electrodes Tx of the first electrode unit 31, the input device 2 can suppress unintended emission of light from the first light-emitting element unit DEL.

Second Embodiment

Figure 24:
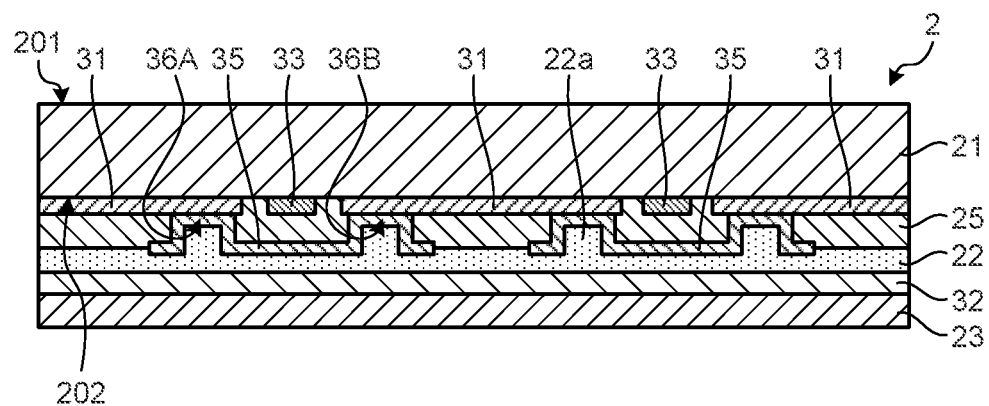
FIG. 24 is a sectional view schematically illustrating the structure of the input device according to a second embodiment of the present invention.
Figure 25:
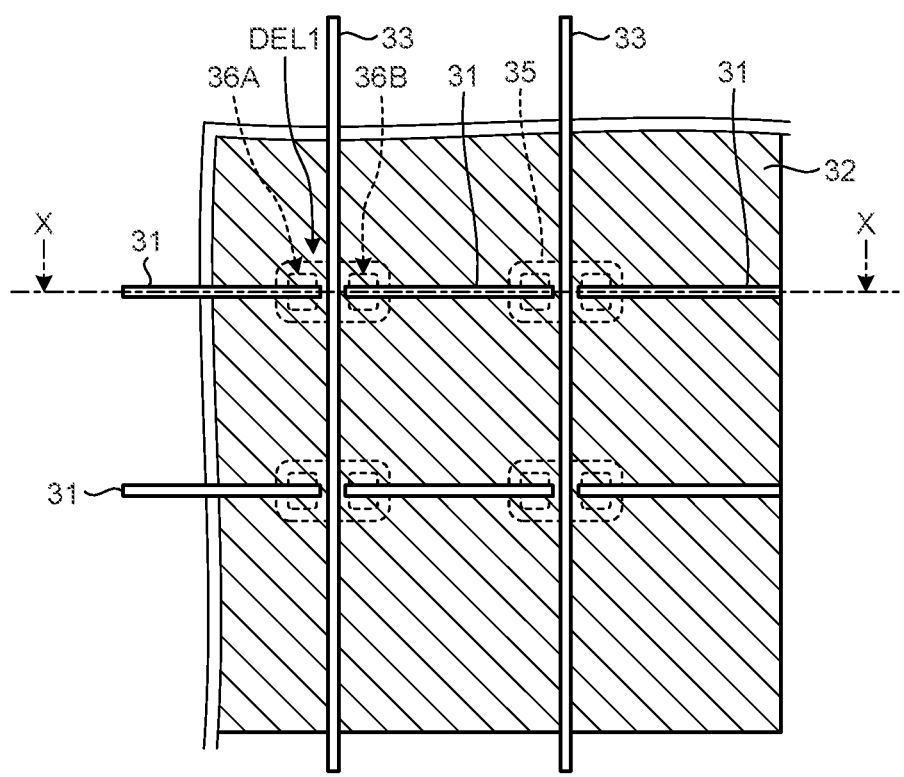
FIG. 25 is a diagram for explaining the positional relation in planar view among the first electrode unit, the second electrode unit, and the third electrode unit of the input device according to the second embodiment.

The following describes the input device 2 according to a second embodiment of the present invention. FIG. 24 is a sectional view schematically illustrating the structure of the input device according to the second embodiment. FIG. 25 is a diagram for explaining the positional relation in planar view among the first electrode unit, the second electrode unit, and the third electrode unit of the input device according to the second embodiment. The section illustrated in FIG. 24 is a section along line X-X in FIG. 25. Components identical with those described in the first embodiment and the modifications thereof are denoted by like reference numerals, and overlapping explanation thereof will be omitted.

As illustrated in FIGS. 24 and 25, the input device 2 according to the second embodiment includes the first substrate 21, the first electrode unit 31, the second electrode unit 32, the luminescent layer 22, the third electrode unit 33, the insulation layer 25, and fourth conductive layers 35. The second electrode unit 32 is covered with the insulating protective layer 23. The insulating protective layer 23 is not necessarily provided. The first substrate 21 is a light-transmissive substrate, such as a glass substrate, having the first surface 201 and the second surface 202. In the input device 2, the first surface 201 in FIG. 24 is arranged on the observer 200 side illustrated in FIG. 8, and the second surface 202 is arranged on the display unit 9 side.

As illustrated in FIG. 24, the first electrode unit 31 is a plurality of first conductive layers formed in one layer on the second surface 202 of the first substrate 21. As illustrated in FIGS. 24 and 25, the first conductive layers of the first electrode unit 31 have a shape continuously extending in one direction in planar view. The insulation layer 25 is provided between the first electrode unit 31 and the luminescent layer 22.

As illustrated in FIG. 24, the third electrode unit 33 is a plurality of third conductive layers formed in one layer on the second surface 202 of the first substrate 21. As illustrated in FIGS. 24 and 25, the third conductive layers of the third electrode unit 33 have a shape continuously extending in the direction intersecting with the first conductive layers of the first electrode unit 31 in planar view. The insulation layer 25 is provided between the third electrode unit 33 and the luminescent layer 22.

Each first conductive layer of the first electrode unit 31 is divided by the third conductive layers at the portions where the first conductive layer of the first electrode unit 31 intersects with the third conductive layers of the third electrode unit 33. The first conductive layers of the first electrode unit 31 are insulated from the third conductive layers of the third electrode unit 33 by the insulation layer 25. Each of the fourth conductive layers 35 couples the ends of the first conductive layers divided by the third conductive layer at the portion where the first conductive layer of the first electrode unit 31 intersects with the third conductive layer of the third electrode unit 33. The fourth conductive layers 35 are bypass layers crossing over the third conductive layer in a manner insulated therefrom. Examples of the material of the fourth conductive layers 35 include, but are not limited to, a metal material having metallic luster, such as Al, Ag, and Cr, an alloy containing these metals. With this structure, the fourth conductive layers 35 can reflect light emitted from the luminescent layer 22.

The first conductive layers of the first electrode unit 31 are made of a transparent light-transmissive conductive material or a conductive metal material, such as ITO or IZO. The first conductive layers of the first electrode unit 31 are preferably made of a metal material having metallic luster, such as Al, to reflect light emitted from the luminescent layer 22.

The luminescent layer 22 has a size overlapping with the first conductive layers in planar view. As illustrated in FIG. 24, the luminescent layer 22 is provided between the first electrode unit 31 and the second electrode unit 32 and is electrically coupled to the first electrode unit 31 via the fourth conductive layers 35. Specifically, as illustrated in FIG. 24, the luminescent layer 22 has protrusions 22a protruding toward the second surface 202. The insulation layer 25 is provided between the first electrode unit 31 and the luminescent layer 22. The luminescent layer 22 is electrically in contact with the first conductive layers of the first electrode unit 31 at the protrusions 22a via the fourth conductive layers 35. First contact portions 36A and 36B are portions electrically in contact with the first conductive layers of the first electrode unit 31 at the protrusions 22a via the fourth conductive layers 35. In other words, the first electrode unit 31 is electrically coupled to the fourth conductive layers 35 at the first contact portions 36A and 36B. The luminescent layer 22 is electrically coupled to the fourth conductive layers 35. The luminescent layer 22 has an organic material and includes a hole injection layer, a hole transport layer, an organic layer, an electron transport layer, and an electron injection layer, which are not illustrated.

The second electrode unit 32 is a second conductive layer formed in a layer different from that of the first electrode unit 31. The second conductive layer is a flat film having a size overlapping with the first conductive layers in planar view. The second conductive layer of the second electrode unit 32 is electrically in contact with the entire surface of the luminescent layer 22. The conductive layer of the second electrode unit 32 is made of a transparent light-transmissive conductive material, such as ITO and IZO.

A first light-emitting element unit DEL1 includes the first electrode unit 31, the luminescent layer 22, and the second electrode unit 32. When a forward-bias voltage is applied to the first electrode unit 31 and the second electrode unit 32, the luminescent layer 22 emits light. When the voltage is applied, the luminescent layer 22 in the first light-emitting element unit DEL1 can emit light along the shape of the fourth conductive layer 35 electrically coupled to the first electrode unit 31. As a result, light-emitting portions are generated partially in planar view. The input device 2 thus functions as a front light that can output light to the display unit 9 illustrated in FIG. 8.

The third electrode unit 33 is provided on the second surface 202 of the first substrate 21 and is insulated from the first conductive layers of the first electrode unit 31. The first surface 201 on the side opposite to the second surface 202 on which the third electrode unit 33 is provided is a reference plane (coordinate input reference plane) serving as a reference for input coordinates of the proximity object.

As described above, the first electrode unit 31 corresponds to the drive electrodes Tx on from which the drive signal pulse Sg is applied, whereas the third electrode unit 33 corresponds to the proximity detection electrodes Rx (refer to FIG. 7). When the input device 2 performs a proximity detection operation, the third electrode unit 33 can output, to the proximity detecting unit 40 (refer to FIG. 1), a change in the electric field between the first electrode unit 31 and the third electrode unit 33 depending on the coordinates of the proximity object present at a position overlapping with the first surface 201 of the first substrate 21 in planar view.

To manufacture the input device 2, the first substrate 21 is prepared, and the first conductive layers of the first electrode unit 31 and the third conductive layers of the third electrode unit 33 are simultaneously patterned on the second surface 202 of the first substrate 21. The insulation layer 25 is then formed in a manner covering the first conductive layers of the first electrode unit 31 and the third conductive layers of the third electrode unit 33 in the input device 2. A part of the insulation layer 25 is then etched by wet etching or dry etching, for example, to expose positions corresponding to the first contact portions 36A and 36B on the first conductive layers of the first electrode unit 31. The fourth conductive layers 35 are then formed on the surface of the insulation layer 25 and the first contact portions 36A and 36B in a manner coupling the ends of the first conductive layers of the first electrode unit 31 divided by the third conductive layers of the third electrode unit 33 in the input device 2. The luminescent layer 22 is then formed in a manner covering the insulation layer 25 and the fourth conductive layers 35. The second conductive layer of the second electrode unit 32 is then formed on the luminescent layer 22 in the input device 2. The protective layer 23 made of a light-transmissive insulator, such as $Al_2O_3$, is then formed in the input device 2. As described above, the first conductive layers of the first electrode unit 31 and the third conductive layers of the third electrode unit 33 are simultaneously formed in the input device 2 according to the second embodiment, thereby reducing manufacturing cost.

The first conductive layers of the first electrode unit 31 and the third conductive layers of the third electrode unit 33 are formed in a single layer in the input device 2. This configuration can reduce the thickness of the input device 2.

First Modification of the Second Embodiment

Figure 26:
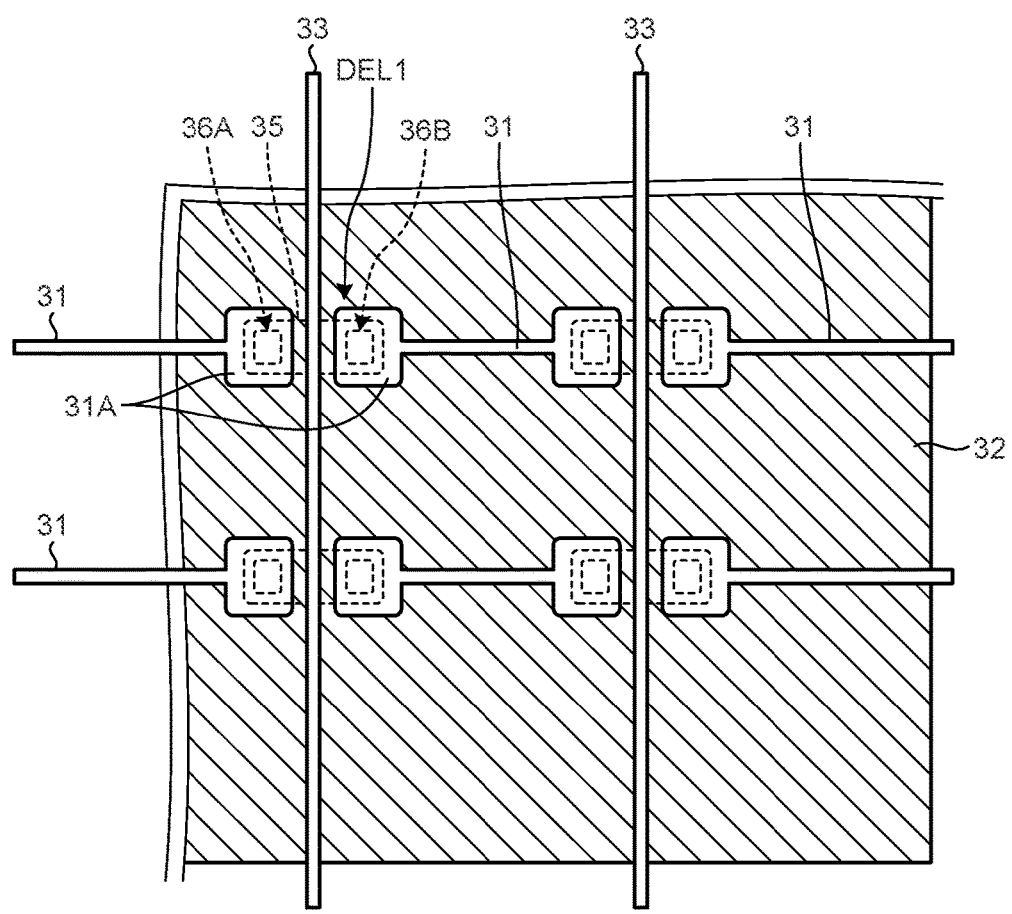
FIG. 26 is a diagram for explaining the positional relation in planar view among the first electrode unit, the second electrode unit, and the third electrode unit of the input device according to a first modification of the second embodiment.

The following describes the input device 2 according to a first modification of the second embodiment. FIG. 26 is a diagram for explaining the positional relation in planar view among the first electrode unit, the second electrode unit, and the third electrode unit of the input device according to the first modification of the second embodiment. Components identical with those described in the first and the second embodiments are denoted by like reference numerals, and overlapping explanation thereof will be omitted.

First light-blocking portions 31A are provided in the same layer as that of the first conductive layers of the first electrode unit 31. The first light-blocking portions 31A are wide portions in which the width of the first conductive layer is broadened in the direction intersecting with the extending direction of the first conductive layer of the first electrode unit 31. The length of the first light-blocking portions 31A in the intersecting direction is longer than the maximum length of the fourth conductive layer 35 in the intersecting direction. The first light-blocking portions 31A can cover the first contact portions 36A and 36B of the fourth conductive layer 35 viewed in a direction perpendicular to the first surface 201 of the first substrate 21. This configuration can decrease the resistance at the first contact portions 36A and 36B, thereby increasing the light emission efficiency of the first light-emitting element unit DEL1.

The first light-blocking portions 31A have a light-blocking property and may be made of any material as long as having a light-blocking property. The first light-blocking portions 31A are made of a metal material having metallic luster, such as Al, Ag, and Cr, and an alloy containing these metals to reflect light emitted from the luminescent layer 22. The first light-blocking portions 31A are preferably made of the same material as that of the first conductive layers of the first electrode unit 31 for simpler fabrication. As described above, the first light-emitting element units DEL1 each include the first light-blocking portions 31A, thereby suppressing leakage of light toward the first surface 201 of the first substrate 21.

Second Modification of the Second Embodiment

Figure 27:
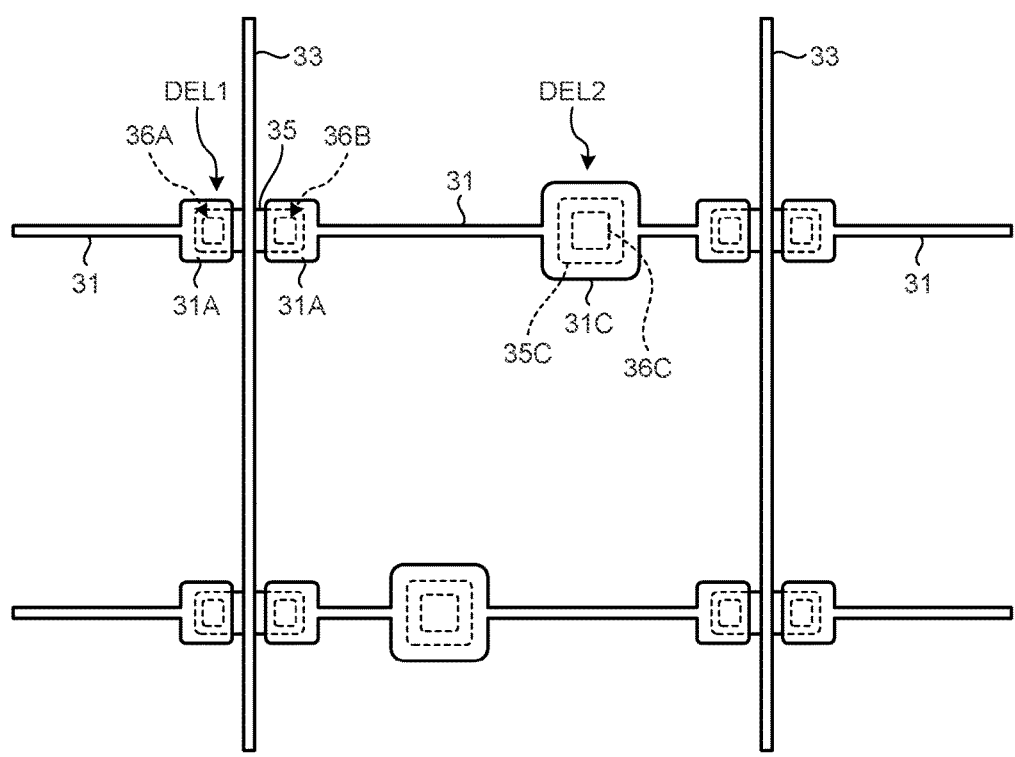
FIG. 27 is a diagram for explaining the positional relation in planar view between the first electrode unit and the third electrode unit of the input device according to a second modification of the second embodiment.

The following describes the input device 2 according to a second modification of the second embodiment. FIG. 27 is a diagram for explaining the positional relation in planar view between the first electrode unit and the third electrode unit of the input device according to the second modification of the second embodiment. The second electrode unit 32 is identical with that of the second embodiment, and thus is not illustrated in FIG. 27. Components identical with those described in the first and the second embodiments and the modifications thereof are denoted by like reference numerals, and overlapping explanation thereof will be omitted.

The input device 2 according to the second modification of the second embodiment includes second light-emitting element units DEL2 besides the first light-emitting element units DEL1. A part of the first conductive layers of the first electrode unit 31 is coupled to the luminescent layer 22 via fifth conductive layers 35C. The second light-emitting element units DEL2 each have a second contact portion 36C coupled to a part of the first conductive layer of the first electrode unit 31 extending between adjacent third conductive layers of the third electrode unit 33 and electrically coupled to a part of the luminescent layer 22. The second light-emitting element units DEL2 each include the first electrode unit 31, the luminescent layer 22, and the second electrode unit 32. When a forward-bias voltage is applied to the first electrode unit 31 and the second electrode unit 32, the luminescent layer 22 emits light.

Second light-blocking portions 31C are provided in the same layer as that of the first conductive layers of the first electrode unit 31. The second light-blocking portion 31C is a wide portion in which the width of the first conductive layer is broadened in the direction intersecting with the extending direction of the first conductive layer of the first electrode unit 31. The length of the second light-blocking portion 31C in the intersecting direction is longer than the maximum length of the fifth conductive layer 35C in the intersecting direction. The second light-blocking portion 31C can cover the second contact portion 36C of the fifth conductive layer 35C viewed in a direction perpendicular to the first surface 201 of the first substrate 21. This configuration can decrease the resistance at the second contact portion 36C, thereby increasing the light emission efficiency of the second light-emitting element unit DEL2.

The second light-blocking portions 31C preferably have a light-blocking property and may be made of any material as long as having a light-blocking property. The second light-blocking portions 31C are preferably made of a metal material having metallic luster, such as Al, Ag, and Cr, and an alloy containing these metals to reflect light emitted from the luminescent layer 22. The second light-blocking portions 31C are preferably made of the same material as that of the first conductive layers of the first electrode unit 31 for simpler fabrication. As described above, the second light-emitting element units DEL2 each include the second light-blocking portion 31C, thereby suppressing leakage of light toward the first surface 201 of the first substrate 21.

Third Modification of the Second Embodiment

Figure 28:
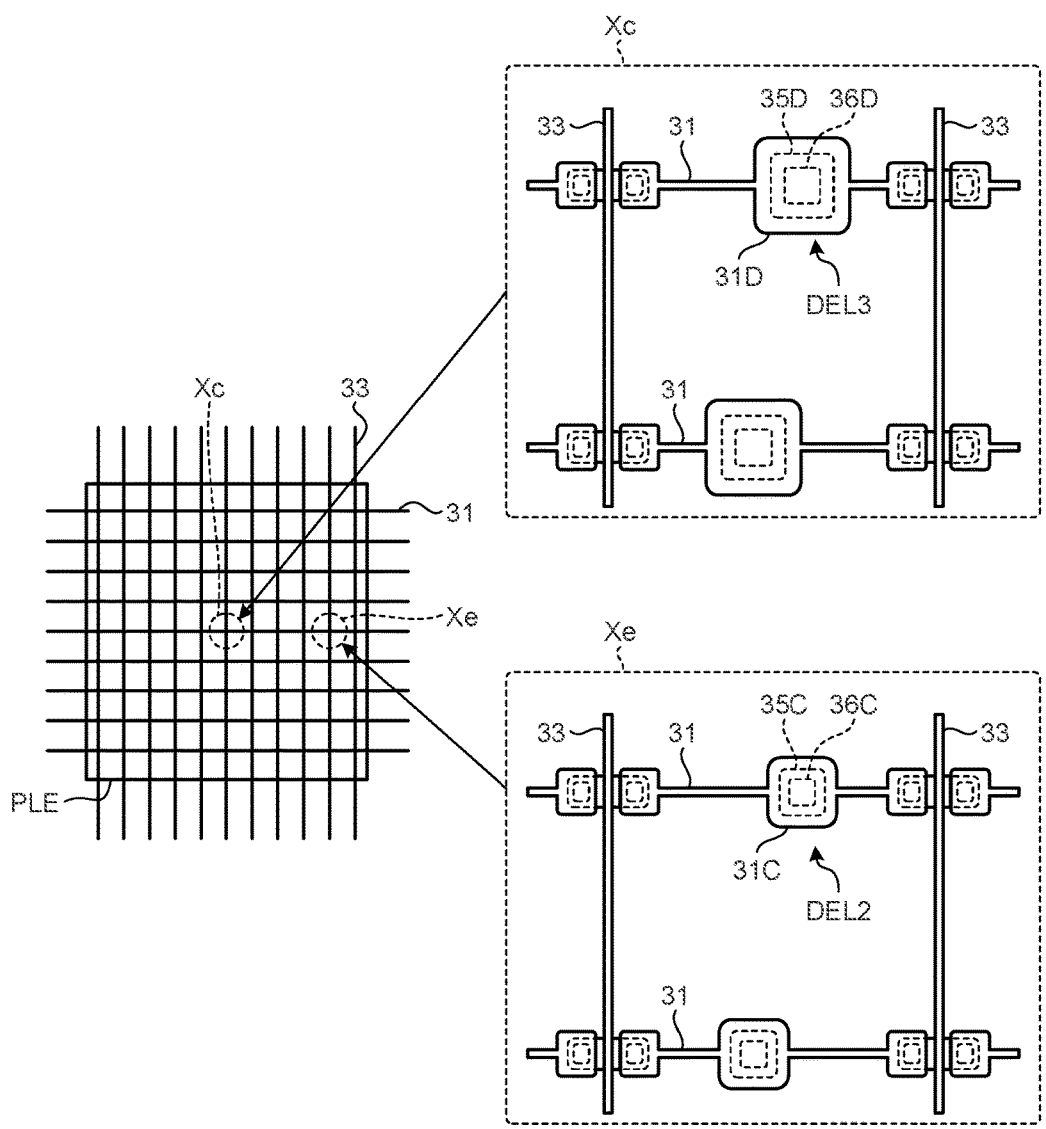
FIG. 28 is a diagram for explaining the positional relation in planar view between the first electrode unit and the third electrode unit of the input device according to a third modification of the second embodiment.

The following describes the input device 2 according to a third modification of the second embodiment. FIG. 28 is a diagram for explaining the positional relation in planar view between the first electrode unit and the third electrode unit of the input device according to the third modification of the second embodiment. The second electrode unit 32 is identical with that of the second embodiment, and thus is not illustrated in FIG. 28. Components identical with those described in the first and the second embodiments and the modifications thereof are denoted by like reference numerals, and overlapping explanation thereof will be omitted.

The input device 2 according to the third modification of the second embodiment includes the second light-emitting element units DEL2 and second light-emitting element units DEL3 besides the first light-emitting element units DEL1. The second light-emitting element units DEL3 have the same configuration as that of the second light-emitting element units DEL2. A part of the first conductive layers of the first electrode unit 31 is coupled to the luminescent layer 22 via fifth conductive layers 35D. The second light-emitting element units DEL3 each have a second contact portion 36D coupled to a part of the first conductive layer of the first electrode unit 31 extending between adjacent third conductive layers of the third electrode unit 33 and electrically coupled to a part of the luminescent layer 22. The second light-emitting element units DEL3 each include the first electrode unit 31, the luminescent layer 22, and the second electrode unit 32. The luminescent layer 22 emits light by a forward-bias voltage being applied to the first electrode unit 31 and the second electrode unit 32.

Second light-blocking portions 31D are provided in the same layer as that of the first conductive layers of the first electrode unit 31. The second light-blocking portion 31D is a wide portion in which the width of the first conductive layer is broadened in the direction intersecting with the extending direction of the first conductive layer of the first electrode unit 31. The length of the second light-blocking portion 31D in the intersecting direction is longer than the maximum length of the fifth conductive layer 35D in the intersecting direction. The second light-blocking portion 31D can cover the second contact portion 36D of the fifth conductive layer 35D viewed in a direction perpendicular to the first surface 201 of the first substrate 21. This configuration can decrease the resistance at the second contact portion 36D, thereby increasing the light emission efficiency of the second light-emitting element unit DEL3.

The second light-blocking portions 31D preferably have a light-blocking property and may be made of any material as long as having a light-blocking property. The second light-blocking portions 31D are preferably made of a metal material having metallic luster, such as Al, Ag, and Cr, and an alloy containing these metals to reflect light emitted from the luminescent layer 22. The second light-blocking portions 31D are preferably made of the same material as that of the first conductive layers of the first electrode unit 31 for simpler fabrication. As described above, the second light-emitting element units DEL3 each include the second light-blocking portion 31D, thereby suppressing leakage of light toward the first surface 201 of the first substrate 21.

The second contact portion 36D has an area larger than that of the second contact portion 36C. With this structure, the second light-emitting element unit DEL3 can emit a larger amount of light than that from the second light-emitting element unit DEL2.

As illustrated in FIG. 28, in planar view of a coordinate input plane PLE viewed in the perpendicular direction, the amount of emitted light (luminance) of the first light-emitting element unit DEL1 may possibly be reduced at a center portion Xc of the coordinate input plane PLE compared to that at an end portion Xe due to the influence of wiring resistance in the first conductive layers of the first electrode unit 31. To address this, the input device 2 according to the third modification of the second embodiment is provided with the second light-emitting element unit DEL3 at a part closer to the center portion Xc of the coordinate input plane PLE, and with the second light-emitting element unit DEL2 at a part closer to the end portion Xe of the coordinate input plane PLE. With this configuration, the input device 2 can make the amount of emitted light in the plane nearly uniform when it functions as a front light.

Figure 29:
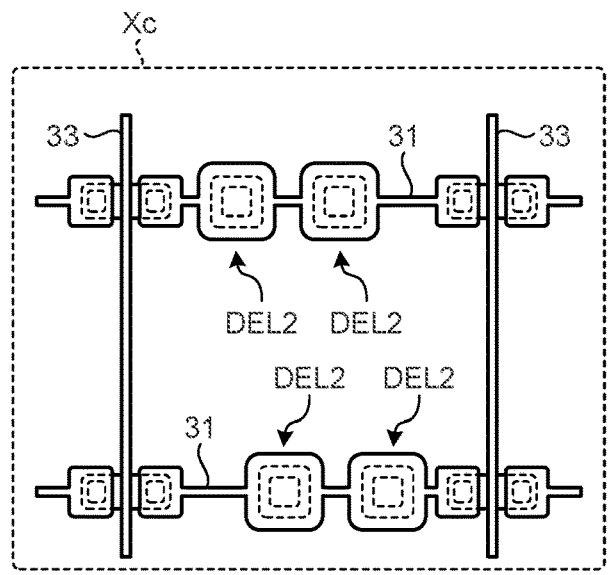
FIG. 29 is a diagram for explaining another positional relation in planar view between the first electrode unit and the third electrode unit of the input device according to the third modification of the second embodiment.

FIG. 29 is a diagram for explaining another positional relation in planar view between the first electrode unit and the third electrode unit of the input device according to the third modification of the second embodiment. As illustrated in FIG. 29, the input device 2 according to the third modification of the second embodiment is provided with a plurality of second light-emitting element units DEL2 at the center portion Xc of the coordinate input plane PLE, and with one second light-emitting element unit DEL2 at the end portion Xe of the coordinate input plane PLE. As described above, the input device 2 according to the third modification of the second embodiment has a larger number of second light-emitting element units DEL2 per unit area at a part closer to the center portion Xc of the coordinate input plane PLE than at a part closer to the end portion Xe thereof. With this configuration, the input device 2 can make the amount of emitted light in the plane nearly uniform when it functions as a front light.

Fourth Modification of the Second Embodiment

Figure 30:
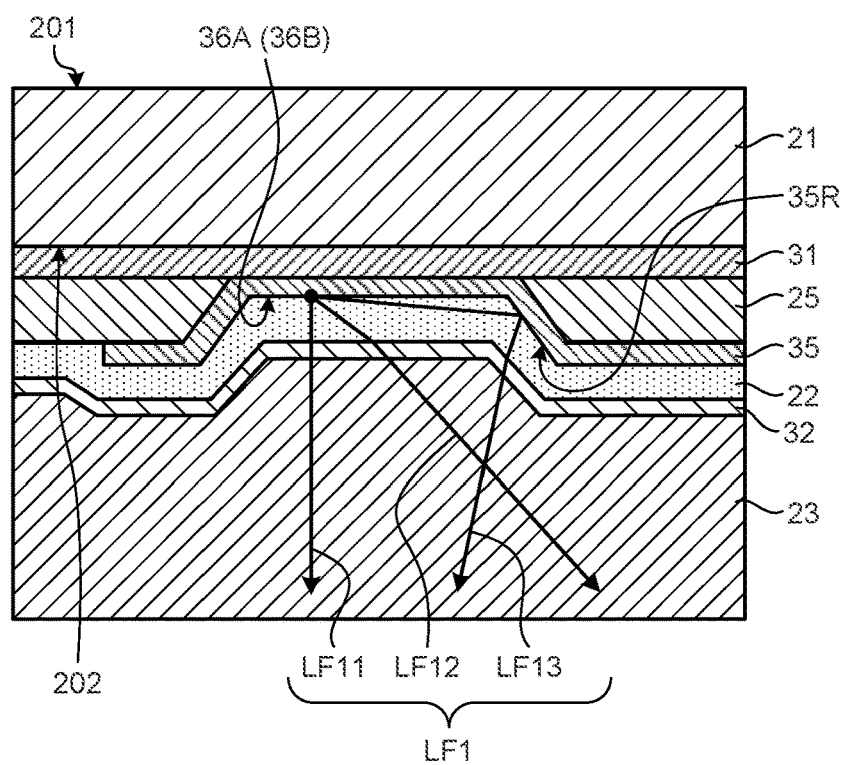
FIG. 30 is an enlarged sectional view for explaining irradiation light at a first contact portion in the input device according to a fourth modification of the second embodiment.
Figure 31:
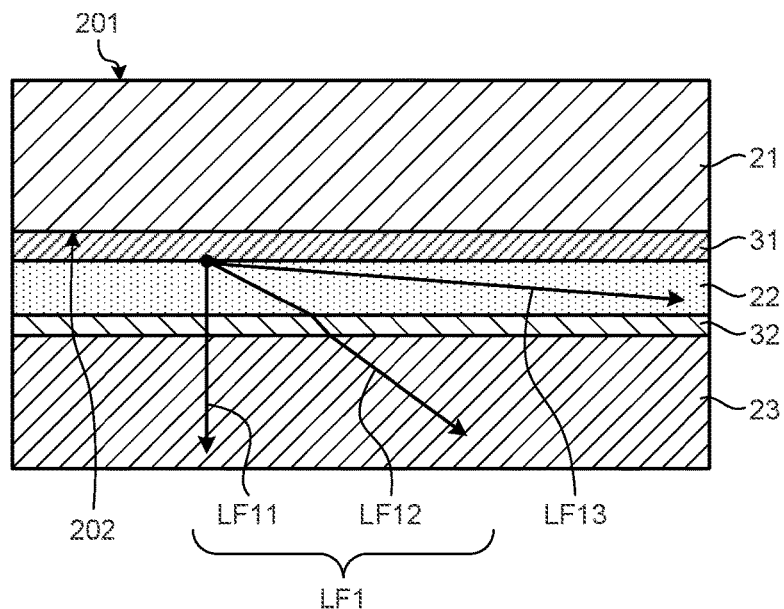
FIG. 31 is an enlarged sectional view for explaining irradiation light in the input device according to the first embodiment.

The following describes the input device 2 according to a fourth modification of the second embodiment. FIG. 30 is an enlarged sectional view for explaining irradiation light at the first contact portion in the input device according to the fourth modification of the second embodiment. FIG. 31 is an enlarged sectional view for explaining irradiation light in the input device according to the first embodiment. Components identical with those described in the first and the second embodiments and the modifications thereof are denoted by like reference numerals, and overlapping explanation thereof will be omitted.

As illustrated in FIG. 30, the protrusion of the luminescent layer 22 is formed such that the sectional area of the surface of the first contact portion 36A (36B) parallel to the second surface 202 decreases as it comes closer to the second surface 202. The first contact portion 36A (36B) is the fourth conductive layer 35 made of a metal having metallic luster. Side surfaces 35R of the protrusion are inclination surfaces inclined with respect to the second surface 202.

As illustrated in FIG. 31, the luminescent layer 22 according to the first embodiment is directly in contact with the first conductive layers of the first electrode unit 31. The surface in contact with the first conductive layers is substantially flat. With this structure, only light LF11 and LF12 can travel in the LF1 direction from the input device 2 illustrated in FIG. 8 out of radial light LF11, LF12, and LF13 emitted from the luminescent layer 22 according to the first embodiment.

On the other hand, as illustrated in FIG. 30, the radial light LF13 emitted from the luminescent layer 22 according to the fourth modification of the second embodiment is reflected by the side surface 35R of the protrusion. The angle of the light LF13 emitted from the input device 2 illustrated in FIG. 8 is thus changed so that the light LF13 is turned in the LF1 direction. As a result, the light LF11, LF12, and LF13 can travel in the LF1 direction from the input device 2 illustrated in FIG. 8 out of the radial light LF11, LF12, and LF13 emitted from the luminescent layer 22. This configuration can increase the light emission efficiency of the input device 2 according to the fourth modification of the second embodiment serving as a front light.

Fifth Modification of the Second Embodiment

Figure 32:
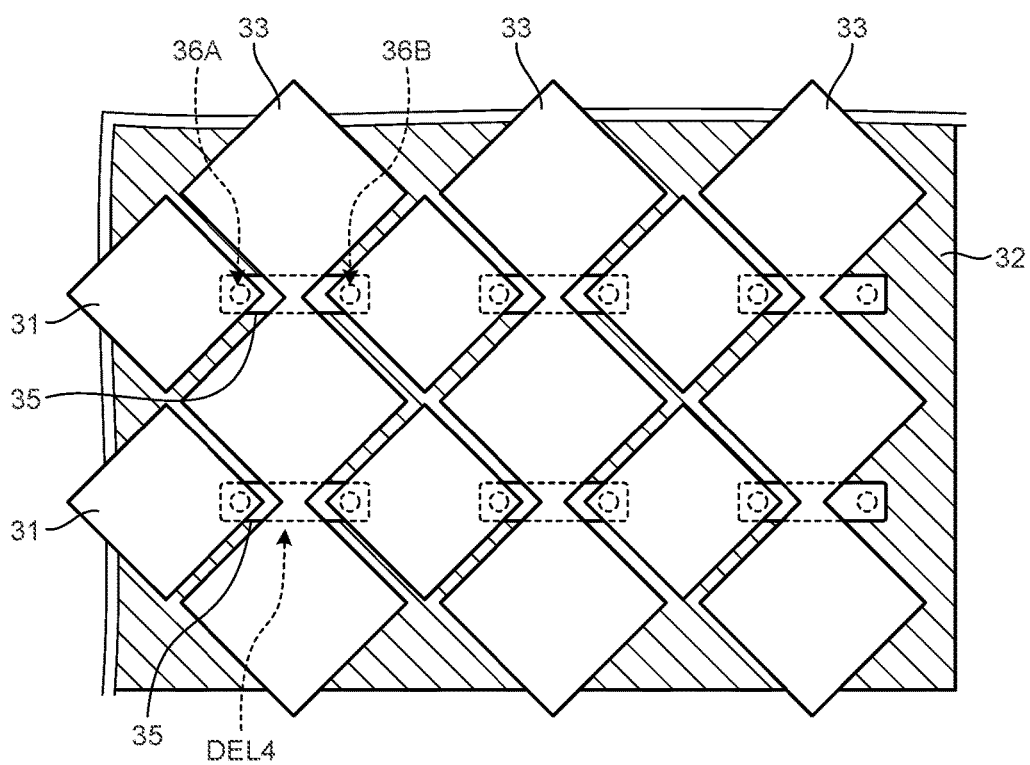
FIG. 32 is a diagram for explaining the positional relation in planar view among the first electrode unit, the second electrode unit, and the third electrode unit of the input device according to a fifth modification of the second embodiment.

The following describes the input device 2 according to a fifth modification of the second embodiment. FIG. 32 is a diagram for explaining the positional relation in planar view among the first electrode unit, the second electrode unit, and the third electrode unit of the input device according to the fifth modification of the second embodiment. Components identical with those described in the first and the second embodiments and the modifications thereof are denoted by like reference numerals, and overlapping explanation thereof will be omitted.

As illustrated in FIG. 32, the input device 2 according to the fifth modification of the second embodiment includes the first substrate 21, the first electrode unit 31, the second electrode unit 32, the luminescent layer 22, the third electrode unit 33, the insulation layer 25, and the fourth conductive layers 35. The second electrode unit 32 is covered with the insulating protective layer 23. The insulating protective layer 23 is not necessarily provided. The section of the first contact portions 36A and 36B of the fourth conductive layers 35 is the same as that illustrated in FIG. 24.

As illustrated in FIG. 32, the first electrode unit 31 is a plurality of first conductive layers formed in one layer on the second surface 202 of the first substrate 21. As illustrated in FIGS. 32 and 25, the first electrode unit 31 is configured such that the first conductive layers thereof are scattered in planar view like an island. The insulation layer 25 is provided between the first electrode unit 31 and the luminescent layer 22. Each of the fourth conductive layers 35 couples the ends of adjacent first conductive layers of the first electrode unit 31 divided by the third conductive layer and crosses over the third conductive layer in a manner insulated therefrom. With this configuration, the first conductive layers of the first electrode unit 31 are coupled by the fourth conductive layers 35 in one direction.

As illustrated in FIG. 32, the third electrode unit 33 is a plurality of third conductive layers formed in one layer on the second surface 202 of the first substrate 21. As illustrated in FIGS. 32 and 25, the third conductive layers of the third electrode unit 33 have a shape of rectangles continuously extending in the direction intersecting with the direction in which the first conductive layers of the first electrode unit 31 extend in planar view. The insulation layer 25 is provided between the third electrode unit 33 and the luminescent layer 22.

The shape of the first conductive layers of the first electrode unit 31 is not limited to a rectangle and may be a planar shape, such as a diamond-shape, a lozenge, or a square with chamfered corners. The first conductive layers simply need to have a shape filling unoccupied areas between adjacent third conductive layers of the third electrode unit 33 in planar view in a manner insulated therefrom. Similarly, the shape of the third conductive layers of the third electrode unit 33 is not limited to rectangles and may be a shape obtained by electrically coupling planar shapes, such as diamond-shapes, lozenges, or squares with chamfered corners, in the intersecting direction. The third conductive layers simply need to have a shape filling unoccupied areas between adjacent first conductive layers of the first electrode unit 31 in planar view in a manner insulated therefrom.

The first conductive layers of the first electrode unit 31 have a shape with a wide width, and thus they are made of a transparent light-transmissive conductive material, such as ITO and IZO. This configuration makes it possible to brightly display an image output from the display unit 9 to the observer. The third conductive layers of the third electrode unit 33 have a shape with a wide width, and thus they are made of a transparent light-transmissive conductive material, such as ITO and IZO. This configuration also makes it possible to brightly display an image output from the display unit 9 to the observer.

The second electrode unit 32 is a second conductive layer formed in a layer different from that of the first electrode unit 31. The second conductive layer is a flat film having a size overlapping with the first conductive layers in planar view. The second conductive layer of the second electrode unit 32 is electrically in contact with the entire surface of the luminescent layer 22. The conductive layer of the second electrode unit 32 is made of a transparent light-transmissive conductive material, such as ITO and IZO.

A first light-emitting element unit DEL4 includes the first electrode unit 31, the luminescent layer 22, and the second electrode unit 32. The luminescent layer 22 emits light by a forward-bias voltage being applied to the first electrode unit 31 and the second electrode unit 32. When the voltage is applied, the luminescent layer 22 in the first light-emitting element unit DEL4 emits light along the shape of the fourth conductive layer 35 electrically coupled to the first electrode unit 31. As a result, light-emitting portions are generated partially in planar view. The input device 2 thus functions as a front light that can output light to the display unit 9 illustrated in FIG. 8.

Figure 33:
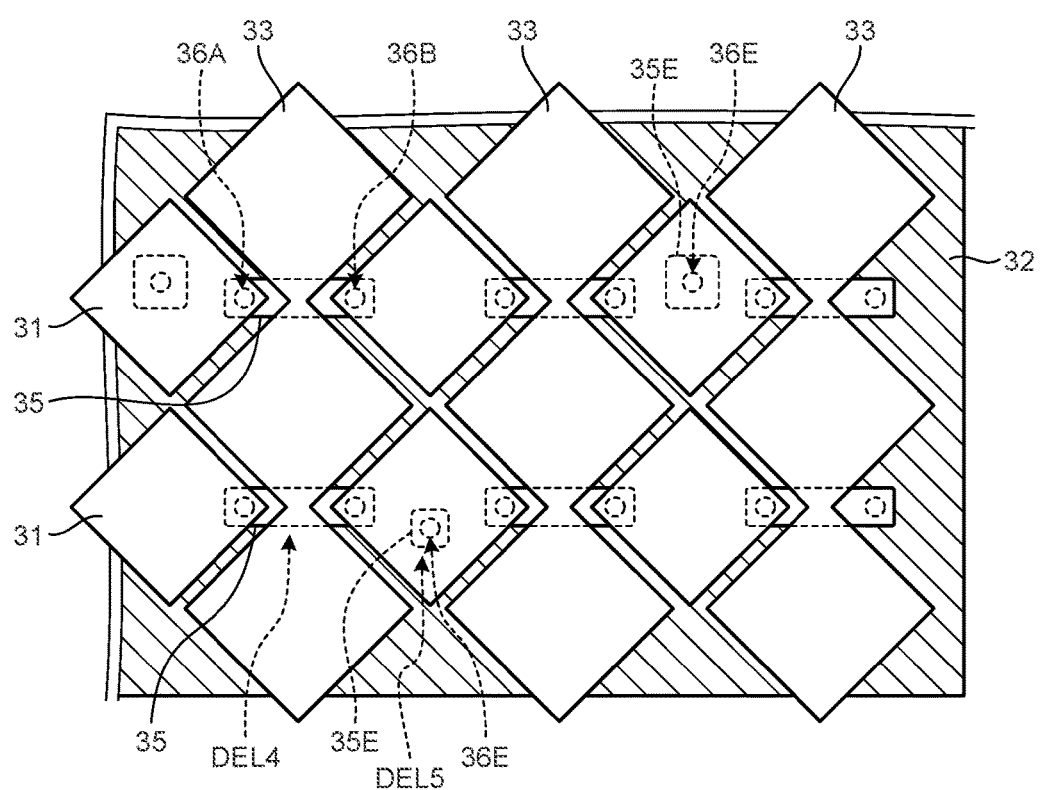
FIG. 33 is a diagram for explaining another positional relation in planar view among the first electrode unit, the second electrode unit, and the third electrode unit of the input device according to the fifth modification of the second embodiment.

FIG. 33 is a diagram for explaining another positional relation in planar view among the first electrode unit, the second electrode unit, and the third electrode unit of the input device according to the fifth modification of the second embodiment. The first conductive layers of the first electrode unit 31 have a wide width, and thus the input device 2 according to the fifth modification of the second embodiment has a higher degree of freedom in arrangement of second light-emitting element units DEL5 (fifth conductive layers 35E). The input device 2 according to the fifth modification of the second embodiment illustrated in FIG. 33 includes the second light-emitting element units DEL5 besides the first light-emitting element units DEL4. A part of the first conductive layers of the first electrode unit 31 is coupled to the luminescent layer 22 via the fifth conductive layers 35E. The second light-emitting element units DEL5 each have a second contact portion 36E coupled to a part of the first conductive layer of the first electrode unit 31 arranged between adjacent third conductive layers of the third electrode unit 33 and electrically coupled to a part of the luminescent layer 22. The second light-emitting element units DEL5 each include the first electrode unit 31, the luminescent layer 22, and the second electrode unit 32, the luminescent layer 22 emits light by a forward-bias voltage being applied to the first electrode unit 31 and the second electrode unit 32.

As described above, the first electrode unit 31 according to the second embodiment and the modifications thereof functions as electrodes of the first light-emitting element unit DEL1 or DEL4, and also functions as the drive electrodes Tx of the input device 2. This configuration can reduce the thickness of the input device 2.

The input device 2 according to the second embodiment and the modifications thereof can be driven by the same drive control as that of the input device 2 according to the first embodiment.

Third Embodiment

Figure 34:
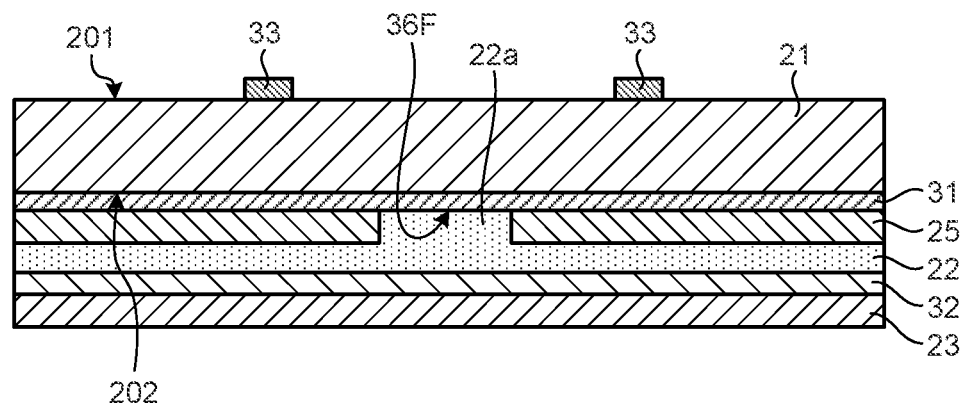
FIG. 34 is a sectional view schematically illustrating the structure of the input device according to a third embodiment of the present invention.
Figure 35:
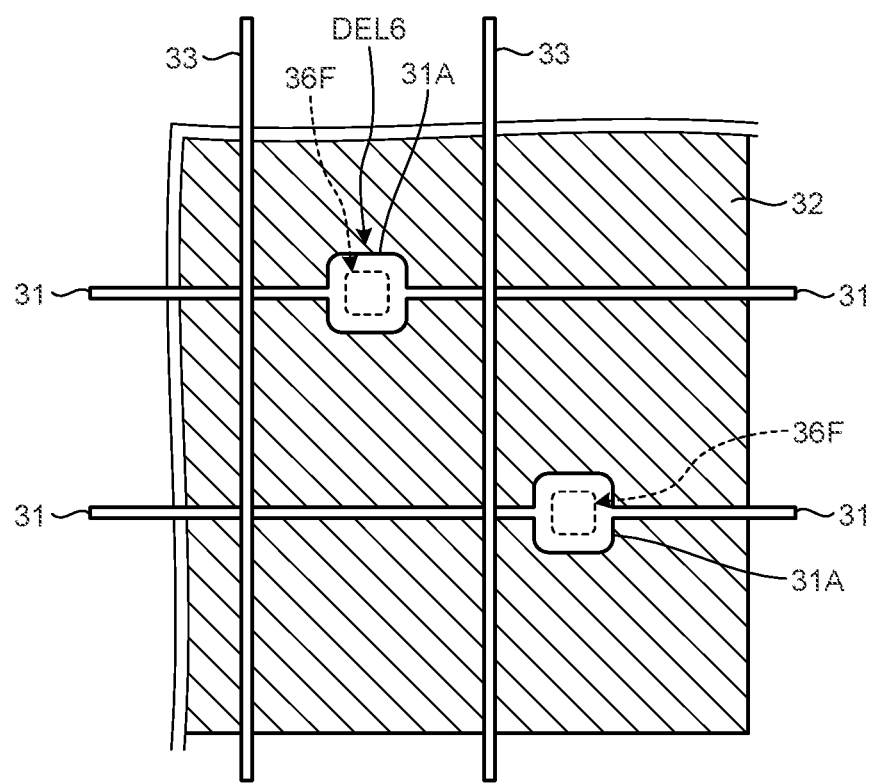
FIG. 35 is a diagram for explaining the positional relation in planar view among the first electrode unit, the second electrode unit, and the third electrode unit of the input device according to the third embodiment.

The following describes the input device 2 according to a third embodiment of the present invention. FIG. 34 is a sectional view schematically illustrating the structure of the input device according to the third embodiment. FIG. 35 is a diagram for explaining the positional relation in planar view among the first electrode unit, the second electrode unit, and the third electrode unit of the input device according to the third embodiment. Components identical with those described in the first and the second embodiments and the modifications thereof are denoted by like reference numerals, and overlapping explanation thereof will be omitted.

As illustrated in FIGS. 34 and 35, the input device 2 according to the third embodiment includes the first substrate 21, the first electrode unit 31, the second electrode unit 32, the luminescent layer 22, the third electrode unit 33, and the insulation layer 25. The second electrode unit 32 is covered with the insulating protective layer 23. The insulating protective layer 23 is not necessarily provided. The first substrate 21 is a light-transmissive substrate, such as a glass substrate, having the first surface 201 and the second surface 202. In the input device 2, the first surface 201 in FIG. 34 is arranged on the observer 200 side illustrated in FIG. 8, and the second surface 202 is arranged on the display unit 9 side.

As illustrated in FIG. 34, the first electrode unit 31 is a plurality of first conductive layers formed in one layer on the second surface 202 of the first substrate 21. As illustrated in FIGS. 34 and 35, the first conductive layers of the first electrode unit 31 have a shape continuously extending in one direction in planar view. The insulation layer 25 is provided between the first electrode unit 31 and the luminescent layer 22.

As illustrated in FIG. 34, the third electrode unit 33 is a plurality of third conductive layers formed in one layer on the first surface 201 of the first substrate 21. The third electrode unit 33 is insulated from the first electrode unit 31 by the first substrate 21. The third electrode unit 33 and the first electrode unit 31 simply need to be insulated from each other, and they may have the positional relation illustrated in FIGS. 13 and 14. As illustrated in FIGS. 34 and 35, the third conductive layers of the third electrode unit 33 have a shape continuously extending in the direction intersecting with the first conductive layers of the first electrode unit 31 in planar view.

The luminescent layer 22 has a size overlapping with the first conductive layers in planar view. As illustrated in FIG. 34, the luminescent layer 22 has the protrusion 22a protruding toward the second surface 202. A plurality of protrusions 22a are provided in the plane. The insulation layer 25 is provided between the first electrode unit 31 and the luminescent layer 22. The luminescent layer 22 is electrically in contact with the first conductive layers of the first electrode unit 31 at the protrusions 22a.

The input device 2 according to the third embodiment includes first light-emitting element units DEL6, the position of which is not limited to the intersection between the first electrode unit 31 and the third electrode unit 33. In each of the first light-emitting element units DEL6, the protrusion 22a of the luminescent layer 22 is electrically coupled to a part of the first conductive layer of the first electrode unit 31 and emits light. A contact portion 36F is a portion at which the protrusion 22a of the luminescent layer 22 is in contact with the first electrode unit 31. The first light-emitting element units DEL6 each include the first electrode unit 31, the protrusion 22a of the luminescent layer 22, and the second electrode unit 32. The protrusion 22a of the luminescent layer 22 emits light by a forward-bias voltage being applied to the first electrode unit 31 and the second electrode unit 32.

The first light-blocking portions 31A are provided in the same layer as that of the first conductive layers of the first electrode unit 31. The first light-blocking portion 31A is a wide portion in which the width of the first conductive layer is broadened in the direction intersecting with the extending direction of the first conductive layer of the first electrode unit 31. The length of the first light-blocking portion 31A in the intersecting direction is longer than the maximum length of the first contact portion 36F in the protrusion 22a in the intersecting direction. The first light-blocking portion 31A can cover the first contact portion 36F viewed in a direction perpendicular to the first surface 201 of the first substrate 21. This configuration can decrease the resistance at the first contact portion 36F, thereby increasing the light emission efficiency of the first light-emitting element unit DEL6.

The first light-blocking portions 31A may be made of any material as long as they have a light-blocking property. The first light-blocking portions 31A are made of a metal material having metallic luster, such as Al, Ag, and Cr, and an alloy containing these metals to reflect light emitted from the luminescent layer 22. The first light-blocking portions 31A are preferably made of the same material as that of the first conductive layers of the first electrode unit 31 for simpler fabrication. As described above, the first light-emitting element units DEL6 each include the first light-blocking portion 31A, thereby suppressing leakage of light toward the first surface 201 of the first substrate 21.

First Modification of the Third Embodiment

Figure 36:
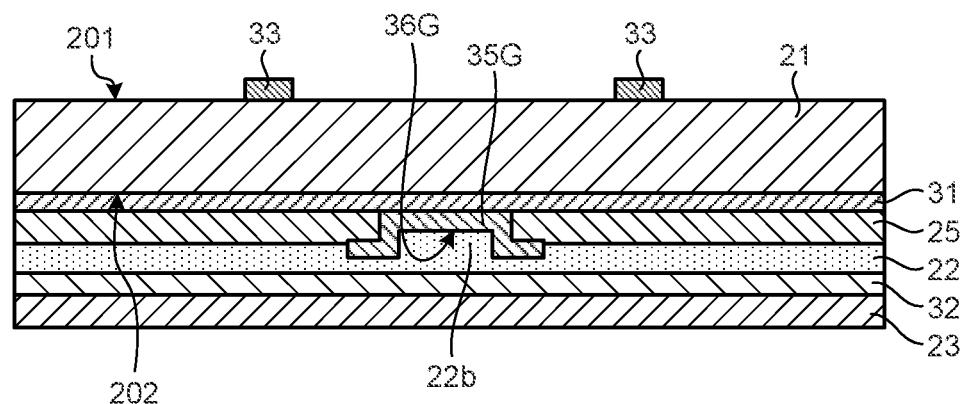
FIG. 36 is a sectional view schematically illustrating the structure of the input device according to a first modification of the third embodiment.
Figure 37:
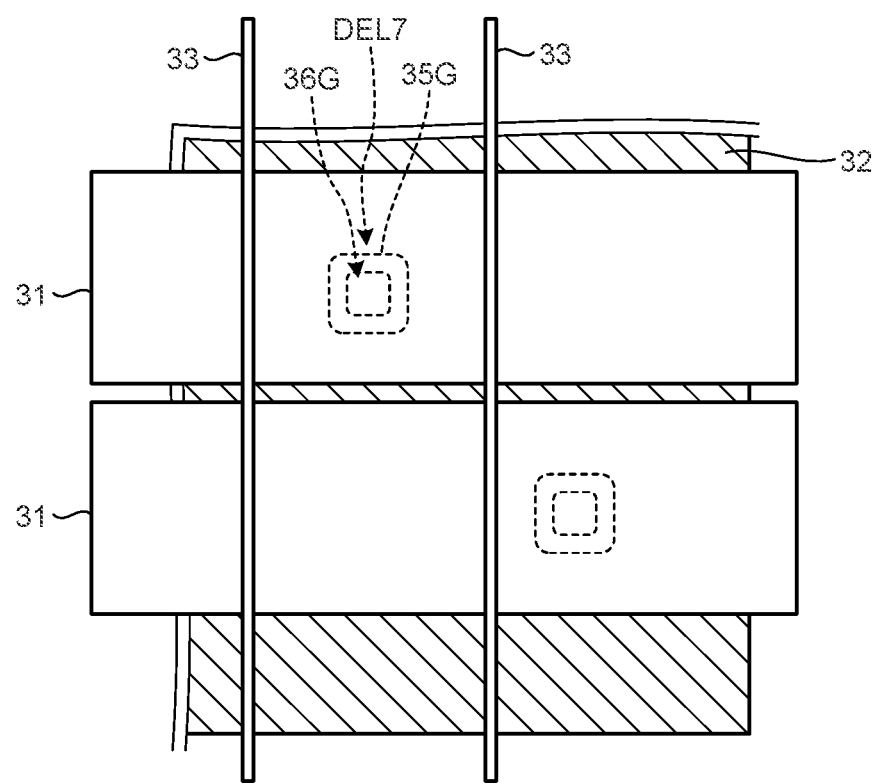
FIG. 37 is a diagram for explaining the positional relation in planar view among the first electrode unit, the second electrode unit, and the third electrode unit of the input device according to the first modification of the third embodiment.

The following describes the input device 2 according to a first modification of the third embodiment. FIG. 36 is a sectional view schematically illustrating the structure of the input device according to the first modification of the third embodiment. FIG. 37 is a diagram for explaining the positional relation in planar view among the first electrode unit, the second electrode unit, and the third electrode unit of the input device according to the first modification of the third embodiment. Components identical with those described in the first and the second embodiments, the modifications thereof, and the third embodiment are denoted by like reference numerals, and overlapping explanation thereof will be omitted.

As illustrated in FIG. 37, the input device 2 according to the first modification of the third embodiment includes first light-emitting element units DEL7, the position of which is not limited to the intersection between the first electrode unit 31 and the third electrode unit 33. In each of the first light-emitting element units DEL7, a protrusion 22b of the luminescent layer 22 is electrically coupled to a part of the first conductive layer of the first electrode unit 31 and emits light. As illustrated in FIG. 36, the luminescent layer 22 is provided between the first electrode unit 31 and the second electrode unit 32 and is electrically coupled to the first electrode unit 31 via a fourth conductive layer 35G. Specifically, the first electrode unit 31 is electrically coupled to the fourth conductive layer 35G at a first contact portion 36G. The luminescent layer 22 is electrically coupled to the fourth conductive layer 35G. In other words, at the first contact portion 36G, the fourth conductive layer 35G is interposed between the protrusion 22b of the luminescent layer 22 and the first electrode unit 31. The first light-emitting element units DEL1 each include the first electrode unit 31, the protrusion 22b of the luminescent layer 22, the second electrode unit 32, and the fourth conductive layer 35G. The protrusion 22b of the luminescent layer 22 emits light by a forward-bias voltage being applied to the first electrode unit 31 and the second electrode unit 32.

If the fourth conductive layer 35G has a light-blocking property, it serves as a first light-blocking portion. In this case, the fourth conductive layer 35G may be made of any material as long as having a light blocking property. The first light-blocking portion is preferably made of a metal material having metallic luster, such as Al, Ag, and Cr, and an alloy containing these metals to reflect light emitted from the luminescent layer 22. By arranging the fourth conductive layer 35G serving as a first light-blocking portion closer to the first surface 201 of the first substrate 21 than the luminescent layer 22, it is possible to suppress leakage of light toward the first surface 201 of the first substrate 21.

The protrusion 22b of the luminescent layer 22 may be formed such that the sectional area of the surface of the first contact portion parallel to the second surface 202 decreases as it comes closer to the second surface 202 as illustrated in FIG. 30. In this case, the fourth conductive layer 35G is preferably made of a metal having metallic luster, and side surfaces of the protrusion are preferably inclination surfaces inclined with respect to the second surface 202. This configuration makes it possible to increase the light emission efficiency as a front light similarly to the second input device 2 according to the fourth modification of the second embodiment.

Second Modification of the Third Embodiment

Figure 38:
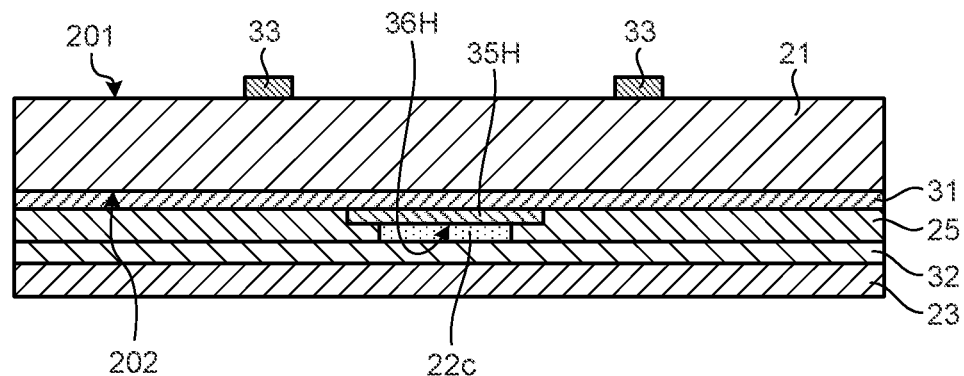
FIG. 38 is a sectional view schematically illustrating the structure of the input device according to a second modification of the third embodiment.
Figure 39:
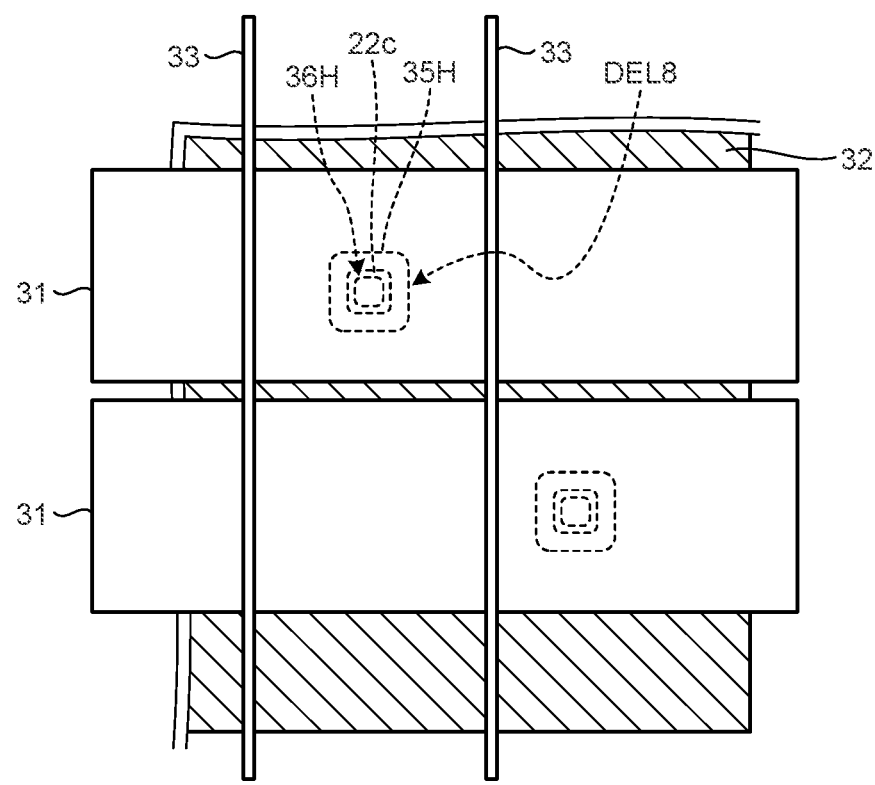
FIG. 39 is a diagram for explaining the positional relation in planar view among the first electrode unit, the second electrode unit, and the third electrode unit of the input device according to the second modification of the third embodiment.

The following describes the input device 2 according to a second modification of the third embodiment. FIG. 38 is a sectional view schematically illustrating the structure of the input device according to the second modification of the third embodiment. FIG. 39 is a diagram for explaining the positional relation in planar view among the first electrode unit, the second electrode unit, and the third electrode unit of the input device according to the second modification of the third embodiment. Components identical with those described in the first, the second, and the third embodiments, and the modifications thereof are denoted by like reference numerals, and overlapping explanation thereof will be omitted.

As illustrated in FIG. 38, a luminescent layer 22c is provided between the first electrode unit 31 and the second electrode unit 32 and is electrically coupled to the first electrode unit 31 via a fourth conductive layer 35H. Specifically, the first electrode unit 31 is electrically coupled to the fourth conductive layer 35H at a first contact portion 36H. The luminescent layer 22c is electrically coupled to the fourth conductive layer 35H. In other words, at the first contact portion 36H, the fourth conductive layer 35H is interposed between the luminescent layer 22c and the first electrode unit 31. A first light-emitting element unit DEL8 includes the first electrode unit 31, the luminescent layer 22c, the second electrode unit 32, and the fourth conductive layer 35H. The luminescent layer 22c emits light by a forward-bias voltage being applied to the first electrode unit 31 and the second electrode unit 32.

As illustrated in FIG. 39, a plurality of luminescent layers 22c are arranged in an insular manner in planar view. One luminescent layer 22c overlaps with one first conductive layer. As illustrated in FIG. 39, the luminescent layer 22c has an area of equal to or smaller than that of the fourth conductive layer 35H in planar view and is surrounded by the insulation layer 25. The insulation layer 25 insulates the first electrode unit 31 from the second electrode unit 32 around the luminescent layer 22c. The entire surface of the luminescent layer 22c is electrically in contact with the first conductive layer of the first electrode unit 31.

To manufacture the input device 2, the first substrate 21 is prepared, and the first conductive layers of the first electrode unit 31 are patterned on the second surface 202 of the first substrate 21. The fourth conductive layers 35H are then patterned on the surface of the respective first conductive layers of the first electrode unit 31 in the input device 2. The luminescent layers 22c are then patterned on the surface of the respective fourth conductive layers 35H in the input device 2. Before the luminescent layers 22c are formed, gaps in the first electrode unit 31, portions around the fourth conductive layers 35H, and portions around the luminescent layers 22c are filled and planarized by the insulation layer 25. The second conductive layer of the second electrode unit 32 is then formed. The protective layer 23 made of a light-transmissive insulator, such as $Al_2O_3$, is then formed in the input device 2. The third electrode unit 33 is then formed on the first surface 201 of the first substrate 21 in the input device 2. As described above, the input device 2 according to the second modification of the third embodiment can be manufactured with a smaller number of etching processes, thereby reducing manufacturing cost.

In the input device 2 according to the second modification of the third embodiment, the luminescent layers 22c are partially provided and are not a flat film. This configuration reduces the amount of light passing through the luminescent layers 22c, thereby improving the optical characteristics including transmittance. When the first light-emitting element units DEL8 are turned off, for example, the input device 2 enables an image output from the display unit 9 (refer to FIG. 8) to be clearly displayed.

As described above, the first electrode unit 31 according to the third embodiment and the modifications thereof functions as electrodes of any one of the first light-emitting element units DEL6, DEL1, and DEL8, and also functions as the drive electrodes Tx of the input device 2. This configuration can reduce the thickness of the input device 2.

The input device 2 according to the third embodiment and the modifications thereof can be driven by the same drive control as that of the input device 2 according to the first embodiment.

Fourth Embodiment

Figure 40:
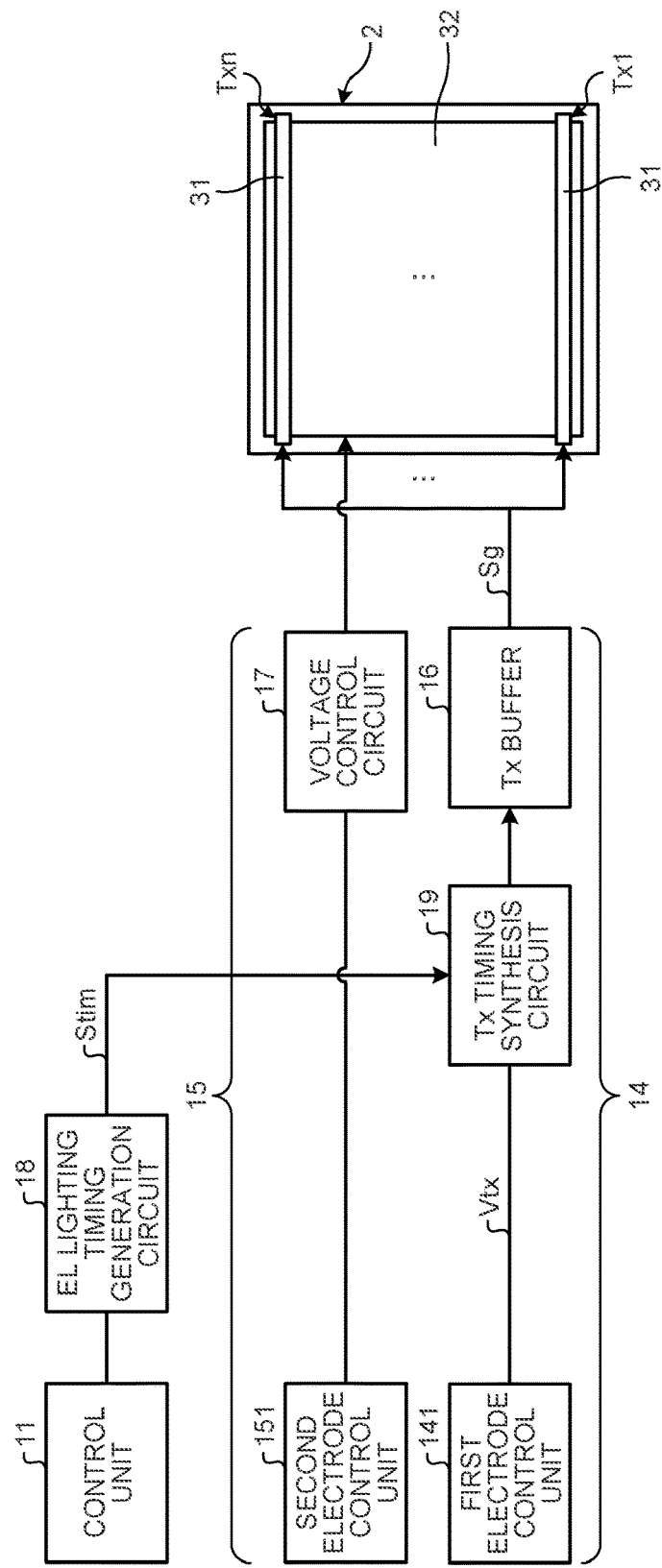
FIG. 40 is a diagram for explaining the first drive electrode driver and the second drive electrode driver according to a fourth embodiment of the present invention.
Figure 41:
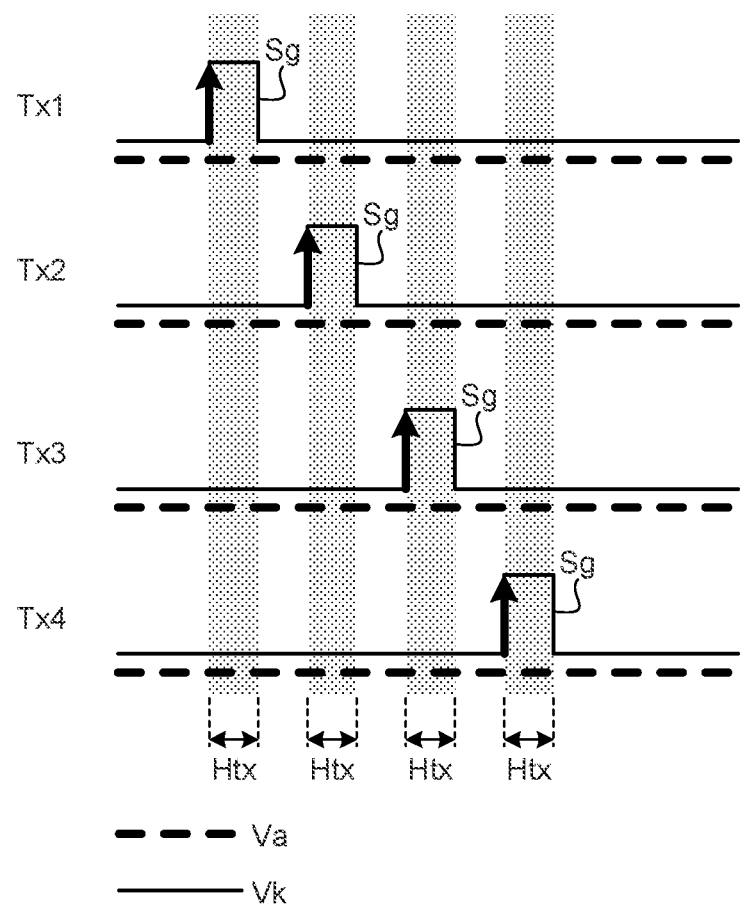
FIG. 41 is a diagram for explaining voltages of the first electrode unit and the second electrode unit in the drive electrode selection period in a state where the first light-emitting element is turned off.
Figure 42:
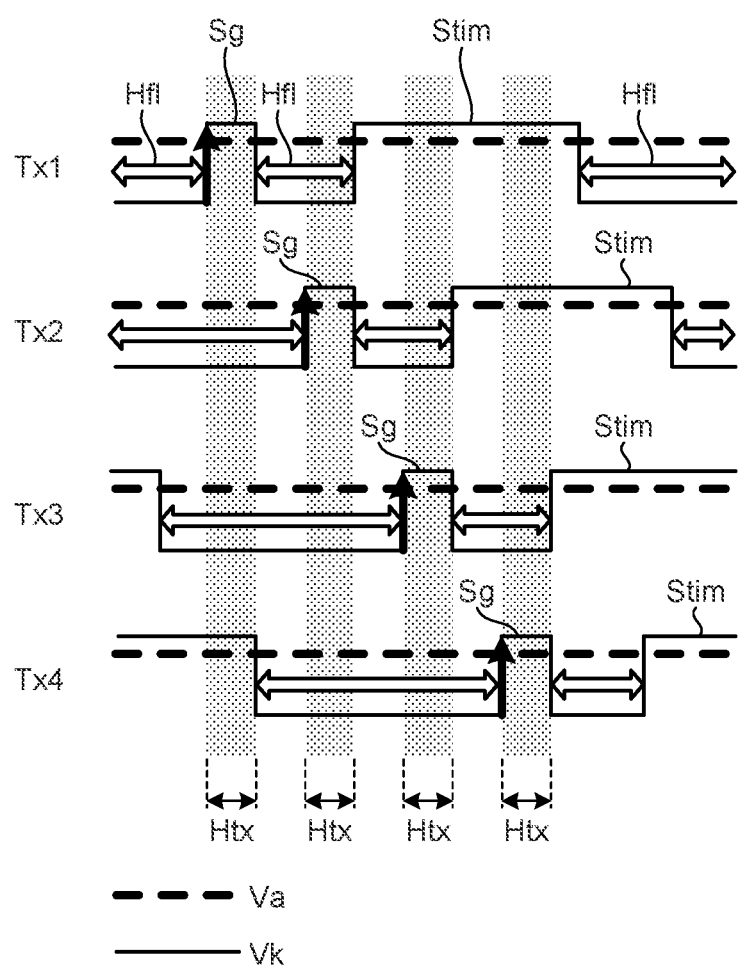

The following describes drive control of the input device 2 according to a fourth embodiment of the present invention with reference to FIGS. 1, 6, 7, and 40 to 44. In the following description, the input device 2 according to the fourth embodiment is explained using the input device 2 according to the first embodiment as an example. The technology according to the fourth embodiment is also applicable to any of the input devices described in the first, the second, and the third embodiments and the modifications thereof. FIG. 40 is a diagram for explaining the first drive electrode driver and the second drive electrode driver according to the fourth embodiment. FIG. 41 is a diagram for explaining voltages of the first electrode unit and the second electrode unit in the drive electrode selection period in a state where the first light-emitting element is turned off. FIG. 42 is a diagram for explaining voltages of the first electrode unit and the second electrode unit in the drive electrode selection period in a state where the first light-emitting element is turned on. In FIGS. 40 to 42, the first electrode unit 31 serves as a cathode of the first light-emitting element unit DEL, whereas the second electrode unit 32 serves as an anode of the first light-emitting element unit DEL. Components identical with those described in the first, the second, and the third embodiments and the modifications thereof are denoted by like reference numerals, and overlapping explanation thereof will be omitted.

When the input device 2 performs a proximity detection operation, the first electrode driver 14 illustrated in FIG. 1 performs driving to sequentially scan the drive electrodes Tx illustrated in FIG. 7 in a time-division manner. As a result, the drive electrodes Tx of the first electrode unit 31 are sequentially selected in a scanning direction Scan. The input device 2 then outputs the proximity detection signal Vdet from the proximity detection electrodes Rx. The first electrode driver 14 of the input device 2 may perform driving to sequentially scan each detection block including a plurality of drive electrodes Tx illustrated in FIG. 7 in a time-division manner.

As illustrated in FIG. 40, the first electrode driver 14 according to the fourth embodiment includes the first electrode control unit 141, a Tx timing synthesis circuit 19, and the Tx buffer 16. The first electrode control unit 141 generates the drive signal Vtx based on the control signal supplied from the control unit 11 and supplies it to the Tx timing synthesis circuit 19. The control unit 11 transmits information for lighting the display unit 9 to an EL lighting timing generation circuit 18. The EL lighting timing generation circuit 18 generates a pulse signal Stim of a non-lighting period having a pulse width corresponding to the lighting amount of the first light-emitting element unit DEL by setting a lighting period to be a high level (H) and a non-lighting period to be a low level (L), for example. The EL lighting timing generation circuit 18 then supplies the pulse signal Stim to the Tx timing synthesis circuit 19. The Tx timing synthesis circuit 19 synthesizes the drive signal Vtx and the pulse signal Stim of the non-lighting period received from the EL lighting timing generation circuit 18 and then transmits the generated signal to the Tx buffer 16. Based on the drive signal Vtx, the Tx buffer 16 supplies the amplified drive signal pulse Sg to the drive electrodes Tx (a part of the first electrode unit 31) of the input device 2 sequentially selected in the scanning direction Scan.

The second electrode driver 15 includes a second electrode control unit 151 and a voltage control circuit 17. The second electrode control unit 151 transmits electric power at a certain voltage to the voltage control circuit 17. The voltage control circuit 17 controls the voltage supplied to the second electrode unit 32 of the input device 2 based on the control signal supplied from the control unit 11.

To turn off the first light-emitting element unit DEL, the voltage control circuit 17 makes the voltage Va of the second electrode unit 32 closer to the voltage Vk of the first electrode unit 31, thereby preventing the voltage difference between the voltage Vk of the first electrode unit 31 and the voltage Va of the second electrode unit 32 from reaching a forward light-emitting drive voltage. In the state of being below the light-emitting drive voltage, the first electrode driver 14 applies the drive signal pulse Sg, the rising direction of which is the reverse-bias direction, between the first electrode unit 31 and the second electrode unit 32 as illustrated in FIG. 41. With this configuration, when the drive signal pulse Sg is applied in the drive selection period Htx, only a reverse-bias voltage difference is applied between the first electrode unit 31 and the second electrode unit 32. As a result, emission of light from the first light-emitting element unit DEL is suppressed. When the first electrode driver 14 performs driving to sequentially scan the drive electrodes Tx1 to Tx4 in a time-division manner as illustrated in FIG. 41, emission of light from the first light-emitting element unit DEL is suppressed by any of the drive signal pulses Sg applied to the drive electrodes Tx1 to Tx4.

To turn on the first light-emitting element unit DEL, the voltage control circuit 17 performs control to make the difference between the voltage Vk of the first electrode unit 31 and the voltage Va of the second electrode unit 32 closer to the forward-bias light-emitting drive voltage ΔVFL. As illustrated in FIG. 42, the voltage control circuit 17 applies a forward-bias voltage of equal to or larger than the light-emitting drive voltage ΔVFL between the first electrode unit 31 and the second electrode unit 32. At this time, the first electrode driver 14 applies the drive signal pulse Sg, the rising direction of which is the reverse-bias direction, between the first electrode unit 31 and the second electrode unit 32. As a result, the light-emitting drive voltage ΔVFL is applied to the first light-emitting element unit DEL except in the drive selection period Htx when the drive signal pulse Sg is applied.

Consequently, the first light-emitting element unit DEL emits light in the lighting period Hfl during which the light-emitting drive voltage ΔVFL is being applied as illustrated in FIG. 42. When the first electrode driver 14 performs driving to sequentially scan the drive electrodes Tx1 to Tx4 in a time-division manner, the voltage difference between the first electrode unit 31 and the second electrode unit 32 is made equal to or smaller than the light-emitting drive voltage ΔVFL in the drive selection period Htx. As a result, emission of light from the first light-emitting element unit DEL is temporarily suppressed by any of the drive signal pulses Sg applied to the drive electrodes Tx1 to Tx4. Because the drive selection period Htx is temporary in which emission of light from the first light-emitting element unit DEL is suppressed, turning-off or reduction of light emission from the first light-emitting element unit DEL is hard to recognize. In the fourth embodiment, the voltage difference between the first electrode unit 31 and the second electrode unit 32 is made equal to or smaller than the light-emitting drive voltage ΔVFL also in the period during which the pulse signal Stim of the non-lighting period is being applied. As a result, emission of light from the first light-emitting element unit DEL is temporarily suppressed. Consequently, the lighting amount of the first light-emitting element unit DEL varies depending on the pulse signal Stim applied to the second electrode unit 32 controlled by the voltage control circuit 17 based on an instruction from the control unit 11.

Figure 43:
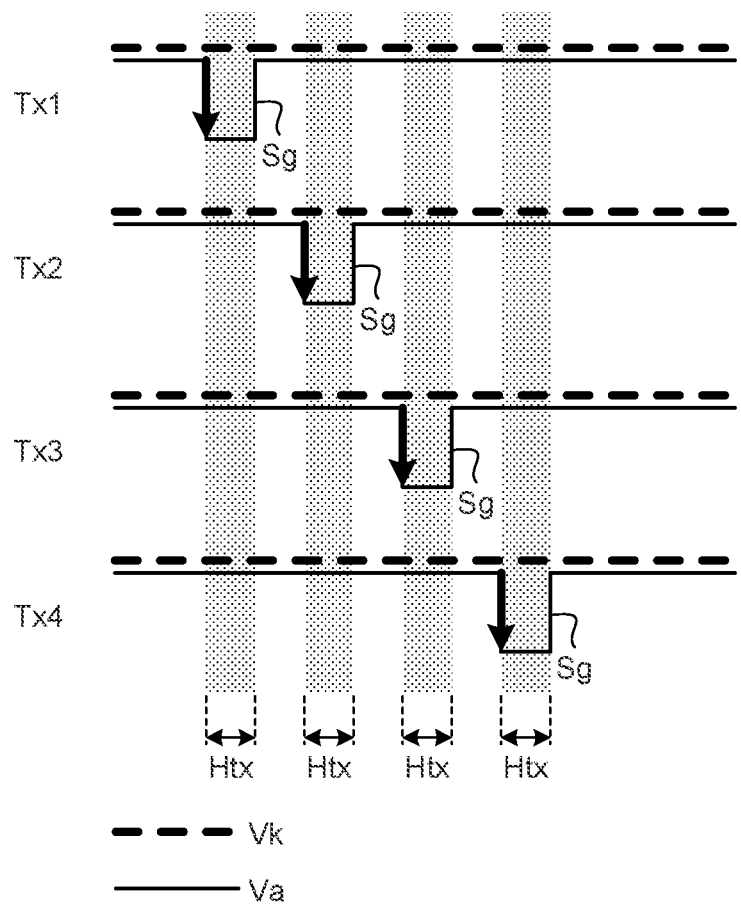
FIG. 43 is a diagram for explaining voltages of the first electrode unit and the second electrode unit in the drive electrode selection period in a state where the first light-emitting element is turned off.
Figure 44:
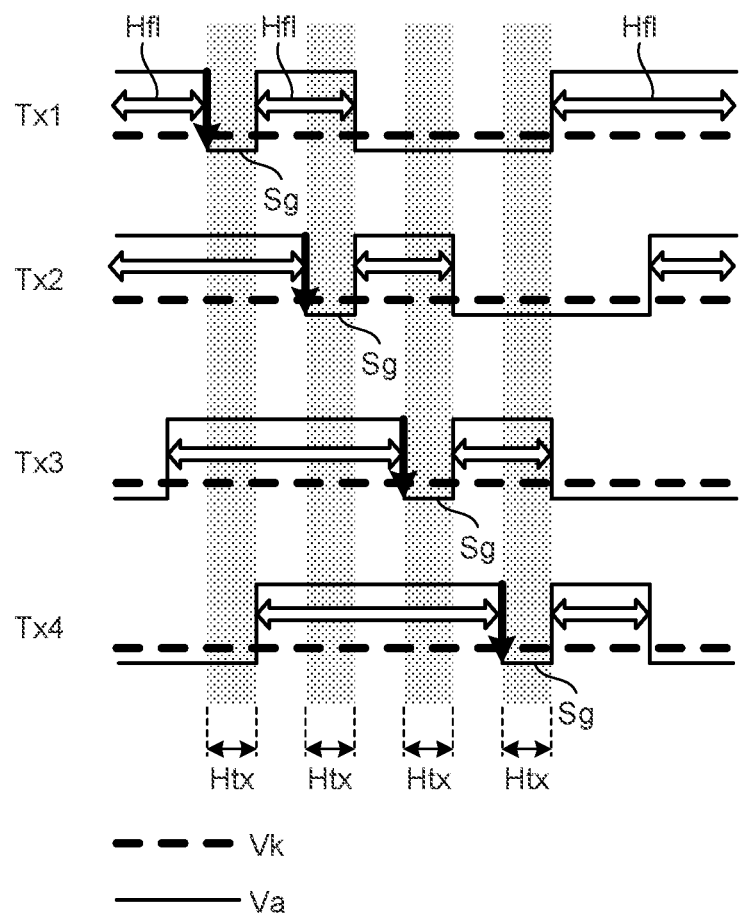

The first electrode unit 31 may serve as an anode of the first light-emitting element unit DEL, and the second electrode unit 32 may serve as a cathode of the first light-emitting element unit DEL. FIG. 43 is a diagram for explaining voltages of the first electrode unit and the second electrode unit in the drive electrode selection period in a state where the first light-emitting element is turned off. FIG. 44 is a diagram for explaining voltages of the first electrode unit and the second electrode unit in the drive electrode selection period in a state where the first light-emitting element is turned on. In FIGS. 43 and 44, the first electrode unit 31 serves as an anode of the first light-emitting element unit DEL, whereas the second electrode unit 32 serves as a cathode of the first light-emitting element unit DEL.

To turn off the first light-emitting element unit DEL, the voltage control circuit 17 makes the voltage Vk of the second electrode unit 32 closer to the voltage Va of the first electrode unit 31, thereby preventing the voltage difference between the voltage Va of the first electrode unit 31 and the voltage Vk of the second electrode unit 32 from reaching the forward light-emitting drive voltage. In this state, the first electrode driver 14 applies the drive signal pulse Sg, the rising direction of which is the reverse-bias direction, between the first electrode unit 31 and the second electrode unit 32 as illustrated in FIG. 43. With this configuration, even when the drive signal pulse Sg is applied in the drive selection period Htx, emission of light from the first light-emitting element unit DEL is suppressed. Even when the first electrode driver 14 performs driving to sequentially scan the drive electrodes Tx1 to Tx4 in a time-division manner as illustrated in FIG. 43, emission of light from the first light-emitting element unit DEL is suppressed by any of the drive signal pulses Sg.

To turn on the first light-emitting element unit DEL, the voltage control circuit 17 performs control to make the difference between the voltage Va of the first electrode unit 31 and the voltage Vk of the second electrode unit 32 closer to the light-emitting drive voltage ΔVFL. As illustrated in FIG. 44, the voltage control circuit 17 applies a forward-bias voltage of equal to or larger than the light-emitting drive voltage ΔVFL between the first electrode unit 31 and the second electrode unit 32. The first electrode driver 14 applies the voltage Vk of the second electrode unit 32 as a voltage common to all the first conductive layers (drive electrodes Tx1 to Txn) of the first electrode unit 31. At this time, the first electrode driver 14 applies the drive signal pulse Sg, the rising direction of which is the reverse-bias direction, between the first electrode unit 31 and the second electrode unit 32. As a result, the light-emitting drive voltage ΔVFL is applied to the first light-emitting element unit DEL except in the drive selection period Htx when the drive signal pulse Sg is applied.

As illustrated in FIG. 44, the first light-emitting element unit DEL emits light in the lighting period Hfl during which the light-emitting drive voltage ΔVFL is being applied. The first electrode driver 14 applies the drive signal pulse Sg to the drive electrodes Tx selected by the first electrode driver 14 performing driving to sequentially scan the drive electrodes Tx1 to Tx4 in a time-division manner, for example. If the voltage difference that causes the first light-emitting element unit DEL to emit light cannot be made in the drive selection period Htx, emission of light from the first light-emitting element unit DEL is temporarily suppressed. Because the drive selection period Htx is temporary in which emission of light from the first light-emitting element unit DEL is suppressed, turning-off or reduction of light emission from the first light-emitting element unit DEL is hard to recognize. Even if the voltage difference that causes the first light-emitting element unit DEL to emit light can be made in the drive selection period Htx, the emission of light from the first light-emitting element unit DEL hardly provides a sense of incongruity because it is continuous with emission of light from the first light-emitting element unit DEL in the lighting period Hfl.

The EL lighting timing generation circuit 18 generates the pulse signal Stim of a non-lighting period corresponding to the lighting amount of the first light-emitting element unit DEL by setting a lighting period to be a low level (L) and a non-lighting period to be a high level (H), for example. The EL lighting timing generation circuit 18 then supplies the pulse signal Stim to the Tx timing synthesis circuit 19. In the fourth embodiment, emission of light from the first light-emitting element unit DEL is temporarily suppressed also in the period during which the pulse signal Stim of the non-lighting period is being applied as illustrated in FIG. 44. As a result, the lighting amount of the first light-emitting element unit DEL varies depending on the pulse signal Stim applied to the second electrode unit 32 controlled by the voltage control circuit 17 based on an instruction from the control unit 11.

As described above, in the input device 2 according to the fourth embodiment, the first electrode unit 31 includes a plurality of first conductive layers formed in one layer, and the second conductive layer of the second electrode unit 32 has a size overlapping with the first conductive layers in planar view. The drive signal pulses Sg is applied to a part of the first conductive layers of the first electrode unit 31. The drive signal pulse Sg rises in the reverse-bias direction opposite to the forward-bias voltage applied between the first conductive layers of the first electrode unit 31 and the second conductive layer of the second electrode unit 32 at which the first light-emitting element unit DEL emits light.

Specifically, the input device 2 according to the fourth embodiment includes the first electrode driver 14, the second electrode driver 15, and the proximity detecting unit 40. The first electrode driver 14 supplies a voltage to the first electrode unit 31. The second electrode driver 15 supplies a voltage to the second electrode unit 32. The proximity detecting unit 40 detects a change in the electric field between the first electrode unit 31 and the third electrode unit 33 depending on the coordinates of the proximity object present at a position overlapping with the first surface 201 of the first substrate 21 in planar view as the detection signal Vdet in response to the drive signal pulse Sg. As described above, the first electrode driver 14 scans a part of the first conductive layers of the first electrode unit 31 as a detection block of drive electrodes in a time-division manner. The first electrode driver 14 then supplies the drive signal pulse Sg to the scanned part of the first conductive layers (drive electrodes Tx) of the first electrode unit 31.

In a case where the input device 2 according to the fourth embodiment functions as a front light, the second electrode driver 15 applies a forward-bias voltage between the first electrode unit 31 and the second electrode unit 32, thereby applying the light-emitting drive voltage ΔVFL. As a result, the first light-emitting element unit DEL emits light. The first electrode driver 14 applies the pulse signal Stim of the non-lighting period, the pulse of which rises in the reverse-bias direction, to all the first conductive layers of the first electrode unit 31.

With this configuration, even when the drive signal is applied to a part of the first conductive layers, the input device 2 suppresses emission of light from the first light-emitting element unit DEL. Furthermore, by changing the pulse width of the pulse signal Stim of the non-lighting period applied to all the first conductive layers of the first electrode unit 31, the input device 2 can control the lighting amount of the first light-emitting element unit DEL. As described above, even when the drive signal pulse Sg is applied to the drive electrodes Tx of the first electrode unit 31, the input device 2 can suppress unintended emission of light from the first light-emitting element unit DEL.

First Modification of the Fourth Embodiment

Figure 45:
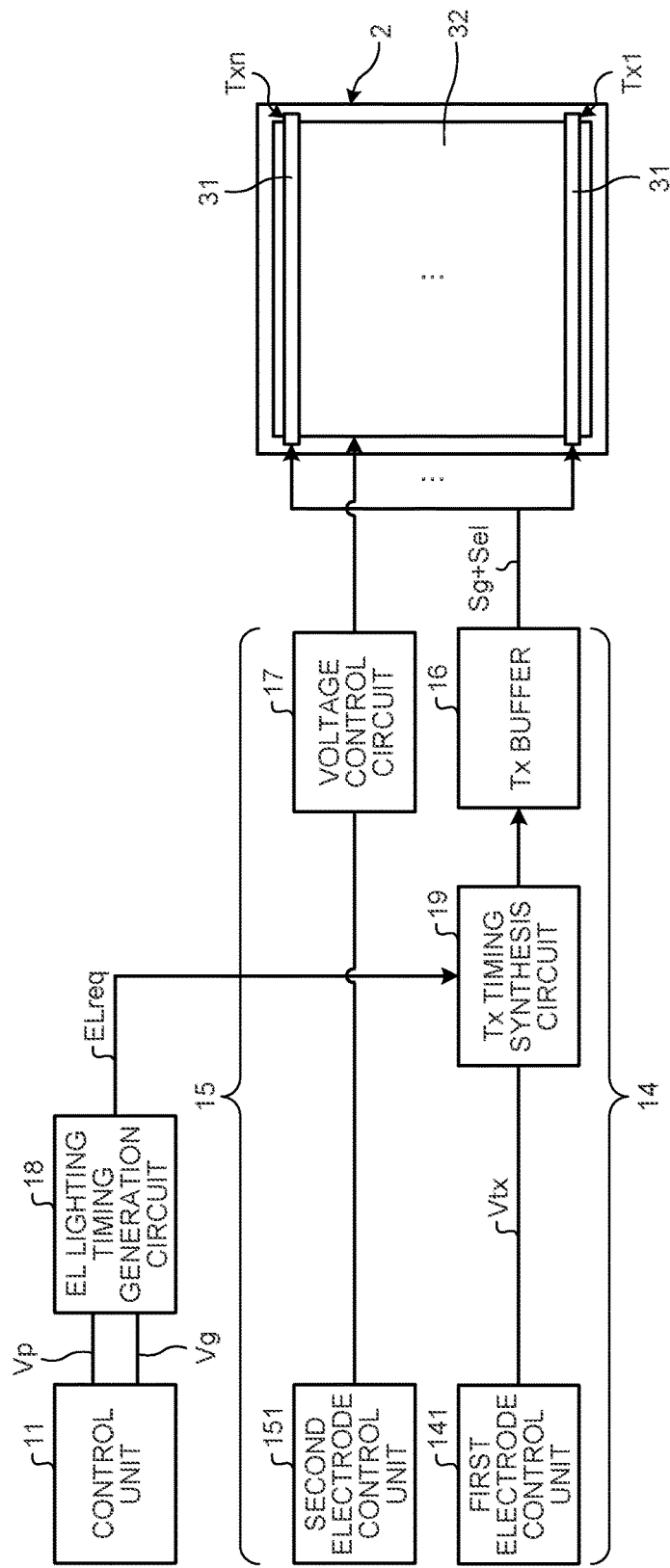
FIG. 45 is a diagram for explaining the first drive electrode driver and the second drive electrode driver according to a first modification of the fourth embodiment.

The following describes drive control of the input device 2 according to a first modification of the fourth embodiment with reference to FIGS. 1, 6, 7, and 45 to 49. In the following description, the input device 2 according to the first modification of the fourth embodiment is explained using the input device 2 according to the first embodiment as an example. The technology according to the first modification of the fourth embodiment is also applicable to any of the input devices described in the first, the second, and the third embodiments and the modifications thereof. FIG. 45 is a diagram for explaining the first drive electrode driver and the second drive electrode driver according to the first modification of the fourth embodiment. The first electrode unit 31 serves as a cathode of the first light-emitting element unit DEL, whereas the second electrode unit 32 serves as an anode of the first light-emitting element unit DEL. Components identical with those described in the first, the second, and the third embodiments and the modifications thereof are denoted by like reference numerals, and overlapping explanation thereof will be omitted.

As illustrated in FIG. 45, the first electrode driver 14 according to the fourth embodiment includes the first electrode control unit 141, the Tx timing synthesis circuit 19, and the Tx buffer 16. The first electrode control unit 141 generates the drive signal Vtx based on the control signal supplied from the control unit 11 and supplies it to the Tx timing synthesis circuit 19. The control unit 11 transmits a display synchronization signal Vp and a lighting amount signal Vg for lighting the display unit 9 to the EL lighting timing generation circuit 18. The display synchronization signal Vp is a request signal for causing the first light-emitting element unit DEL to emit light in synchronization with update of display. After receiving the display synchronization signal Vp, the EL lighting timing generation circuit 18 generates a pulse signal ELreq of a lighting period based on the lighting amount signal Vg. The EL lighting timing generation circuit 18 generates the pulse signal ELreq of the lighting period having a pulse width corresponding to the lighting amount of the first light-emitting element unit DEL by setting a lighting period to be a high level (H) and a non-lighting period to be a low level (L), for example. The EL lighting timing generation circuit 18 then supplies the pulse signal ELreq to the Tx timing synthesis circuit 19.

The second electrode driver 15 includes the second electrode control unit 151 and the voltage control circuit 17. The second electrode control unit 151 supplies electric power at a constant voltage to the voltage control circuit 17. The voltage control circuit 17 controls the voltage supplied to the second electrode unit 32 of the input device 2 based on the control signal supplied from the control unit 11.

Figure 47:
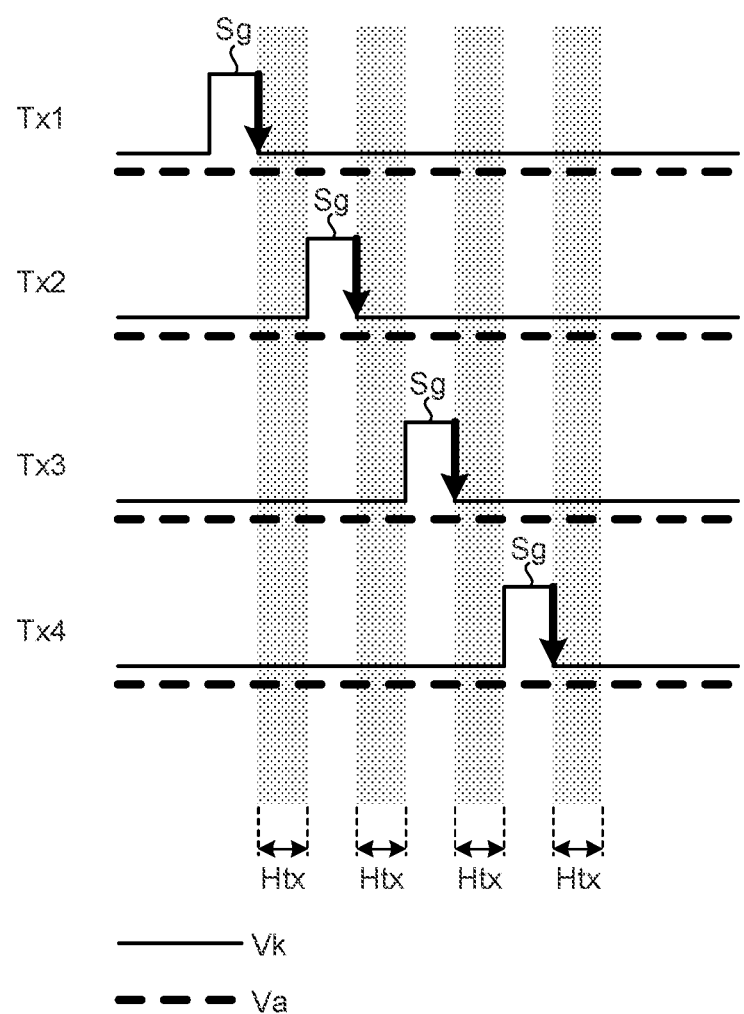
FIG. 47 is a timing chart of drive control using a drive signal of one pulse in a state where the first light-emitting element is turned off.

To turn off the first light-emitting element unit DEL, the voltage control circuit 17 according to the first modification of the fourth embodiment makes the voltage Va of the second electrode unit 32 closer to the voltage Vk of the first electrode unit 31 (refer to FIG. 47). Even if the first light-emitting element unit DEL is turned on, the voltage control circuit 17 maintains the voltages without any change. The first electrode driver 14 applies the drive signal pulse Sg, the rising direction of which is the reverse-bias direction, between the first electrode unit 31 and the second electrode unit 32. With this configuration, even when the drive signal pulse Sg is applied in the drive selection period Htx, only a reverse-bias voltage difference is applied between the first electrode unit 31 and the second electrode unit 32. As a result, emission of light from the first light-emitting element unit DEL is suppressed. Even when the first electrode driver 14 performs driving to sequentially scan the drive electrodes Tx1 to Tx4 in a time-division manner as illustrated in FIG. 47, emission of light from the first light-emitting element unit DEL is suppressed by any of the drive signal pulses Sg applied to the drive electrodes Tx1 to Tx4.

Figure 46:
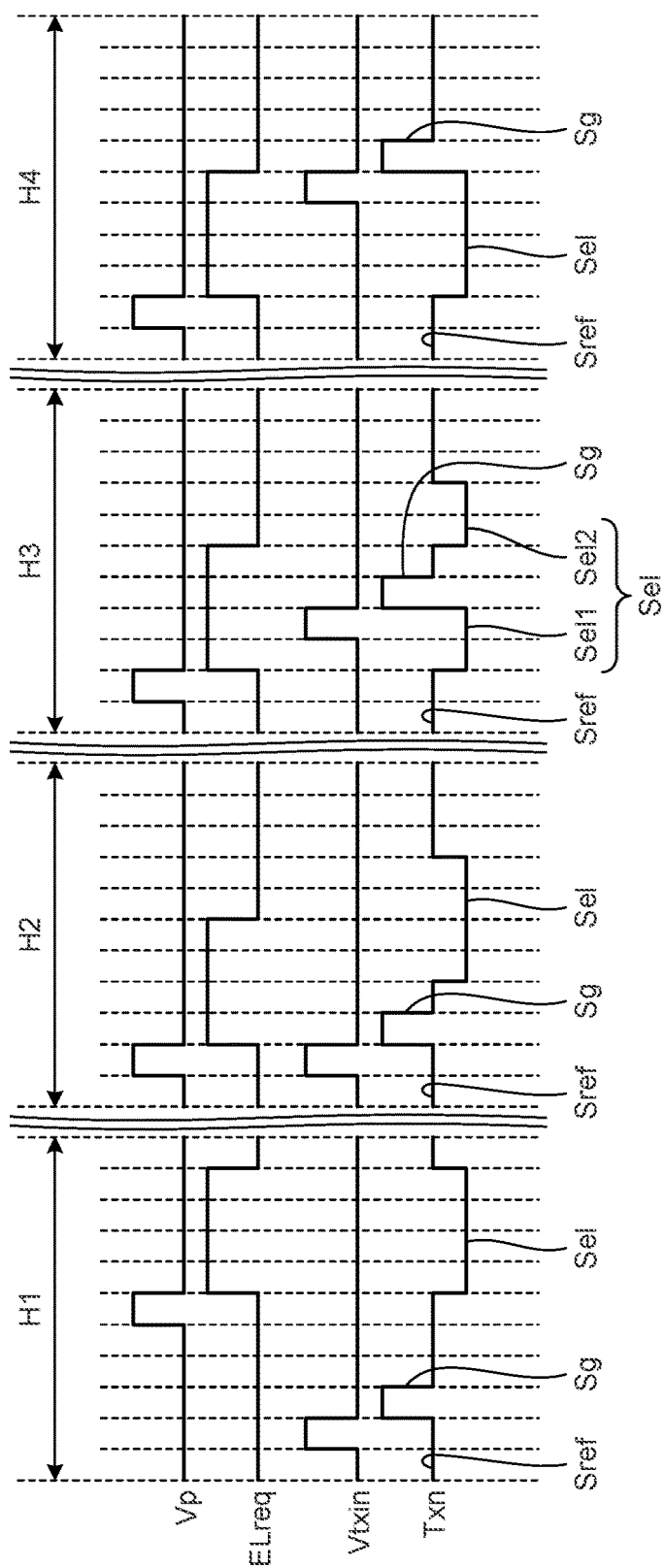
FIG. 46 is a timing chart of drive control according to the first modification of the fourth embodiment.

FIG. 46 is a timing chart of drive control according to the first modification of the fourth embodiment. As illustrated in FIG. 46, the first electrode control unit 141 receives a request signal Vtxin from the control unit 11 before receiving the Vtx. In a first period H1, the request signal Vtxin does not coincide with the display synchronization signal Vp or the pulse signal ELreq of a lighting period.

In the first period H1, the pulse signal ELreq of the lighting period output from the EL lighting timing generation circuit 18 is inverted to generate a lighting pulse Sel. The inverted signal of the pulse signal ELreq of the lighting period and the drive signal Vtx are synthesized and transmitted to the Tx buffer 16. The Tx buffer 16 supplies an output signal obtained by synthesizing the drive signal pulse Sg and the lighting pulse Sel to the drive electrode Txn (a part of the first electrode unit 31) sequentially selected in the scanning direction Scan.

The rising direction of the drive signal pulse Sg is opposite to that of the lighting pulse Sel with respect to a reference voltage signal Sref. In the first period H1, the lighting pulse Sel rises in the forward-bias direction. When the lighting pulse Sel is applied, the forward-bias light-emitting drive voltage ΔVFL is applied between the first electrode unit 31 and the second electrode unit 32, thereby causing the first light-emitting element unit DEL to emit light. The lighting pulse Sel may be composed of a plurality of pulses, and the lighting amount of the first light-emitting element unit DEL may be controlled by pulse-width modulation.

In a second period H2, the request signal Vtxin coincides with the display synchronization signal Vp. In the second period H2, the pulse signal ELreq of the lighting period is inverted to generate the lighting pulse Sel. The inverted signal of the pulse signal ELreq of the lighting period is delayed so as to be synthesized at a timing later than that of the drive signal Vtx. The inverted signal and the drive signal Vtx are transmitted to the Tx buffer 16. The Tx buffer 16 supplies an output signal obtained by synthesizing the drive signal pulse Sg and the lighting pulse Sel to the drive electrode Txn (a part of the first electrode unit 31) sequentially selected in the scanning direction Scan. Also in the second period H2, when the lighting pulse Sel is applied to the first electrode unit 31 of the input device 2, the first light-emitting element unit DEL emits light. As described above, when the request signal Vtxin coincides with the display synchronization signal Vp, the first electrode driver 14 applies the drive signal Vtx and then applies the lighting pulse Sel.

In a third period H3, the timings of the request signal Vtxin and the drive signal Vtx coincide not with the display synchronization signal Vp but with the pulse signal ELreq of the lighting period. In the third period H3, the pulse signal ELreq of the lighting period is inverted to generate the lighting pulse Sel. The inverted signal of the pulse signal ELreq of the lighting period is divided after the request signal Vtxin is received. A part of the inverted signal of the pulse signal ELreq of the lighting period divided after receiving the request signal Vtxin is delayed by the drive signal Vtx.

The Tx buffer 16 supplies a first lighting pulse Sel1, the drive signal pulse Sg, and a second lighting pulse Sel2 to the drive electrode Txn (a part of the first electrode unit 31) sequentially selected in the scanning direction Scan. The rising direction of the first lighting pulse Sel1 is opposite to that of the drive signal pulse Sg with respect to the reference voltage signal Sref. The rising direction of the first lighting pulse Sel1 is the same as that of the second lighting pulse Sel2 with respect to the reference voltage signal Sref. In the third period H3, the drive signal pulse Sg is applied in a manner interposed between the first lighting pulse Sel1 and the second lighting pulse Sel2. When the first lighting pulse Sel1 or the second lighting pulse Sel2 is applied to the first electrode unit 31 of the input device 2, the first light-emitting element unit DEL emits light. The first lighting pulse Sel1 or the second lighting pulse Sel2 is obtained by dividing the lighting pulse Sel in the first period H1 or the second period H2 into halves. The first lighting pulse Sel1 and the second lighting pulse Sel2 as a whole enables light emission of substantially the same amount of light as that of the lighting pulse Sel in the first period H1 or the second period H2. As described above, when the timings of the request signal Vtxin and the drive signal Vtx coincide not with the display synchronization signal Vp but with the pulse signal ELreq of the lighting period, the first electrode driver 14 applies the lighting pulse Sel before and after applying the drive signal pulse Sg.

In a fourth period H4, the timing of the request signal Vtxin coincides with the pulse signal ELreq of the lighting period, but the timing of the drive signal Vtx does not coincide therewith. In the fourth period H4, the pulse signal ELreq of the lighting period output from the EL lighting timing generation circuit 18 is inverted to generate the lighting pulse Sel. The inverted signal of the pulse signal ELreq of the lighting period and the drive signal Vtx are synthesized and transmitted to the Tx buffer 16. The Tx buffer 16 supplies an output signal obtained by synthesizing the drive signal pulse Sg and the lighting pulse Sel to the drive electrode Txn (a part of the first electrode unit 31) sequentially selected in the scanning direction Scan. In the fourth period H4, the drive signal pulse Sg is applied immediately after the lighting pulse Sel. Because the lighting pulse Sel is continuous with the drive signal pulse Sg output based on the drive signal Vtx, the proximity detecting unit 40 detects the absolute value |ΔV| of the voltage difference between the waveform $V_0$ and the waveform $V_1$ in the fall of the drive signal pulse Sg illustrated in FIG. 6.

FIG. 47 is a timing chart of drive control using a drive signal of one pulse in a state where the first light-emitting element is turned off. In consideration of the fourth period H4, the proximity detecting unit 40 of the input device 2 preferably detects the voltage difference in the fall of the drive signal pulse Sg indicated by the arrows in FIG. 47.

Figure 48:
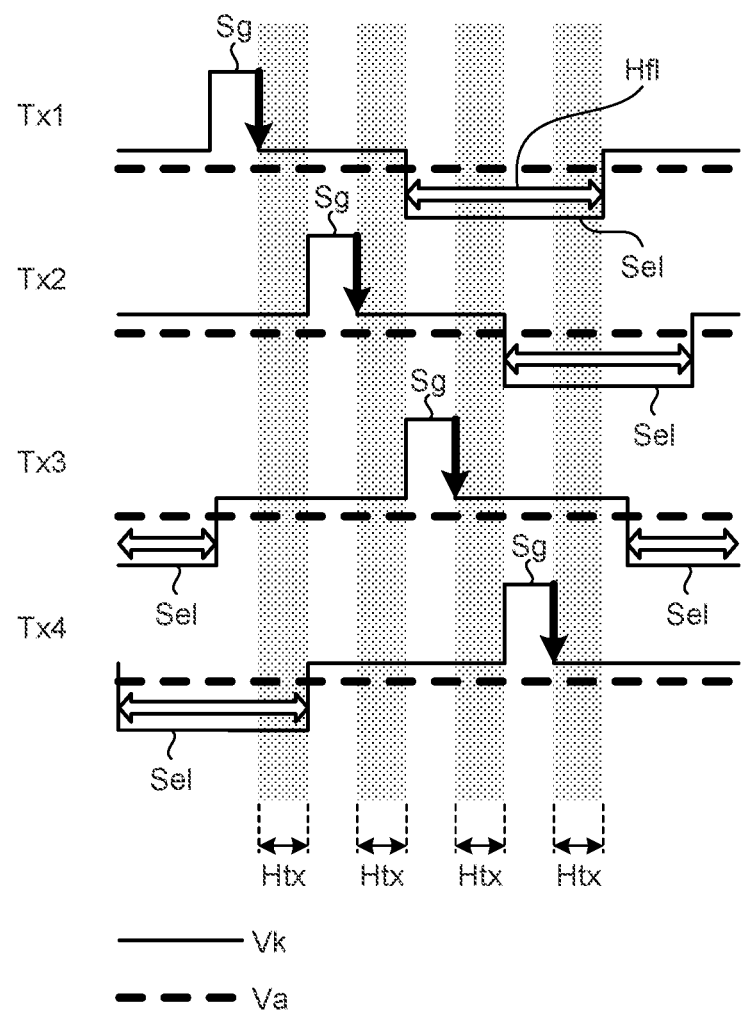
Figure 49:
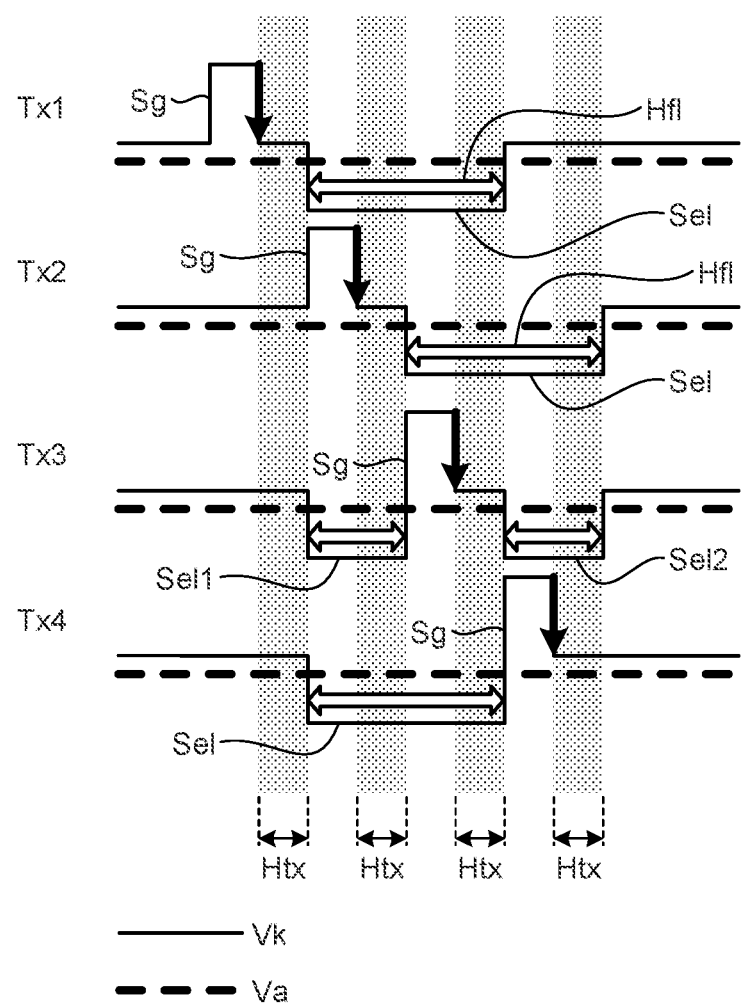

FIG. 48 is a timing chart of drive control performed when the drive signal of one pulse does not coincide with a lighting period for performing lighting drive in a state where the first light-emitting element is turned on. FIG. 49 is a timing chart of drive control performed when the drive signal of one pulse coincides with the lighting period for performing lighting drive and when scanning of the drive signal overtakes the lighting period in a state where the first light-emitting element is turned on. As described above, the control unit 11 sets the drive selection period Htx and the lighting period Hfl independently from each other. When the first electrode driver 14 in FIG. 1 performs driving to sequentially scan the drive electrodes Tx in FIG. 7 in a time-division manner, all the drive electrodes Tx1 to Tx4 may possibly be driven in the first period H1 as illustrated in FIG. 48. In the example illustrated in FIG. 49, the drive electrode Tx1, the drive electrode Tx2, the drive electrode Tx3, and the drive electrode Tx4 are respectively driven in the first period H1, the second period H2, the third period H3, and the fourth period H4.

As described above, the first electrode driver 14 applies the lighting pulse Sel the rising direction of which is the forward-bias direction. Based on the lighting pulse Sel, the first electrode driver 14 causes the first light-emitting element unit DEL to emit light. In a case where the input device 2 functions as a front light, it causes the first light-emitting element unit DEL to emit light of the amount corresponding to the lighting pulse Sel.

When the request signal Vtxin for the drive signal pulse Sg output before the drive signal pulse Sg coincides with the request signal (display synchronization signal Vp) for the lighting pulse output before the lighting pulse Sel (in the case of the second period H2), the first electrode driver 14 applies the drive signal pulse Sg and then applies the lighting pulse Sel to the first electrode unit 31. As a result, the drive signal pulse Sg does not coincide with the lighting pulse Sel, thereby enabling both drive of the drive electrodes Tx and emission of light from the first light-emitting element unit DEL.

When the drive signal pulse Sg coincides with the lighting pulse Sel (in the case of the third period H3), the first electrode driver 14 divides the lighting pulse Sel into a front part and a rear part at the timing when the drive signal pulse Sg coincides with the lighting pulse Sel. The first electrode driver 14 then applies the first lighting pulse Sel1 resulting from the division, the drive signal pulse Sg, and the second lighting pulse Sel2 resulting from the division in this order to the first electrode unit 31. As a result, the drive signal pulse Sg does not virtually coincide with the lighting pulse Sel, thereby enabling both drive of the drive electrodes Tx and emission of light from the first light-emitting element unit DEL.

When the lighting pulse Sel coincides only with the request signal Vtxin for the drive signal pulse (in the case of the fourth period H4), the first electrode driver 14 applies the lighting pulse Sel and the drive signal pulse Sg in this order to the first electrode unit 31. As a result, the drive signal pulse Sg does not virtually coincide with the lighting pulse Sel, thereby enabling both drive of the drive electrodes Tx and emission of light from the first light-emitting element unit DEL.

In any of the first period H1, the second period H2, the third period H3, and the fourth period H4, the first electrode driver 14 can supply the drive signal pulse Sg at constant timing regardless of whether the first light-emitting element unit DEL is turned on or off. As a result, the accuracy of proximity detection performed by the input device 2 does not vary depending on whether the first light-emitting element unit DEL is turned on or off.

Second Modification of the Fourth Embodiment

Figure 50:
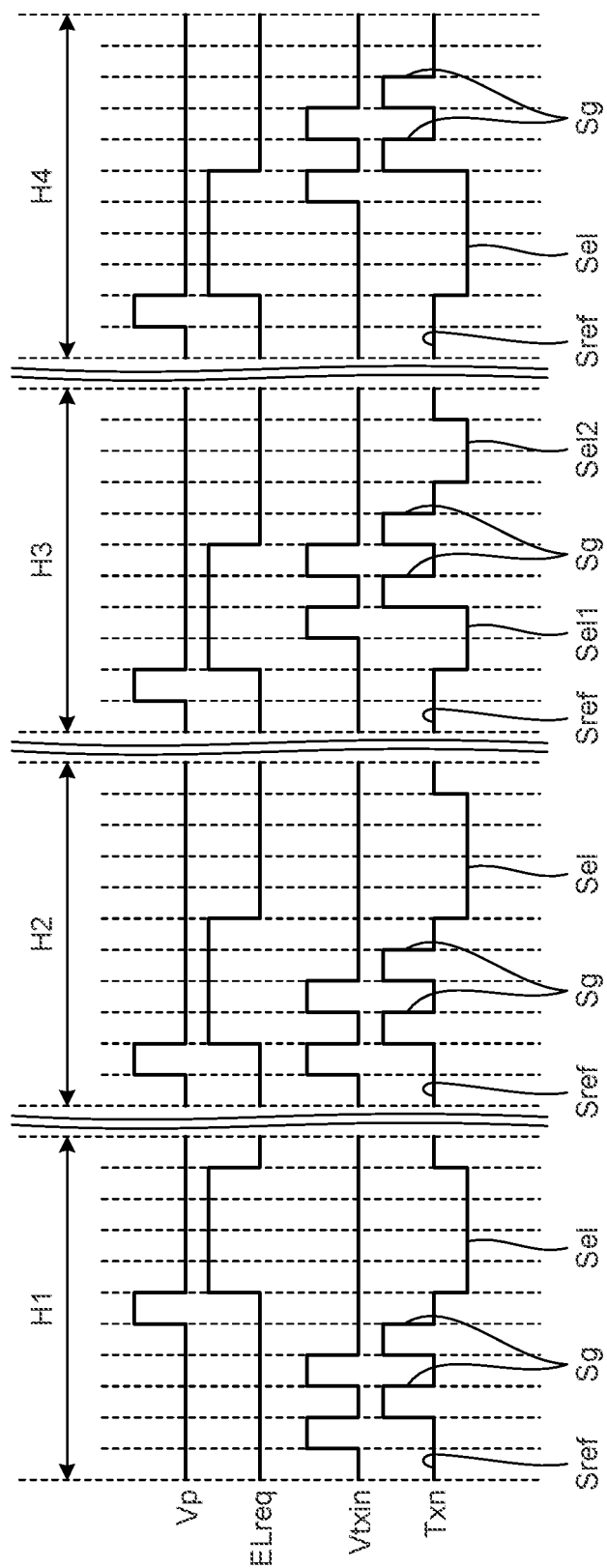
FIG. 50 is a timing chart of drive control according to a second modification of the fourth embodiment.

The following describes drive control of the input device 2 according to a second modification of the fourth embodiment with reference to FIGS. 1, 6, 7, and 50 to 53. In the following description, the input device 2 according to the second modification of the fourth embodiment is explained using the input device 2 according to the first embodiment as an example. The technology according to the second modification of the fourth embodiment is also applicable to any of the input devices described in the first, the second, and the third embodiments and the modifications thereof. FIG. 50 is a timing chart of drive control according to the second modification of the fourth embodiment. Components identical with those described in the first, the second, and the third embodiments and the modifications thereof are denoted by like reference numerals, and overlapping explanation thereof will be omitted.

Even in a case where the drive signal Vtx is applied to the drive electrodes Tx as a plurality of pulses as illustrated in FIG. 50, the input device 2 can carry out both lighting drive and proximity detection drive by performing the same driving as that described in the first modification of the fourth embodiment. As illustrated in FIG. 50, the first electrode driver 14 applies two drive signal pulses Sg at a time. Also in the second modification of the fourth embodiment, the rising direction of the drive signal pulses Sg is opposite to that of the lighting pulse Sel (the first lighting pulse Sel1 and the second lighting pulse Sel2) with respect to the reference voltage signal Sref. Also in this case, the first electrode driver 14 can perform driving independently in the first period H1, the second period H2, the third period H3, and the fourth period H4. The drive control performed by the input device 2 according to the second modification of the fourth embodiment is the same as that performed by the input device 2 according to the first modification of the fourth embodiment, and thus detailed explanation thereof will be omitted.

Figure 51:
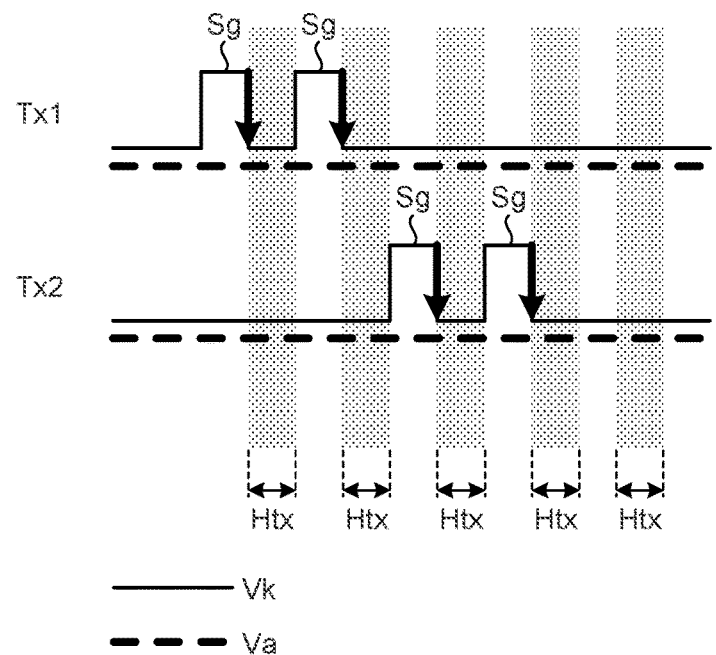
FIG. 51 is a timing chart of drive control using a drive signal of a plurality of pulses in a state where the first light-emitting element is turned off.

FIG. 51 is a timing chart of drive control using the drive signal of a plurality of pulses in a state where the first light-emitting element is turned off. In consideration of the fourth period H4, the proximity detecting unit 40 of the input device 2 preferably detects the voltage difference in the fall of the drive signal pulse Sg indicated by the arrows in FIG. 51.

Figure 52:
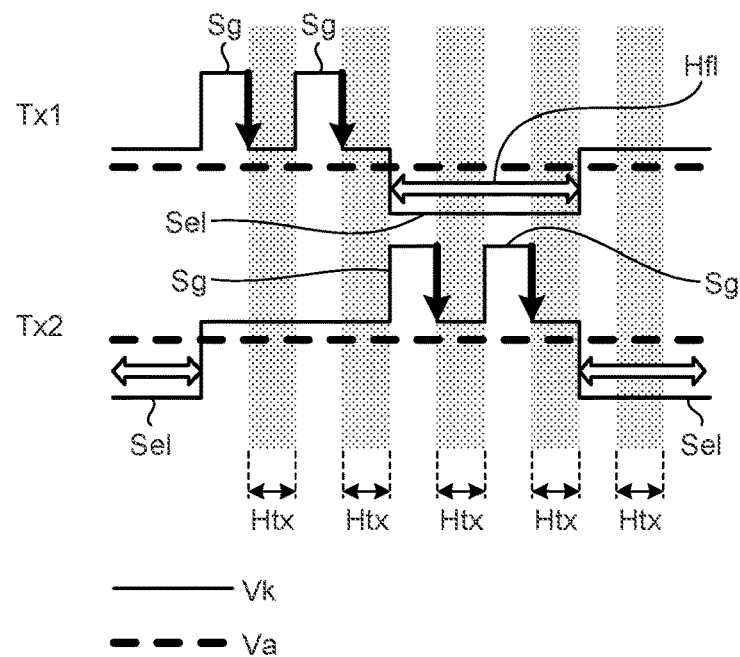
Figure 53:
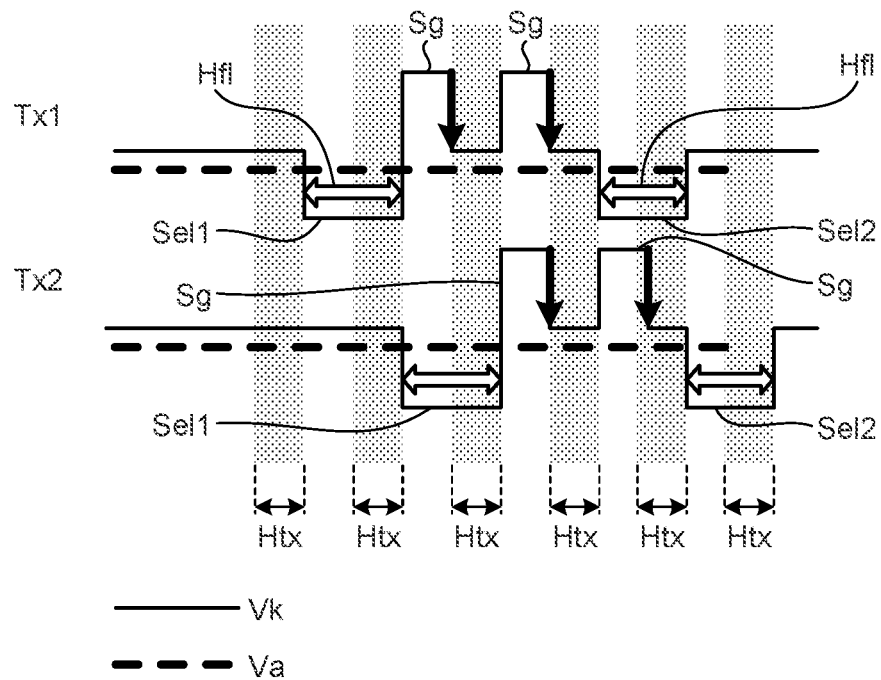

FIG. 52 is a timing chart of drive control performed when the drive signal of a plurality of pulses does not coincide with the lighting period for performing lighting drive in a state where the first light-emitting element is turned on. FIG. 53 is a timing chart of drive control performed when the drive signal of a plurality of pulses coincides with the lighting period for performing lighting drive and when scanning of the drive signal overtakes the lighting period in a state where the first light-emitting element is turned on. As described above, the control unit 11 sets the drive selection period Htx and the lighting period Hfl independently. When the first electrode driver 14 illustrated in FIG. 1 performs driving to sequentially scan the drive electrodes Tx in FIG. 7 in a time-division manner, both of the drive electrodes Tx1 and Tx2 may possibly be driven in the first period H1 as illustrated in FIG. 52. In the example illustrated in FIG. 53, the drive electrode Tx1 is driven in the third period H3, and the drive electrode Tx2 is also driven in the third period H3. As described above, when scanning the drive electrodes Tx in a time-division manner while lighting is being requested, the first electrode driver 14 gives priority to application of the drive signal pulse Sg and delays application of the lighting pulse Sel with respect to application of the drive signal. As a result, the drive signal pulse Sg does not virtually coincide with the lighting pulse Sel, thereby enabling both drive of the drive electrodes Tx and emission of light from the first light-emitting element unit DEL.

Third Modification of the Fourth Embodiment

Figure 54:
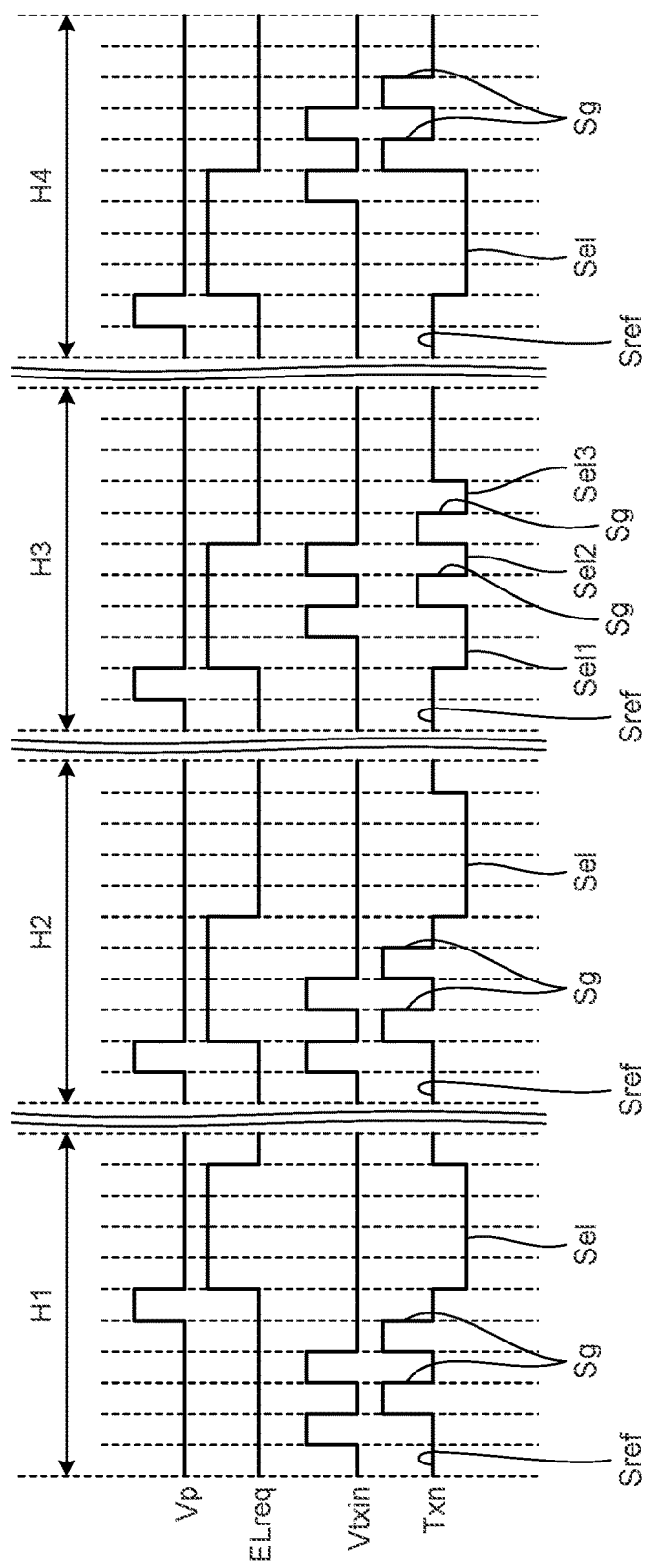
FIG. 54 is a timing chart of drive control according to a third modification of the fourth embodiment.

The following describes drive control of the input device 2 according to a third modification of the fourth embodiment with reference to FIGS. 1, 6, 7, and 54 to 57. In the following description, the input device 2 according to the third modification of the fourth embodiment is explained using the input device 2 according to the first embodiment as an example. The technology according to the third modification of the fourth embodiment is also applicable to any of the input devices described in the first, the second, and the third embodiments and the modifications thereof. FIG. 54 is a timing chart of drive control according to the third modification of the fourth embodiment. Components identical with those described in the first, the second, and the third embodiments and the modifications thereof are denoted by like reference numerals, and overlapping explanation thereof will be omitted.

Even in a case where the drive signal Vtx is applied to the drive electrodes Tx as a plurality of pulses as illustrated in FIG. 54, the input device 2 can carry out both lighting drive and proximity detection drive in the first period H1, the second period H2, and the fourth period H4 by performing the same driving in the first period H1, the second period H2, and the fourth period H4 as that described in the second modification of the fourth embodiment. In the first period H1, the second period H2, and the fourth period H4, the rising direction of the drive signal pulse Sg is opposite to that of the lighting pulse Sel with respect to the reference voltage signal Sref. The input device 2 according to the third modification of the fourth embodiment is different from that according to the second modification of the fourth embodiment in driving performed in the third period H3. Because the drive control performed in the first period H1, the second period H2, and the fourth period H4 by the input device 2 according to the third modification of the fourth embodiment is the same as that performed by the input device 2 according to the first and the second modifications of the fourth embodiment, detailed explanation thereof will be omitted.

The first electrode control unit 141 generates the first lighting pulse Sel1, the second lighting pulse Sel2, and a third lighting pulse Sel3. The drive signal pulse Sg is applied between the first lighting pulse Sel1 and the second lighting pulse Sel2. The drive signal pulse Sg is also applied between the second lighting pulse Sel2 and the third lighting pulse Sel3.

As illustrated in FIG. 54, the low voltage of the drive signal pulse Sg in the first period H1, the second period H2, or the fourth period H4 corresponds to the voltage of the reference voltage signal Sref. On the other hand, the low voltage of the drive signal pulse Sg in the third period H3 is lower than that of the reference voltage signal Sref and corresponds to the low voltage of the first lighting pulse Sel1. In the third period H3, the drive signal pulse Sg is applied to the drive electrode Txn immediately after application of the lighting pulse Sel1. The high voltage in the third period H3 can be made lower than that of the drive signal pulse Sg in the first period H1, the second period H2, or the fourth period H4.

The rising direction of the first lighting pulse Sel1 is opposite to that of the drive signal pulse Sg. Therefore, the first electrode driver 14 can apply the first lighting pulse Sel1 and the drive signal pulse Sg such that the fall of the first lighting pulse Sel1 is continuous with the rise of the drive signal pulse Sg.

The rising direction of the drive signal pulse Sg is opposite to that of the second lighting pulse Sel2. Therefore, the first electrode driver 14 can apply the drive signal pulse Sg and the second lighting pulse Sel2 such that the fall of the drive signal pulse Sg is continuous with the rise of the second lighting pulse Sel2. The first electrode driver 14 can apply the second lighting pulse Sel2 and the next drive signal pulse Sg such that the fall of the second lighting pulse Sel2 is continuous with the rise of the next drive signal pulse Sg.

The rising direction of the drive signal pulse Sg is opposite to that of the third lighting pulse Sel3. Therefore, the first electrode driver 14 can apply the drive signal pulse Sg and the third lighting pulse Sel3 such that the fall of the drive signal pulse Sg is continuous with the rise of the third lighting pulse Sel3.

In the timing chart in FIG. 54, delay of the lighting drive in the third period H3 can be suppressed compared with the timing chart illustrated in FIG. 50.

When the first lighting pulse Sel1, the second lighting pulse Sel2, and the third lighting pulse Sel3 are applied to the first electrode unit 31 in the third period H3, the first light-emitting element unit DEL emits light. The drive signal pulse Sg is applied in a manner interposed between the first lighting pulse Sel1 and the second lighting pulse Sel2 and between the second lighting pulse Sel2 and the third lighting pulse Sel3. As described above, the first electrode driver 14 applies the lighting pulses Sel before and after the drive signal pulse Sg in the third period H3.

Figure 55:
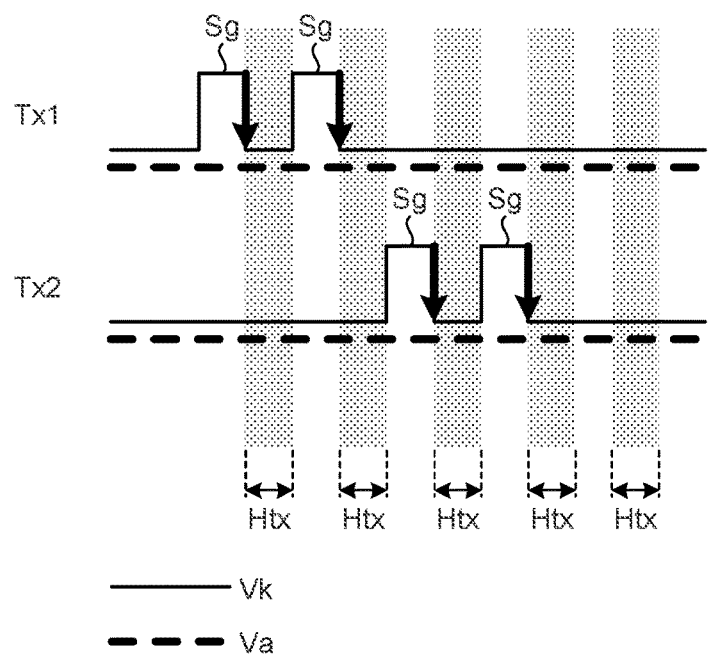
FIG. 55 is a timing chart of drive control using a drive signal of a plurality of pulses in a state where the first light-emitting element is turned off.

FIG. 55 is a timing chart of drive control using the drive signal of a plurality of pulses in a state where the first light-emitting element is turned off. In consideration of the fourth period H4, the proximity detecting unit 40 of the input device 2 preferably detects the voltage difference in the fall of the drive signal pulse Sg indicated by the arrows in FIG. 55.

Figure 56:
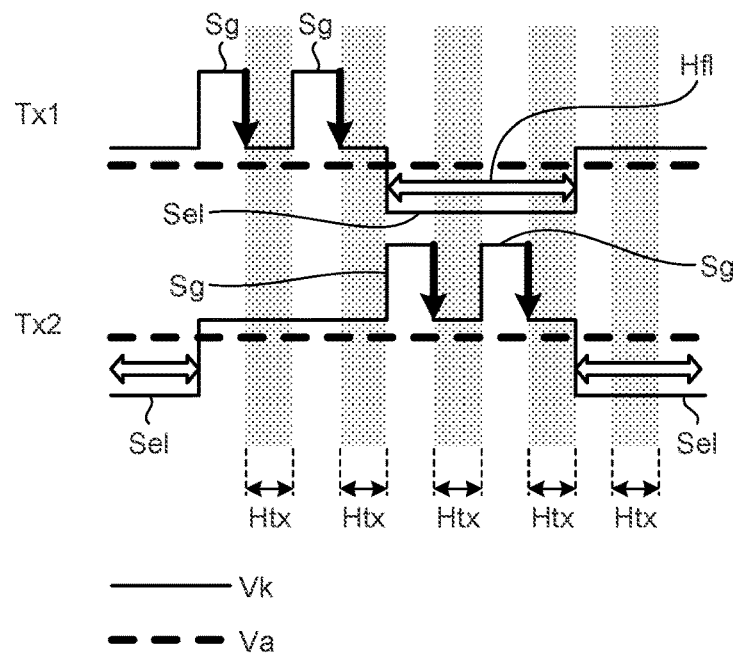
Figure 57:
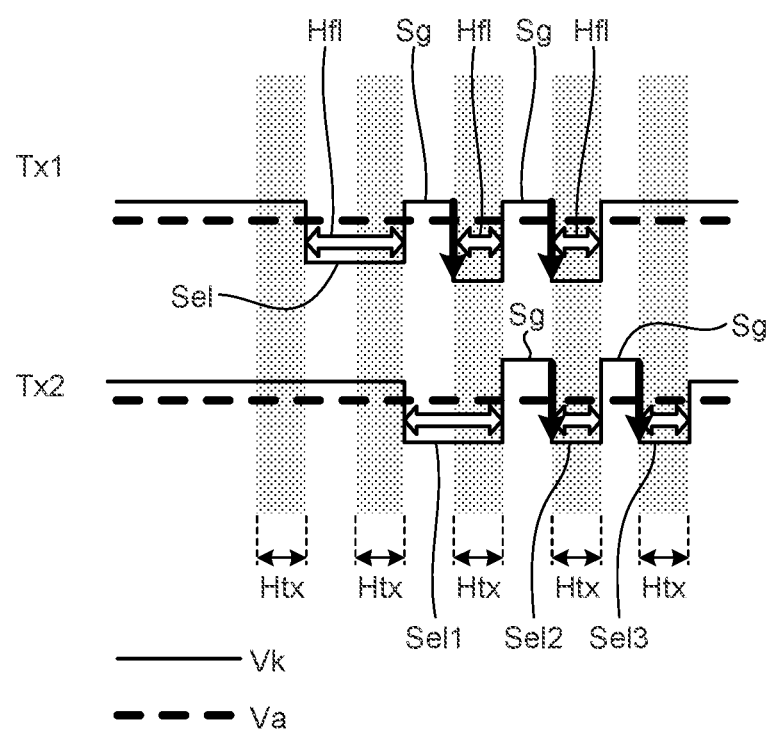

FIG. 56 is a timing chart of drive control performed when the drive signal of a plurality of pulses does not coincide with the lighting period for performing lighting drive in a state where the first light-emitting element is turned on. FIG. 57 is a timing chart of drive control performed when the drive signal of a plurality of pulses coincides with the lighting period for performing lighting drive and when scanning of the drive signal overtakes the lighting period in a state where the first light-emitting element is turned on. As described above, the control unit 11 sets the drive selection period Htx and the lighting period Hfl independently. When the first electrode driver 14 in FIG. 1 performs driving to sequentially scan the drive electrodes Tx in FIG. 7 in a time-division manner, both of the drive electrodes Tx1 and Tx2 may possibly be driven in the first period H1 as illustrated in FIG. 56. In the example illustrated in FIG. 57, the drive electrode Tx1 is driven in the third period H3, and the drive electrode Tx2 is also driven in the third period H3. As described above, when sequentially scanning the drive electrodes Tx in a time-division manner while lighting is being requested, the first electrode driver 14 gives priority to application of the drive signal and delays application of the lighting pulse Sel with respect to application of the drive signal.

As described above, the input device 2 according to the third modification of the fourth embodiment can make the delay time in application of the lighting pulse Sel with respect to application of the drive signal in the third period H3 shorter than that in the second modification of the fourth embodiment. With this configuration, the input device 2 according to the third modification of the fourth embodiment can increase the number of pulses applied to the drive electrodes Tx at a time.

In the modifications of the fourth embodiment, the first electrode unit 31 serves as a cathode of the first light-emitting element unit DEL, and the second electrode unit 32 serves as an anode of the first light-emitting element unit DEL. Alternatively, the first electrode unit 31 may serve as an anode of the first light-emitting element unit DEL, and the second electrode unit 32 may serve as a cathode of the first light-emitting element unit DEL.

While exemplary embodiments of the present invention have been described, the embodiments are not intended to limit the invention. The contents disclosed in the embodiments are given by way of example only, and various changes can be made without departing from the spirit of the invention. Appropriate changes made without departing from the spirit of the invention naturally fall within the technical scope of the invention.

The luminescent layer 22, for example, is not limited to an organic layer and may be an inorganic layer. The luminescent layer may be light-emitting diodes. The luminescent layer 22 may be a layer obtained by vapor-depositing a plurality of layers to emit white light or a layer in which luminescent layers of R, G, and B are separately provided. In the case of the luminescent layer 22 in which a plurality of colors, such as R, G, and B, are arranged on a single plane to display white, light-emitting element units of the respective colors have different optimum current values. In a case where the current values are optimized by the light-emitting element units of the respective colors in the input device 2, the light-emitting element units of the same color are preferably arranged above a single conductive layer in the first electrode unit 31. This configuration can facilitate optimization of the current value.

The first conductive layers of the first electrode unit 31, the second conductive layer of the second electrode unit 32, the third conductive layers of the third electrode unit 33, the fourth conductive layers 35, 35G, and 35H, and the fifth conductive layers 35C, 35D, and 35E each may be a single layer or a layer obtained by laminating a plurality of layers.

The input device 2 according to the first, the second, the third, and the fourth embodiments and the modifications thereof is applicable to electronic apparatuses of various fields, such as television apparatuses, digital cameras, notebook personal computers, portable electronic apparatuses including mobile phones, and video cameras. In other words, the display device 1 with a proximity detecting function including the input device 2 according to the first, the second, the third, and the fourth embodiments and the modifications thereof and the display unit 9 is applicable to electronic apparatuses of various fields that display video signals received from the outside or video signals generated inside thereof as an image or video.

Configuration of the Present Aspect

The present embodiment may have the following configurations.

(1) An input device comprising:
a first substrate having a first surface and a second surface;
a first light-emitting element unit including
a first electrode unit formed on the second surface,
a second electrode unit formed in a layer different from a layer of the first electrode unit, and
a luminescent layer electrically in contact with at least a part of the first electrode unit and a part of the second electrode unit, and formed between the first electrode unit and the second electrode unit; and
a third electrode unit insulated from the first electrode unit and that detects a change in an electric field between the first electrode unit and the third electrode unit depending on coordinates of a proximity object present at a position overlapping with the first surface in planar view.

(2) The input device according to (1), wherein
the first electrode unit includes a plurality of first conductive layers formed in one layer, and
the second electrode unit includes a second conductive layer having a size overlapping with the first conductive layers in planar view.

(3) The input device according to (1) or (2), wherein the third electrode unit includes a plurality of third conductive layers formed in one layer.

(4) The input device according to (1), wherein
the first electrode unit includes a plurality of first conductive layers formed in one layer,
the second electrode unit includes a second conductive layer having a size overlapping with the first conductive layers in planar view, and
the third electrode unit includes a plurality of third conductive layers formed in one layer different from the layer of the first conductive layers.

(5) The input device according to (4), wherein
the first conductive layers have a shape continuously extending in a first direction in planar view and are in contact with the luminescent layer along the shape of the first conductive layers, and
the first light-emitting element unit is capable of emitting light along the shape of the first conductive layers.

(6) The input device according to (1), wherein
the first electrode unit includes a plurality of first conductive layers formed in one layer,
the second electrode unit includes a second conductive layer having a size overlapping with the first conductive layers in planar view, and
the third electrode unit includes a plurality of third conductive layers formed in the same layer as the layer in which the first conductive layers are formed.

(7) The input device according to (5), wherein
the first conductive layers are laminated on the luminescent layer with an insulation layer interposed therebetween and have a shape continuously extending in the first direction in planar view,
the third conductive layers are laminated on the luminescent layer with the insulation layer interposed therebetween and have a shape continuously extending in a second direction intersecting with the first direction in planar view, a plurality of fourth conductive layers are provided at portions where the first conductive layers intersect with the third conductive layers, the fourth conductive layers each coupling ends of the first conductive layers divided by the third conductive layers and crossing over the third conductive layers in a manner insulated from the third conductive layers, and the fourth conductive layers are electrically coupled to a part of the luminescent layer via a first contact portion.

(8) The input device according to (5), wherein the first conductive layers are laminated on the luminescent layer with an insulation layer interposed therebetween and are scattered in planar view like an island, a plurality of fourth conductive layers are provided at portions where the first conductive layers intersect with the third conductive layers, the fourth conductive layers each coupling ends of the first conductive layers sandwiching the third conductive layers, and crossing over the third conductive layers in a manner insulated from the third conductive layers, a direction coupled by the fourth conductive layers extending in the first direction, the third conductive layers are laminated on the luminescent layer with the insulation layer interposed therebetween and have a shape continuously extending in a second direction intersecting with the first direction in planar view, and the fourth conductive layers are electrically coupled to a part of the luminescent layer via a first contact portion.

(9) The input device according to (8), wherein the first conductive layers of the first electrode unit have an outer shape filling unoccupied areas between adjacent third conductive layers of the third electrode unit in planar view in a manner insulated therefrom.

(10) The input device according to (8) or (9), wherein the first conductive layers and the second conductive layer are made of a light-transmissive conductive material.

(11) The input device according to any one of (7) to (10), wherein the first light-emitting element unit can emit light along the shape of the fourth conductive layers in contact with the luminescent layer.

(12) The input device according to any one of (1) to (11), wherein the first light-emitting element unit includes a first light-blocking portion that is arranged closer to the first surface than the luminescent layer is.

(13) The input device according to (12), wherein the first light-blocking portion is a wide portion provided in the same layer as the layer in which the first conductive layers are formed, the width of the first conductive layers is broadened in the second direction, and the length of the first light-blocking portion in the second direction is longer than the maximum length of the fourth conductive layers in the second direction.

(14) The input device according to (11) or (12), wherein the first light-blocking portion is made of a metal material having metallic luster.

(15) The input device according to any one of (7) to (11), wherein the fourth conductive layers are made of a metal material having metallic luster.

(16) The input device according to (15), wherein the luminescent layer has a protrusion formed such that the area of a section of the first contact portion parallel to the second surface decreases as the section comes closer to the second surface, and the fourth conductive layers are made of a metal having metallic luster and cover an inclination surface corresponding to a side surface of the protrusion inclined with respect to the second surface.

(17) The input device according to any one of (7) to (16), further comprising a second light-emitting element unit including a second contact portion coupled to a part of the first conductive layers extending between adjacent third conductive layers and electrically coupled to a part of the luminescent layer.

(18) The input device according to (17), wherein the first conductive layers are made of a light-transmissive conductive material, and a part of the first conductive layers is coupled to the luminescent layer via fifth conductive layers.

(19) The input device according to (17), wherein the second light-emitting element unit includes a second light-blocking portion that is arranged closer to the first surface than the luminescent layer is, the second light-blocking portion is a wide portion provided in the same layer as the layer in which the first conductive layers are formed, the width of the first conductive layers is broadened in the second direction, and the length of the second light-blocking portion in the second direction is longer than the maximum length of the second contact portion in the second direction.

(20) The input device according to any one of (17) to (19), wherein the second light-emitting element unit has a larger lighting area than the lighting area of the first light-emitting element unit.

(21) The input device according to any one of (17) to (20), wherein the second light-emitting element unit is provided in plurality, and the second light-emitting element unit arranged closer to the center of the first surface has a larger area than the area of the second light-emitting element unit arranged closer to the end of the first surface.

(22) The input device according to any one of (17) to (21), wherein the second light-emitting element unit is provided in plurality, and the number of second light-emitting element units arranged closer to the center of the first surface per unit area is larger than the number of the second light-emitting element units arranged closer to the end of the first surface.

(23) The input device according to (4), wherein the first conductive layers are laminated on the luminescent layer with an insulation layer interposed therebetween and have a shape continuously extending in a first direction in planar view, the third conductive layers have a shape continuously extending in a second direction intersecting with the first conductive layers in planar view, the luminescent layer has a size overlapping with the first conductive layers in planar view and has a plurality of protrusions protruding toward the second surface, a part of the first conductive layers is coupled to the luminescent layer via the protrusions, and the first light-emitting element unit can emit light along the shape of the fourth conductive layers in contact with the luminescent layer.

(24) The input device according to (4), wherein the first conductive layers are laminated on the luminescent layer with an insulation layer interposed therebetween and have a shape continuously extending in a first direction in planar view, the third conductive layers have a shape continuously extending in a second direction intersecting with the first conductive layers in planar view, the luminescent layer has a size overlapping with the first conductive layers in planar view and has a plurality of protrusions protruding toward the second surface, and a part of the first conductive layers is coupled to the protrusions of the luminescent layer via fourth conductive layers.

(25) The input device according to (24), wherein the fourth conductive layers are made of a metal having metallic luster and cover an inclination surface corresponding to a side surface of the protrusions of the luminescent layer inclined with respect to the second surface.

(26) The input device according to (4), wherein
the first conductive layers are laminated on the luminescent layer with an insulation layer interposed therebetween and have a shape continuously extending in a first direction in planar view,
the third conductive layers have a shape continuously extending in a second direction intersecting with the first conductive layers in planar view,
a part of the first conductive layers is coupled to the luminescent layer via fourth conductive layers, and
the first light-emitting element unit can emit light along the shape of the fourth conductive layers in contact with the luminescent layer.

(27) The input device according to (26), wherein a plurality of luminescent layers are arranged in an insular manner in planar view, each of the luminescent layers overlaps with each of the first conductive layers, and the luminescent layer has an area of equal to or smaller than the area of each of the fourth conductive layers.

(28) The input device according to any one of (1) to (27), wherein the luminescent layer is an organic luminescent layer.

(29) The input device according to any one of (1) to (28), wherein the first electrode unit, the second electrode unit, and the third electrode unit are provided on the second surface side of the first substrate.

(30) The input device according to any one of (1) to (4) and (23) to (27), wherein the third electrode unit is provided on the first surface side of the substrate, and the first electrode unit and the second electrode unit are provided on the second surface side of the first substrate.

(31) The input device according to (30), further comprising a cover substrate facing the first surface of the first substrate, wherein
the third electrode unit is provided on the cover substrate.

(32) An input device comprising:
a first substrate having a first surface and a second surface;
a first light-emitting element unit including
a first electrode unit formed on the second surface,
a second electrode unit formed in a layer different from a layer of the first electrode unit, and
a luminescent layer electrically in contact with at least a part of the first electrode unit, formed between the first electrode unit and the second electrode unit, and electrically in contact with at least a part of the second electrode unit; and
a third electrode unit insulated from the first electrode unit and capable of outputting a change in an electric field between the first electrode unit and the third electrode unit depending on input of coordinates of a position overlapping with the first surface in planar view, wherein
the first electrode unit includes a plurality of first conductive layers formed in one layer,
the second electrode unit includes a second conductive layer having a size overlapping with the first conductive layers in planar view, and
a drive signal pulse is applied to a part of the first conductive layers, the drive signal pulse rising in a reverse-bias direction opposite to a forward-bias direction of a voltage applied between the first conductive layers and the second conductive layer at which the first light-emitting element unit emits light.

(33) The input device according to (32), further comprising:
a first electrode driver that supplies a voltage to the first electrode unit;
a second electrode driver that supplies a voltage to the second electrode unit; and
a proximity detecting unit that processes the change in the electric field as a proximity detection signal in response to the drive signal pulse, wherein
the first electrode driver scans a part of the first electrode unit as a drive electrode in a time-division manner and supplies the drive signal pulse to the scanned part of the first electrode unit.

(34) The input device according to (32), further comprising:
a first electrode driver that supplies a voltage to the first electrode unit;
a second electrode driver that supplies a voltage to the second electrode unit; and
a proximity detecting unit that processes the change in the electric field as a proximity detection signal in response to the drive signal pulse, wherein
the second electrode driver applies the forward-bias voltage between the first electrode unit and the second electrode unit, thereby causing the first light-emitting element unit to emit light.

(35) The input device according to (34), wherein the first electrode driver applies a pulse signal of a non-lighting period which rises in the reverse-bias direction to the first electrode unit.

(36) The input device according to (32), further comprising:
a first electrode driver that supplies a voltage to the first electrode unit;
a second electrode driver that supplies a voltage to the second electrode unit; and
a proximity detecting unit that processes the change in the electric field as a proximity detection signal in response to the drive signal pulse, wherein
the first electrode driver applies a lighting pulse which rises in the forward-bias direction, thereby causing the first light-emitting element unit to emit light in response to the lighting pulse.

(37) The input device according to (36), wherein, when a request signal for the drive signal pulse output before the drive signal pulse coincides with a request signal for the lighting pulse output before the lighting pulse, the first electrode driver applies the drive signal pulse to the first electrode unit and then applies the lighting pulse to the first electrode unit.

(38) The input device according to (36), wherein, when the drive signal pulse coincides with the lighting pulse, the first electrode driver divides the lighting pulse into a front part and a rear part at timing when the drive signal pulse coincides with the lighting pulse and then sequentially applies a first lighting pulse resulting from division, the drive signal pulse, and a second lighting pulse resulting from division, to the first electrode unit.

(39) The input device according to (38), wherein the first electrode driver applies the first lighting pulse and the drive signal pulse such that a fall of the first lighting pulse is continuous with a rise of the drive signal pulse.

(40) The input device according to (36), wherein, when the lighting pulse coincides only with a request signal for the drive signal pulse output before the drive signal pulse, the first electrode driver sequentially applies the lighting pulse and the drive signal pulse to the first electrode unit.

(41) A display device comprising:
an input device comprising:
a first substrate having a first surface and a second surface;
a first light-emitting element unit including
a first electrode unit formed on the second surface,
a second electrode unit formed in a layer different from a layer of the first electrode unit, and
a luminescent layer electrically in contact with at least a part of the first electrode unit and a part of the second electrode unit, and formed between the first electrode unit and the second electrode unit; and
a third electrode unit insulated from the first electrode unit and that detects a change in an electric field between the first electrode unit and the third electrode unit depending on coordinates of a proximity object present at a position overlapping with the first surface in planar view; and
a display unit provided on the second surface of the input device and capable of displaying an image on the first surface.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An input device comprising:
a first substrate having a first surface and a second surface;
a first light-emitting element unit including
a first electrode unit formed on the second surface and serving as a drive electrode to transmit a drive signal pulse,
a second electrode unit formed in a layer different from a layer of the first electrode unit, and
a luminescent layer electrically in contact with at least a part of the first electrode unit and a part of the second electrode unit, and formed between the first electrode unit and the second electrode unit; and
a third electrode unit insulated from the first electrode unit and serving as a proximity detection electrode to detect a change in an electric field between the first electrode unit and the third electrode unit depending on coordinates of a proximity object present at a position overlapping with the first surface in planar view and output a proximity detection signal,
wherein the first electrode unit includes a plurality of first conductive layers formed in one layer,
wherein the second electrode unit includes a second conductive layer having a size overlapping with the first conductive layers in planar view, and
wherein the third electrode unit includes a plurality of third conductive layers formed in one layer different from the layer of the first conductive layers,
wherein the first conductive layers are laminated on the luminescent layer with an insulation layer interposed therebetween and have a shape continuously extending in a first direction in planar view,
wherein the first light-emitting element unit is capable of emitting light along the shape of the first conductive layers,
wherein the third conductive layers are laminated on the luminescent layer with the insulation layer interposed therebetween and have a shape continuously extending in a second direction intersecting with the first direction in planar view,
wherein a plurality of fourth conductive layers are provided at portions where the first conductive layers intersect with the third conductive layers, the fourth conductive layers each coupling ends of the first conductive layers divided by the third conductive layers and crossing over the third conductive layers in a manner insulated from the third conductive layers, and
wherein the fourth conductive layers are electrically coupled to a part of the luminescent layer via a first contact portion.

2. The input device according to claim 1, wherein
the first electrode unit includes a plurality of first conductive layers formed in one layer,
the second electrode unit includes a second conductive layer having a size overlapping with the first conductive layers in planar view, and
the third electrode unit includes a plurality of third conductive layers formed in the same layer as the layer in which the first conductive layers are formed.

3. The input device according claim 1, wherein the first conductive layers are laminated on the luminescent layer with an insulation layer interposed therebetween and are scattered to have an island shape in planar view,
the first light-emitting element unit is capable of emitting light along the shape of the first conductive layers,
a plurality of fourth conductive layers are provided at portions where the first conductive layers intersect with the third conductive layers, the fourth conductive layers each coupling ends of the first conductive layers sandwiching the third conductive layers, and crossing over the third conductive layers in a manner insulated from the third conductive layers, a direction coupled by the fourth conductive layers extending in the first direction,
the third conductive layers are laminated on the luminescent layer with the insulation layer interposed therebetween and have a shape continuously extending in a second direction intersecting with the first direction in planar view, and
the fourth conductive layers are electrically coupled to a part of the luminescent layer via a first contact portion.

4. The input device according claim 1, wherein the first light-emitting element unit includes a first light-blocking portion that is arranged closer to the first surface than the luminescent layer is.

5. The input device according claim 1, wherein
the luminescent layer has a protrusion formed such that the area of a section of the first contact portion parallel to the second surface decreases as the section comes closer to the second surface, and
the fourth conductive layers are made of a metal having metallic luster and cover an inclination surface corresponding to a side surface of the protrusion inclined with respect to the second surface.

6. The input device according claim 1, further comprising a second light-emitting element unit including a second contact portion coupled to a part of the first conductive layers extending between adjacent third conductive layers and electrically coupled to a part of the luminescent layer, wherein the first conductive layers have a shape continuously extending in a first direction in planar view and are in contact with the luminescent layer along the shape of the first conductive layers, and the first light-emitting element unit is capable of emitting light along the shape of the first conductive layers.

7. A display device comprising:

an input device comprising:

a first substrate having a first surface and a second surface and serving as a drive electrode to transmit a drive signal pulse:

a first light-emitting element unit including a first electrode unit formed on the second surface, a second electrode unit formed in a layer different from a layer of the first electrode unit, and a luminescent layer electrically in contact with at least a part of the first electrode unit and a part of the second electrode unit, and formed between the first electrode unit and the second electrode unit; and a third electrode unit insulated from the first electrode unit and serving as a proximity detection electrode to detect a change in an electric field between the first electrode unit and the third electrode unit depending on coordinates of a proximity object present at a position overlapping with the first surface in planar view and output a proximity detection signal; and a display unit provided on the second surface of the input device and capable of displaying an image on the first surface, wherein the first electrode unit includes a plurality of first conductive layers formed in one layer, wherein the second electrode unit includes a second conductive layer having a size overlapping with the first conductive layers in planar view, and wherein the third electrode unit includes a plurality of third conductive layers formed in one layer different from the layer of the first conductive layers, wherein the first conductive layers are laminated on the luminescent layer with an insulation layer interposed therebetween and have a shape continuously extending in a first direction in planar view, wherein the first light-emitting element unit is capable of emitting light along the shape of the first conductive layers, wherein the third conductive layers are laminated on the luminescent layer with the insulation layer interposed therebetween and have a shape continuously extending in a second direction intersecting with the first direction in planar view, wherein a plurality of fourth conductive layers are provided at portions where the first conductive layers intersect with the third conductive layers, the fourth conductive layers each coupling ends of the first conductive layers divided by the third conductive layers and crossing over the third conductive layers in a manner insulated from the third conductive layers, and wherein the fourth conductive layers are electrically coupled to a part of the luminescent layer via a first contact portion.

* * * * *